(12) United States Patent
Lizée et al.

(10) Patent No.: US 12,552,851 B2
(45) Date of Patent: Feb. 17, 2026

(54) T CELL RECEPTORS WITH VGLL1 SPECIFICITY AND USES THEREOF

(71) Applicant: Board of Regents, The University of Texas System, Austin, TX (US)

(72) Inventors: Gregory Lizée, Houston, TX (US); Cassian Yee, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 510 days.

(21) Appl. No.: 17/999,496

(22) PCT Filed: May 21, 2021

(86) PCT No.: PCT/US2021/033619
§ 371 (c)(1),
(2) Date: Nov. 21, 2022

(87) PCT Pub. No.: WO2021/237068
PCT Pub. Date: Nov. 25, 2021

(65) Prior Publication Data
US 2023/0212256 A1 Jul. 6, 2023

Related U.S. Application Data

(60) Provisional application No. 63/028,262, filed on May 21, 2020.

(51) Int. Cl.
| | | |
|---|---|---|
| C07K 14/725 | (2006.01) | |
| A61K 35/17 | (2025.01) | |
| A61K 38/00 | (2006.01) | |
| A61K 45/06 | (2006.01) | |
| A61K 47/64 | (2017.01) | |
| A61P 35/00 | (2006.01) | |
| C12N 5/0783 | (2010.01) | |

(52) U.S. Cl.
CPC .......... *C07K 14/7051* (2013.01); *A61K 35/17* (2013.01); *A61K 45/06* (2013.01); *A61K 47/6425* (2017.08); *A61P 35/00* (2018.01); *C12N 5/0636* (2013.01); *A61K 38/00* (2013.01); *C12N 2501/2321* (2013.01); *C12N 2502/1121* (2013.01)

(58) Field of Classification Search
CPC ............ C07K 14/7051; C07K 2319/50; C07K 14/4705; A61K 35/17; A61K 45/06; A61K 47/6425; A61K 38/00; A61P 35/00; A61P 1/18; C12N 5/0636; C12N 2501/2321; C12N 2502/1121
See application file for complete search history.

(56) References Cited

U.S. PATENT DOCUMENTS

| | | |
|---|---|---|
| 7,910,109 B2 | 3/2011 | Carroll et al. |
| 8,586,006 B2 | 11/2013 | Hood et al. |
| 8,617,562 B2 | 12/2013 | Tsunoda et al. |
| 9,061,059 B2 | 6/2015 | Chakraborty et al. |
| 9,089,604 B2 | 7/2015 | Chakraborty et al. |
| 2014/0147432 A1 | 5/2014 | Bancel et al. |
| 2015/0224182 A1 | 8/2015 | Hunt et al. |
| 2020/0040079 A1 | 2/2020 | Lizée et al. |

FOREIGN PATENT DOCUMENTS

| | | |
|---|---|---|
| KR | 10-2015-0050681 A | 5/2015 |
| WO | WO 2003/003906 A2 | 1/2003 |
| WO | WO 2018/067869 A1 | 4/2018 |

OTHER PUBLICATIONS

Bellone, S. et al., "Generation of CA125-specific cytotoxic T lymphocytes in human leukocyte antigen-A2.1-positive healthy donors and patients with advanced ovarian cancer," *Am J Obstet Gynecol*, 200 (2009): 75.e1-75.e10.
Bradley, S. D. et al., "BRAF$^{V600E}$ Co-opts a Conserved MHC Class I Internalization Pathway to Diminish Antigen Presentation and CD8$^+$ T-cell Recognition of Melanoma," *Cancer Immunol Res*, 3.6 (2015): 602-609.
Bradley, S. D. et al., "Vestigial-like 1 is a shared targetable cancer-placenta antigen expressed by pancreatic and basal-like breast cancers," *Nature Communications*, 11.5332 (2020): 1-12.
Bradley, S. D. et al., "Supplementary Information for: Vestigial-like 1 is a shared targetable cancer-placenta antigen expressed by pancreatic and basal-like breast cancers," *Nature Communications*, 11.5332 (2022): 1-29.
Extended European Search Report issued in European Application No. 17859215.0, mailed Jun. 9, 2020.
Jiao, S. et al., "A Peptide Mimicking VGLL4 Function Acts as a YAP Antagonist Therapy against Gastric Cancer," *Cancer Cell*, 25 (2014): 166-180.
Li, Y. et al., "IL-21 Influences the Frequency, Phenotype, and Affinity of the Antigen-Specific CD8 T Cell Response," *J Immunol*, 175.4 (2005): 2261-2269.
MD Anderson Cancer Center, "Researchers aim to overcome multiple obstacles in pancreatic cancer," *DoCMessages*, 13(2):11-12, 2016.
PCT International Search Report and Written Opinion issued in International Application PCT/2017/055414, mailed on Jan. 9, 2018.
PCT International Search Report and Written Opinion issued in International Patent Application No. PCT/US2021/033619, mailed Dec. 23, 2021.
PCT Preliminary Report on Patentability issued in International Patent Application No. PCT/US2021/033619, mailed Dec. 1, 2022.
Rizvi, N. et al., "Mutational landscape determines sensitivity to PD-1 blockade in non-small cell lung cancer," *Science*, 348 (2015): 124-128.

(Continued)

*Primary Examiner* — Janet L Epps -Smith
*Assistant Examiner* — Carol Ann Chase
(74) *Attorney, Agent, or Firm* — pH IP Law

(57) ABSTRACT

Provided herein are tumor-antigen VGLL1 specific T cell receptors. The TCR may be utilized in various therapies, such as autologous cell transplantation, to treat a cancer. Methods for expanding a population of T cells that target VGLL1 are also provided.

22 Claims, 31 Drawing Sheets

Specification includes a Sequence Listing.

(56) References Cited

OTHER PUBLICATIONS

Sonnemann, H. M. et al., "Vestigial-like 1 (VGLL1): An ancient co-transcriptional activator linking wing, placenta, and tumor development," *BBA Reviews on Cancer*, 1878 (2023): 188892, 1-9.

Xu, Q-W. et al., "An integrated genome-wide approach to discover tumor-specific antigens as potential immunologic and clinical targets in cancer," *Cancer Res.*, 72.24 (2016): 6351-6361.

Yarchoan, M. et al., "Tumor Mutational Burden and Response Rate to PD-1 Inhibition," *N Engl J Med*, 377.25 (2017): 2500-2501.

Yoshida, T. et al., "Expression patterns of epiplakin1 in pancreas, pancreatic cancer and regenerating pancreas," *Genes to Cells*, 13 (2008): 667-678.

Young, K. et al., "Immunotherapy and pancreatic cancer: unique challenges and potential opportunities," *Therapeutic Advances in Medical Oncology*, 10 (2018): 1-20.

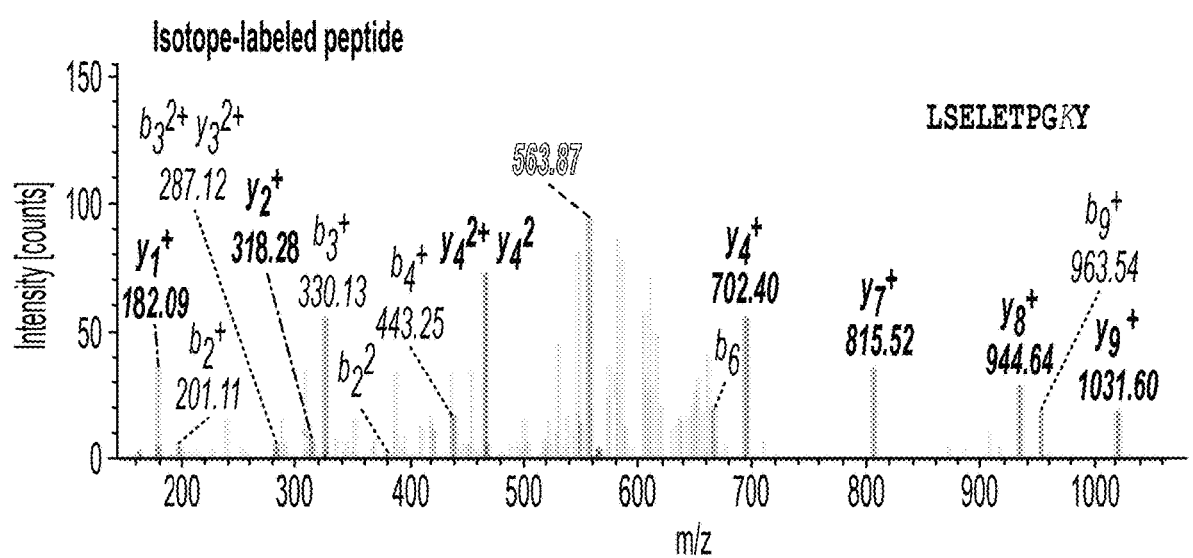
FIG. 1C-cont.

A

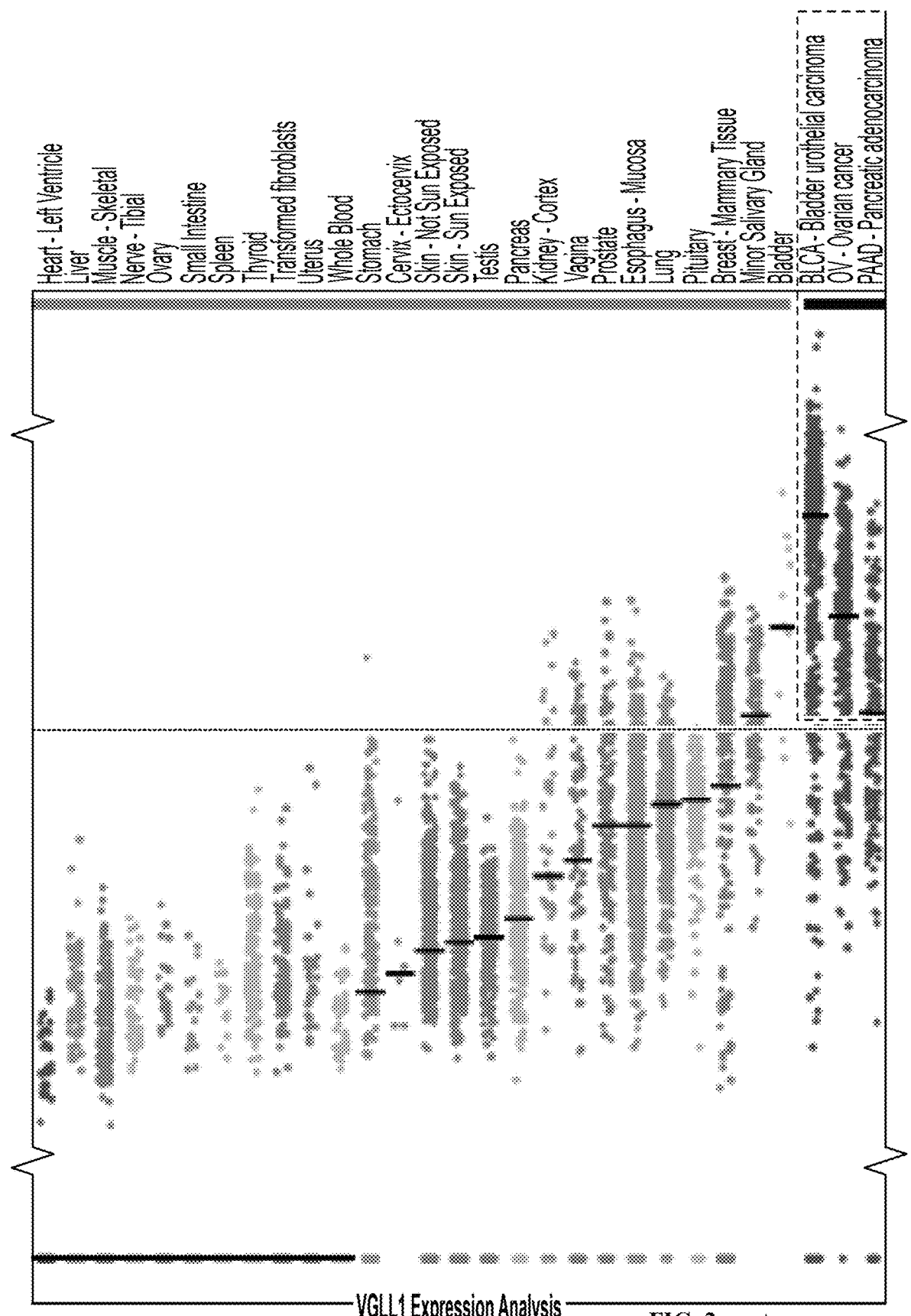
FIG. 2-cont.

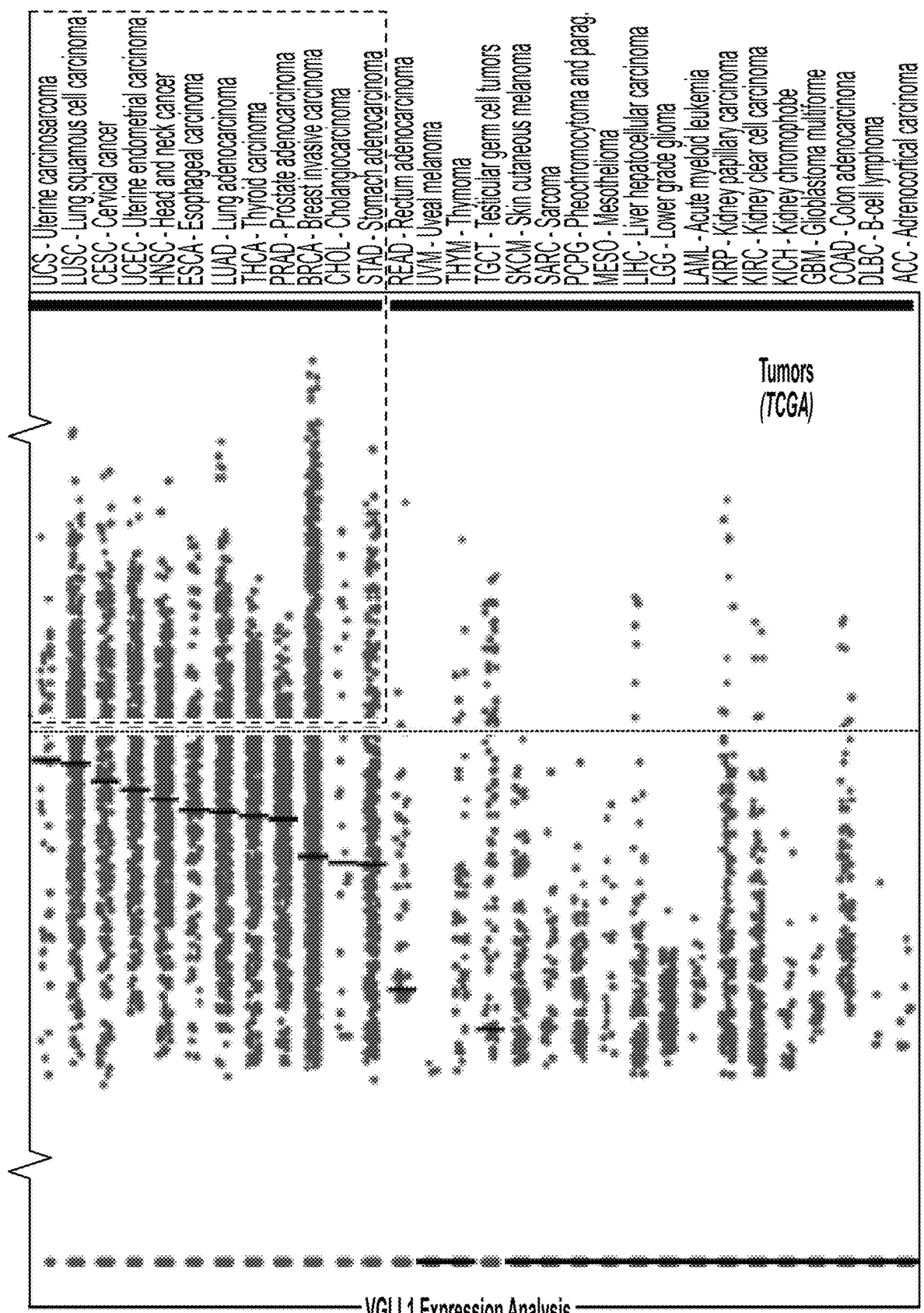
FIG. 2-cont.

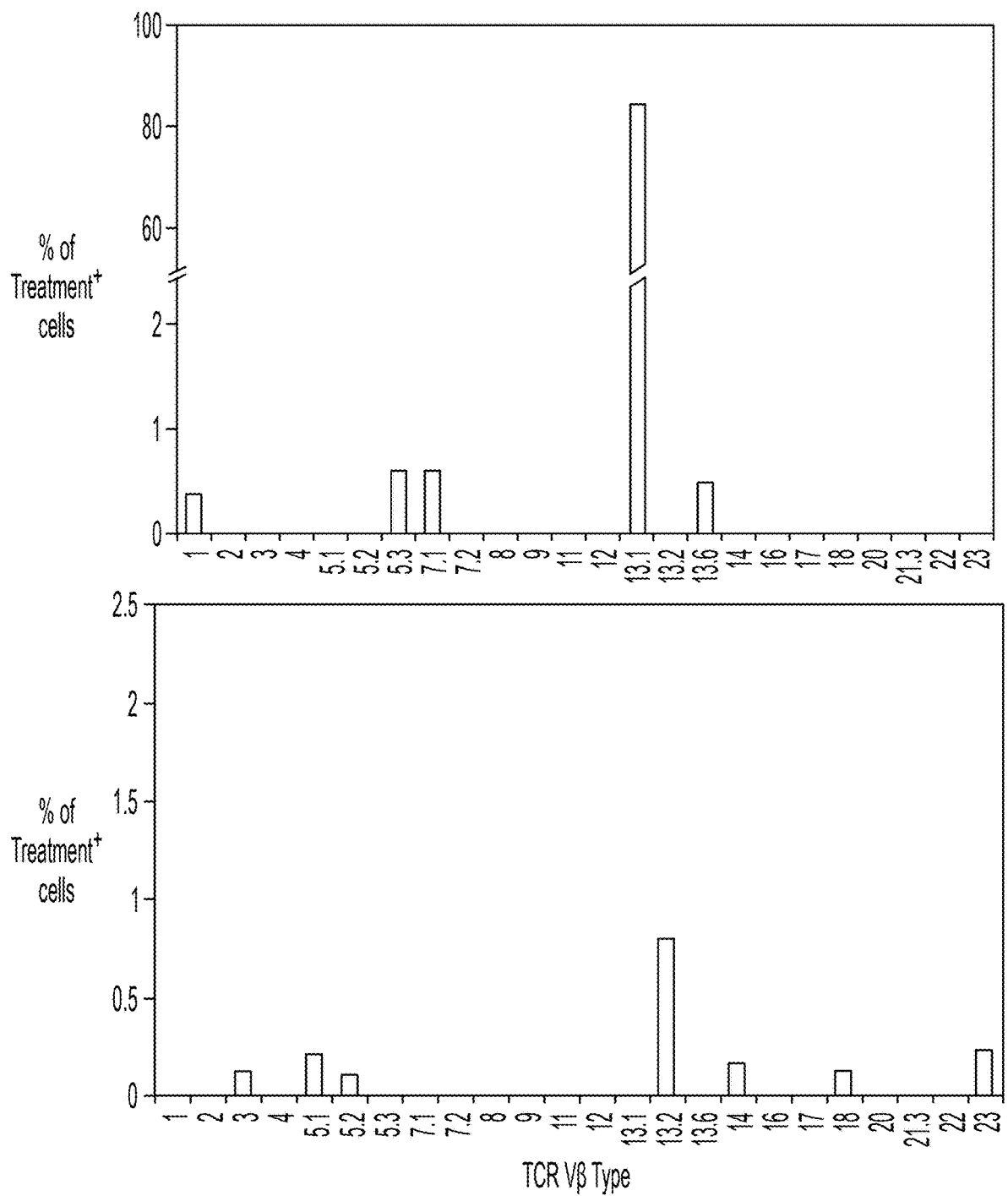
FIG. 13B-cont.

T CELL RECEPTORS WITH VGLL1 SPECIFICITY AND USES THEREOF

PRIORITY CLAIM

This application is a national phase application under 35 U.S.C. § 371 of International Application No. PCT/US2021/033619, filed May 21, 2021, which claims the benefit of U.S. Provisional Patent Application No. 63/028,262, filed May 21, 2020, the entirety of each of which is incorporated herein by reference.

INCORPORATION OF SEQUENCE LISTING

The sequence listing that is contained in the file named "UTFCP1477WO_ST25.txt", which is 58.7 KB (as measured in Microsoft Windows) and was created on May 14, 2021, is filed herewith by electronic submission and is incorporated by reference herein.

BACKGROUND

1. Field

The present invention relates generally to the fields of immunology and medicine. More particularly, it concerns tumor antigen-specific T cell receptors and uses thereof for the treatment of cancer.

2. Description of Related Art

Pancreatic ductal adenocarcinoma (PDAC), the most aggressive form of pancreatic cancer, remains notorious for its poor prognosis and high mortality rate, with its overall 5-year survival rate of 8% being amongst the lowest of all cancer types. Early detection is unusual, with 85% of patients presenting with locally advanced or metastatic disease. Progress towards effective treatment has been slow and the incidence of PDAC-related deaths has continued to rise. Despite some encouraging recent improvements in survival achieved through optimizing the sequencing of surgery and chemotherapy treatment regimens, developing new and effective therapeutic options remains a dire need for advanced-stage PDAC patients (Strobel et al., 2019).

Cytotoxic T lymphocyte (CTL)-based immunotherapies have been successful at inducing objective clinical responses in a variety of cancer types. Checkpoint inhibitor (CPI) therapies that act through non-specific activation of T lymphocytes have made a significant positive impact on long-term patient survival. However, the benefits of CPI have mainly been limited to highly mutated tumor types like melanoma and lung adenocarcinoma that can express a large array of potential neo-antigen peptides in the context of surface HLA molecules (Rizvi et al., 2015). Tumor-infiltrating lymphocyte (TIL) therapy, in which individual cancer patients are re-infused with T cells expanded from their own tumors, has also shown great promise for inducing the regression of bulky tumors. TIL are polyclonal and can recognize both patient-specific neo-antigens as well as shared tumor-associated antigens (TAA) such as melanocyte differentiation antigens (MDA) or cancer-testis antigens (CTA). Targeting of individual validated HLA class I-restricted TAAs through infusion of antigen-specific endogenous T-cells (ETC therapy) or genetically engineered TCR-T cells has also proven successful at inducing clinical responses in patients with melanoma and other solid cancers.

CPI- and CTL-based immunotherapies have unfortunately not shown the same beneficial impact in treating PDAC patients (Young et al., 2018). This lack of success has been attributed to the highly immune suppressive tumor microenvironment (TME) of PDAC, in addition to the relatively low mutational burden that contributes to a dearth of neo-antigen targets (Yarchoan et al., 2017). A number of potentially targetable HLA class I-restricted peptide antigens have been identified in PDAC, most notably those derived from carcinoembryonic antigen-related cell adhesion molecule (CEACAM), mucin 16 (MUC16), mesothelin (MSLN), and mutated KRAS, among others. Although promising, therapies targeting these TAAs have faced inherent limitations, including the induction of toxicities in non-tumor tissues, low prevalence of target antigen expression, or inability to break self-tolerance mechanisms that often hinders the generation of high-affinity CTLs. With limited exceptions, clinical trials targeting these antigens have yielded disappointing results, underscoring the need to identify safe, immunogenic targets that demonstrate higher prevalence in PDAC patients. Thus, there is an unmet medical need for novel T cell-based therapies to additional target antigens for these malignancies.

SUMMARY

In some embodiments, the present disclosure provides VGLL1 T cell receptors (TCRs) and methods for their use, such as in therapies including adoptive T cell therapies. In one embodiment, there is provided an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO: 12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO: 92).

In some aspects, the TCR comprises alpha chain CDR1 (SEQ ID NO:10), CDR2 (SEQ ID NO:11), and CDR3 (SEQ ID NO:12) and beta chain CDR1 (SEQ ID NO:21), CDR2 (SEQ ID NO:22), and CDR3 (SEQ ID NO:23). In certain aspects, the TCR comprises an alpha chain variable region other than the CDRs having at least 90% (e.g., 91%, 92%, 93%, 94%, 95%, 96%, 97, 98%, or 99%) identity to the amino acid sequence of SEQ ID NO:15 and a beta chain variable region other than the CDRs having at least 90% (e.g., 91%, 92%, 93%, 94%, 95%, 96%, 97, 98%, or 99%) identity to the amino acid sequence of SEQ ID NO:20. For example, the variable region comprises the CDRs and the remaining part of the sequence has at least 90% (e.g., 91%, 92%, 93%, 94%, 95%, 96%, 97, 98%, or 99%) sequence identity. In particular aspects, the TCR comprises an alpha chain variable region of SEQ ID NO:15 and a beta chain variable region of amino acid sequence of SEQ ID NO:20. In certain aspects, the TCR comprises an alpha chain variable region other than the CDRs having at least 90% (e.g., 91%, 92%, 93%, 94%, 95%, 96%, 97, 98%, or 99%) identity to the nucleotide sequence of SEQ ID NO:3 and a beta chain variable region other than the CDRs having at least 90%

(e.g., 91%, 92%, 93%, 94%, 95%, 96%, 97, 98%, or 99%) identity to the nucleotide sequence of SEQ ID NO:9. In specific aspects, the TCR comprises an alpha chain variable region comprising the nucleotide sequence of SEQ ID NO:3 and a beta chain comprising the nucleotide sequence of SEQ ID NO:9. In some aspects, the TCR other than the CDRs has at least 90% identity to SEQ ID NO:13. In particular aspects, the TCR comprises SEQ ID NO:13.

In certain aspects, the TCR comprises alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46). In certain aspects, the TCR comprises an alpha chain variable region other than the CDRs having at least 90% (e.g., 91%, 92%, 93%, 94%, 95%, 96%, 97, 98%, or 99%) identity to the amino acid sequence of SEQ ID NO:38 and a beta chain variable region other than the CDRs having at least 90% (e.g., 91%, 92%, 93%, 94%, 95%, 96%, 97, 98%, or 99%) identity to the amino acid sequence of SEQ ID NO:43. In certain aspects, the TCR comprises an alpha chain variable region of SEQ ID NO:38 and a beta chain variable region of amino acid sequence of SEQ ID NO:43. In some aspects, the TCR comprises an alpha chain variable region other than the CDRs having at least 90% (e.g., 91%, 92%, 93%, 94%, 95%, 96%, 97, 98%, or 99%) identity to the nucleotide sequence of SEQ ID NO:26 and a beta chain variable region other than the CDRs having at least 90% (e.g., 91%, 92%, 93%, 94%, 95%, 96%, 97, 98%, or 99%) identity to the nucleotide sequence of SEQ ID NO:32. In some aspects, the TCR comprises an alpha chain variable region comprising the nucleotide sequence of SEQ ID NO:26 and a beta chain variable region comprising the nucleotide sequence of SEQ ID NO:32. In some aspects, the TCR other than the CDRs has at least 90% (e.g., 91%, 92%, 93%, 94%, 95%, 96%, 97, 98%, or 99%) identity to SEQ ID NO:36. In certain aspects, the TCR comprises SEQ ID NO:36.

In certain aspects, the TCR comprises alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69). In some aspects, the TCR comprises an alpha chain variable region other than the CDRs having at least 90% (e.g., 91%, 92%, 93%, 94%, 95%, 96%, 97, 98%, or 99%) identity to the amino acid sequence of SEQ ID NO:61 and a beta chain variable region other than the CDRs having at least 90% (e.g., 91%, 92%, 93%, 94%, 95%, 96%, 97, 98%, or 99%) identity to the amino acid sequence of SEQ ID NO:66. In some aspects, the TCR comprises an alpha chain variable region of SEQ ID NO:61 and a beta chain variable region of amino acid sequence of SEQ ID NO:66. In certain aspects, the TCR comprises an alpha chain variable region other than the CDRs having at least 90% (e.g., 91%, 92%, 93%, 94%, 95%, 96%, 97, 98%, or 99%) identity to the nucleotide sequence of SEQ ID NO:49 and a beta chain variable region other than the CDRs having at least 90% (e.g., 91%, 92%, 93%, 94%, 95%, 96%, 97, 98%, or 99%) identity to the nucleotide sequence of SEQ ID NO:55. In some aspects, the TCR comprises an alpha chain variable region comprising the nucleotide sequence of SEQ ID NO:49 and a beta chain comprising the nucleotide sequence of SEQ ID NO:55. In particular aspects, the TCR other than the CDRs has at least 90% (e.g., 91%, 92%, 93%, 94%, 95%, 96%, 97, 98%, or 99%) identity to SEQ ID NO:59. In specific aspects, the TCR comprises SEQ ID NO:59.

In some aspects, the TCR comprises alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92). In certain aspects, the TCR comprises an alpha chain variable region other than the CDRs having at least 90% (e.g., 91%, 92%, 93%, 94%, 95%, 96%, 97, 98%, or 99%) identity to the amino acid sequence of SEQ ID NO:84 and a beta chain variable region other than the CDRs having at least 90% (e.g., 91%, 92%, 93%, 94%, 95%, 96%, 97, 98%, or 99%) identity to the amino acid sequence of SEQ ID NO:89. In some aspects, the TCR comprises an alpha chain variable region of SEQ ID NO:84 and a beta chain variable region of amino acid sequence of SEQ ID NO:89. In certain aspects, the TCR comprises an alpha chain variable region other than the CDRs having at least 90% (e.g., 91%, 92%, 93%, 94%, 95%, 96%, 97, 98%, or 99%) identity to the nucleotide sequence of SEQ ID NO:72 and a beta chain variable region other than the CDRs having at least 90% (e.g., 91%, 92%, 93%, 94%, 95%, 96%, 97, 98%, or 99%) identity to the nucleotide sequence of SEQ ID NO:78. In some aspects, the TCR comprises an alpha chain variable region comprising the nucleotide sequence of SEQ ID NO:72 and a beta chain comprising the nucleotide sequence of SEQ ID NO:78. In particular aspects, the TCR other than the CDRs has at least 90% (e.g., 91%, 92%, 93%, 94%, 95%, 96%, 97, 98%, or 99%) identity to SEQ ID NO:82. In specific aspects, the TCR comprises SEQ ID NO:82.

In some aspects, the engineered TCR binds HLA-A*0101. In certain aspects, the TCR is further defined as a soluble TCR, wherein the soluble TCR does not comprise a transmembrane domain. In additional aspects, the TCR further comprises a detectable label. In some aspects, the TCR is covalently bound to a therapeutic agent, such as an immunotoxin or a chemotherapeutic agent.

A further embodiment provides a multivalent TCR complex comprising a plurality of TCRs of the present embodiments or aspects, thereof (e.g., an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO:12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92)). In some aspects, the multivalent TCR comprises 2, 3, 4 or more TCRs associated with one another. In certain aspects, the multivalent TCR is present in a lipid bilayer, in a liposome, or is attached to a nanoparticle. In some aspects, the TCRs are associated with one another via a linker molecule.

Another embodiment provides a polypeptide encoding the TCR of the present embodiments or aspects thereof (e.g., an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO:12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92). A further embodiment provides a polynucleotide encoding the polypeptide encoding the TCR of the present embodiments or aspects thereof.

In yet another embodiment, there is provided an expression vector encoding the TCR of the present embodiments or aspects thereof (e.g., an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO: 12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92)). In some aspects, the sequence encoding the TCR is under the control of a promoter. In certain aspects, the expression vector is a viral vector. In some aspects, the viral vector is a retroviral vector. In additional aspects, the vector further encodes a linker domain. For example, the linker domain is positioned between the alpha chain and beta chain.

A further embodiment provides a host cell engineered to express the TCR of the present embodiments or aspects thereof (e.g., an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO:12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92)). In some aspects, the cell is a T cell, NK cell, invariant NK cell, NKT cell, mesenchymal stem cell (MSC), or induced pluripotent stem (iPS) cell. In certain aspects, the host cell is an immune cell. In particular aspects, the host cell is isolated from an umbilical cord. In some aspects, the T cell is a CD8$^+$ T cell, CD4+ T cell, or γδ T cell. In particular aspects, the T cell is a regulatory T cell (Treg). In some aspects, the cell is autologous. In certain aspects, the cell is allogeneic.

Another embodiment provides a method for engineering the host cell of the present embodiments or aspects thereof comprising contacting said immune cell with the TCR of the present embodiments or aspects thereof (e.g., an engineered T cell receptor (TCR), wherein the TCR specifically binds Vestigial-like 1 (VGLL1) and comprises: (a) alpha chain CDR1 (SEQ ID NO:10), CDR2 (SEQ ID NO:11), and CDR3 (SEQ ID NO: 12) and beta chain CDR1 (SEQ ID NO:21), CDR2 (SEQ ID NO:22), and CDR3 (SEQ ID NO:23); (b) alpha chain CDR1 (SEQ ID NO:33), CDR2 (SEQ ID NO:34), and CDR3 (SEQ ID NO:35) and beta chain CDR1 (SEQ ID NO:44), CDR2 (SEQ ID NO:45), and CDR3 (SEQ ID NO:46); (c) alpha chain CDR1 (SEQ ID NO:56), CDR2 (SEQ ID NO:57), and CDR3 (SEQ ID NO:58) and beta chain CDR1 (SEQ ID NO:67), CDR2 (SEQ ID NO:68), and CDR3 (SEQ ID NO:69); or (d) alpha chain CDR1 (SEQ ID NO:79), CDR2 (SEQ ID NO:80), and CDR3 (SEQ ID NO:81) and beta chain CDR1 (SEQ ID NO:90), CDR2 (SEQ ID NO:91), and CDR3 (SEQ ID NO:92)) or the expression vector of any one of the present embodiments or aspects thereof. In some aspects, the immune cell is a T cell, or a peripheral blood lymphocyte. In certain aspects, contacting is further defined as transfecting or transducing. In some aspects, transfecting comprises electroporating RNA encoding the TCR of the present embodiments or aspects thereof into the immune cell. In some aspects, the method further comprises generating viral supernatant from the expression vector prior to transducing the immune cell. In some aspects, the immune cell is a stimulated lymphocyte, such as a human lymphocyte. In particular aspects, stimulating comprises contacting the immune cell with or incubating the immune cell in OKT3 and/or IL-2. In additional aspects, the method further comprises sorting the immune cells to isolate TCR engineered T cells. In some aspects, the method further comprises performing T cell cloning by serial dilution. In specific aspects, the method further comprises expansion of the T cell clone by the rapid expansion protocol.

A further embodiment provides a method of treating cancer in a subject comprising administering an effective amount of the TCR-engineered cells of the present embodiments or aspects thereof to the subject. In some aspects, the subject is identified to have an HLA-A*0101 allele. In certain aspects, the TCR-engineered cell is a T cell or peripheral blood lymphocyte. In particular aspects, the T cell is a CD8$^+$ T cell, CD4$^+$ T cell, or Treg. In some aspects, the cancer is pancreatic cancer, ovarian cancer, gastric cancer, breast cancer, bladder cancer, uterine cancer, or cervical cancer. In certain aspects, the subject is a human. In some aspects, the TCR engineered cells are autologous. In certain aspects, the TCR engineered cells are allogeneic. In additional aspects, the method further comprises lymphodepletion of the subject prior to administration of the VGLL1-specific T cells. For example, lymphodepletion comprises administration of cyclophosphamide and/or fludarabine. In additional aspects, the method further comprises administering a second anticancer therapy. In some aspects, the therapy is a chemotherapy, immunotherapy, surgery, radiotherapy, or biotherapy. In certain aspects, the TCR-engineered cells, and/or the at least a second therapeutic agent are administered intravenously, intraperitoneally, intratracheally, intratumorally, intramuscularly, endoscopically, intralesionally, percutaneously, subcutaneously, regionally, or by direct injection or perfusion. In some aspects, the subject is determined to have cancer cells which overexpress VGLL1.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

(FIG. 1A) Experimental strategy to identify PDAC tumor-specific, HLA class I-bound peptides from 39 tumor specimens derived from 35 M.D. Anderson PDAC patients. (FIG. 1B) Bioinformatics screening strategy to identify potentially targetable TAAs from amongst the eluted PDAC-associated peptides. Peptide-encoding genes were assessed for PDAC tumor RNAseq expression compared with transcript expression in 42 GTex Portal normal tissues. Excluding testis, normal tissues were separated into 4 categories (non-essential, caution, hazard, and danger tissues) that reflected the potential toxicities expected from off-tumor killing activity against different tissues. All peptide-encoding genes were filtered successively using four corresponding expression thresholds of increasing stringency (30, 10, 3, and 1 TPM, indicated by left dotted lines) to eliminate candidate TAAs most likely to elicit autoimmune toxicity in the context of CTL therapy (right dotted lines). Screening of high-confidence peptides isolated from tumor organoid cell lines of PDAC patients MP015 and MP081 is depicted, showing that few eluted peptides met these stringent criteria. (FIG. 1C) Mass spectra of an HLA-A*0101-restricted VGLL1-derived peptide isolated from two different PDAC organoid cell lines, MP015 and MP081 (top 2 panels). The patient-derived peptides co-eluted with and matched the MS fragmentation spectra of the synthetic isotope-labeled VGLL1 peptide LSELETPGKY (SEQ ID NO:93) (containing a $^{13}C/^{15}N$-labeled lysine residue), with the labeled $y^+$ fragment ion series demonstrating an expected shift of 8 atomic mass units (bottom panel).

(FIG. 4A) Schematic outlining the experimental procedure for generating VGLL1-specific CD8$^+$ T-cells from human donor PBMCs. (FIG. 4B) PBMC isolated from PDAC Patient MP015 by leukapheresis were stimulated with autologous LSELETPGKY (SEQ ID NO: 93) peptide-pulsed dendritic cells (DCs). After two stimulations (top row), CD8$^+$ and VGLL1 tetramer-positive cells were sorted and expanded using a standard rapid expansion protocol (REP). VGLL1-specific T-cells were re-sorted and expanded a second time due to low numbers of antigen-specific cells following the first REP. The second REP yielded 19.6×10$^9$ VGLL1-specific CTLs, which Patient MP015 safely received as an infusion under a personalized ETC therapy Compassionate IND protocol. (FIG. 4C) TCR repertoire analysis of expanded VGLL1-specific CTLs was performed using Vβ antibodies corresponding to 24 different specificities. (FIG. 4D) VGLL1-specific T-cells expanded from Patient MP015 were tested for functionality in a standard $^{51}$Cr release assay to assess specific lysis of Mel888 melanoma cells (VGLL1-negative HLA-A*0101-positive) pulsed with titrated amounts of LSELETPGKY (SEQ ID NO: 93) peptide at a 5:1 effector-to-target (E:T) ratio.

(FIG. 5A) Expanded VGLL1-specific CD8$^+$ T cells from Patient MP015 were co-cultured with a panel of HLA-A*0101-positive PDAC tumor cell lines in a standard $^{51}$Cr release assay to measure cytotoxic activity at different effector-to-target (E:T) cell ratios. WM793 melanoma cells (VGLL1-negative HLA-A*0101-positive) were used as a negative control line. VGLL1-CTLs robustly killed the autologous organoid cell line MP015 from which the VGLL1 peptide was originally isolated, and also demonstrated cytotoxic activity against four allogeneic, HLA-A*0101-expressing PDAC cell lines. Results show the means and standard deviations of six replicate samples, and data is representative of a minimum of 4 replicate experiments. (FIG. 5B) Western blot analysis showing expression of VGLL1 protein in all five PDAC cell lines tested.

(FIG. 6A) VGLL1-specific CD8$^+$ T cells were co-cultured with 13 different HLA-A*0101-expressing tumor cell lines derived from ovarian, lung, breast, bladder, or gastric cancer in a standard $^{51}$Cr release assay to measure cytotoxic activity at different effector-to-target (E:T) cell ratios. Five HLA-A*0101-negative cell lines (EBC1, HT1197, HT1376, GT-5, and MKN74) were lentivirally transduced to stably express HLA-A*0101; VGLL1-CTL killing of the parental cell lines (grey lines) are shown in comparison to HLA-A*0101-transduced counterparts (black lines). (FIG. 6B) Western blot analysis showing VGLL1 protein expression in tumor cell lines derived from ovarian, lung, breast, bladder or gastric cancers. (FIG. 6C) VGLL1-specific CTLs were co-cultured with HLA-A*0101-expressing primary tissue cells derived from bladder, breast, lung airway, or skin melanocytes in a standard $^{51}$Cr release assay to measure cytotoxic activity. VGLL1-CTL assay results show the means and standard deviations of six replicate samples, and data is representative of a minimum of 2 replicate experiments. (FIG. 6D) VGLL1 protein expression in primary cell lines as assessed by Western blot analysis.

(FIG. 13A) Induction of VGLL1-specific CD8 T cells from PBMC of two healthy donors. HLA-A*0101-expressing donor PBMC were stimulated twice with LSELETPGKY (SEQ ID NO: 93) peptide-pulsed dendritic cells over 2 weeks. VGLL1 tetramer-positive CD8+ T cells were sorted by ARIA sorter (top panels) and the sorted T cells were expanded using a standard rapid expansion protocol (REP). (FIG. 13B) TCR repertoire analysis of expanded VGLL1-specific CTLs was performed using Vβ antibodies corresponding to 24 different specificities.

DESCRIPTION OF ILLUSTRATIVE EMBODIMENTS

Figure 1A:
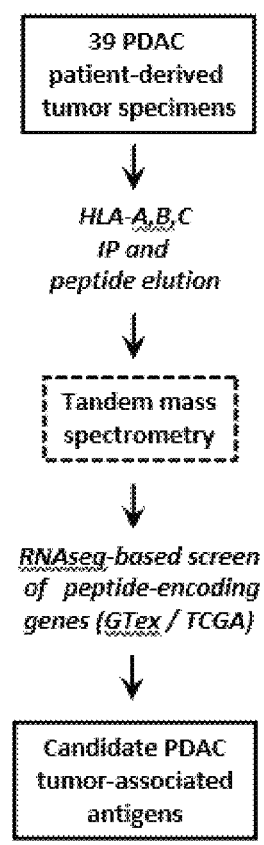
FIGS. 1A-1C: Immunopeptidome analysis reveals a VGLL1-derived peptide expressed by two PDAC patient-derived organoid lines.

Cytotoxic T lymphocyte (CTL)-based cancer immunotherapies have shown great promise for inducing clinical regression by targeting tumor-associated antigens (TAA). To expand the TAA landscape of pancreatic ductal adenocarcinoma (PDAC), tandem mass spectrometry analysis of HLA class I-bound peptides was performed from tumor specimens of 35 PDAC patients. This led to the identification of a shared HLA-A*0101 restricted peptide derived from co-transcriptional activator Vestigial-like 1 (VGLL1), a novel putative TAA demonstrating overexpression in multiple tumor types and low or absent transcript expression in essential normal tissues. VGLL1-specific CTLs were isolated and expanded from the blood of a male PDAC patient showed the capacity to recognize and kill in an antigen-specific manner a majority of HLA-A*0101 allogeneic tumor cell lines derived not only from PDAC, but also bladder, ovarian, gastric, lung and basal-like breast cancers. Gene expression profiling revealed that VGLL1 is a member of a unique group of cancer-placenta antigens (CPA) that may constitute immunotherapeutic TAA targets for patients with multiple different cancer types. The studies identified VGLL1 as a tumor-associated antigen from a pancreatic elution as described in International Patent Publication No. WO2018/067869; incorporated herein in its entirety.

Using these peptide epitopes, antigen-specific cytotoxic T lymphocytes (CTLs) were generated from pancreatic patient peripheral blood mononuclear cells (PBMCs) that recognized the endogenously-presented antigen on HLA-matched allogeneic tumor cell lines, leading to tumor cell killing. T cell receptors (TCRs) from these antigen-specific CTLs were cloned and sequenced, and can in various incarnations represent powerful tools with which to target cancer, such as pancreatic, ovarian, gastric, and breast tumors, in cancer patients. Thus, these VGLL1-specific TCRs provided herein may be used to target solid cancers (e.g., pancreatic, ovarian, gastric, and breast cancer).

Accordingly, the present disclosure provides TCRs (e.g., SEQ ID NOs:1-92) that specifically bind VGLL1, such as the VGLL1 peptide epitope (LSELETPGKY: SEQ ID NO:93). The present disclosure also provides nucleotide sequences encoding these TCRs, expression vectors comprising the nucleotide sequences which can be used to modify naïve T cells and generate VGLL1-specific T cells. The present disclosure further provides the use of VGLL1-specific T cells for therapy, such as adoptive cell therapy for cancer patients, such as HLA-A*0101-positive cancer patients, whose malignant cells express VGLL1 antigen. The antigen-specific T cells, such as CTLs, provided herein may be used to target solid cancers.

I. Definitions

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

The term "essentially" is to be understood that methods or compositions include only the specified steps or materials and those that do not materially affect the basic and novel characteristics of those methods and compositions.

As used herein, a composition or media that is "substantially free" of a specified substance or material contains ≤30%, ≤20%, ≤15%, more preferably ≤10%, even more preferably ≤5%, or most preferably ≤1% of the substance or material.

The terms "substantially" or "approximately" as used herein may be applied to modify any quantitative comparison, value, measurement, or other representation that could permissibly vary without resulting in a change in the basic function to which it is related.

The term "about" means, in general, within a standard deviation of the stated value as determined using a standard analytical technique for measuring the stated value. The terms can also be used by referring to plus or minus 5% of the stated value.

"Treatment" and "treating" refer to administration or application of a therapeutic agent to a subject or performance of a procedure or modality on a subject for the purpose of obtaining a therapeutic benefit of a disease or health-related condition. For example, a treatment may include administration of a T cell therapy.

"Subject" and "patient" refer to either a human or non-human, such as primates, mammals, and vertebrates. In particular embodiments, the subject is a human.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the size of a tumor, a reduction in the invasiveness of a tumor, reduction in the growth rate of the cancer, or prevention of metastasis. Treatment of cancer may also refer to prolonging survival of a subject with cancer.

An "anti-cancer" agent is capable of negatively affecting a cancer cell/tumor in a subject, for example, by promoting killing of cancer cells, inducing apoptosis in cancer cells, reducing the growth rate of cancer cells, reducing the incidence or number of metastases, reducing tumor size, inhibiting tumor growth, reducing the blood supply to a tumor or cancer cells, promoting an immune response against cancer cells or a tumor, preventing or inhibiting the progression of cancer, or increasing the lifespan of a subject with cancer.

The phrases "pharmaceutical or pharmacologically acceptable" refers to molecular entities and compositions that do not produce an adverse, allergic, or other untoward reaction when administered to an animal, such as a human, as appropriate. The preparation of a pharmaceutical composition comprising an antibody or additional active ingredient will be known to those of skill in the art in light of the present disclosure. Moreover, for animal (e.g., human) administration, it will be understood that preparations should meet sterility, pyrogenicity, general safety, and purity standards as required by FDA Office of Biological Standards.

As used herein, "pharmaceutically acceptable carrier" includes any and all aqueous solvents (e.g., water, alcoholic/aqueous solutions, saline solutions, parenteral vehicles, such as sodium chloride, Ringer's dextrose, etc.), non-aqueous solvents (e.g., propylene glycol, polyethylene glycol, vegetable oil, and injectable organic esters, such as ethyloleate), dispersion media, coatings, surfactants, antioxidants, preservatives (e.g., antibacterial or antifungal agents, anti-oxidants, chelating agents, and inert gases), isotonic agents, absorption delaying agents, salts, drugs, drug stabilizers, gels, binders, excipients, disintegration agents, lubricants, sweetening agents, flavoring agents, dyes, fluid and nutrient replenishers, such like materials and combinations thereof, as would be known to one of ordinary skill in the art. The pH and exact concentration of the various components in a pharmaceutical composition are adjusted according to well-known parameters.

The term "unit dose" or "dosage" refers to physically discrete units suitable for use in a subject, each unit containing a predetermined quantity of the therapeutic composition calculated to produce the desired responses discussed above in association with its administration, i.e., the appropriate route and treatment regimen. The quantity to be administered, both according to number of treatments and unit dose, depends on the effect desired. The actual dosage amount of a composition of the present embodiments administered to a patient or subject can be determined by physical and physiological factors, such as body weight, the age, health, and sex of the subject, the type of disease being treated, the extent of disease penetration, previous or concurrent therapeutic interventions, idiopathy of the patient, the route of administration, and the potency, stability, and toxicity of the particular therapeutic substance. For example, a dose may also comprise from about 1 µg/kg/body weight to about 1000 mg/kg/body weight (this such range includes intervening doses) or more per administration, and any range derivable therein. In non-limiting examples of a derivable range from the numbers listed herein, a range of about 5 µg/kg/body weight to about 100 mg/kg/body weight, about 5 µg/kg/body weight to about 500 mg/kg/body weight, etc., can be administered. The practitioner responsible for administration will, in any event, determine the concentration of active ingredient(s) in a composition and appropriate dose(s) for the individual subject. In some embodiments, the dosage of antigen-specific T cell infusion may comprise about 100 million to about 30 billion cells, such as 10, 15, or 20 billion cells.

The terms "tumor-associated antigen," "tumor antigen" and "cancer cell antigen" are used interchangeably herein. In each case, the terms refer to proteins, glycoproteins or carbohydrates that are specifically or preferentially expressed by cancer cells.

The term "chimeric antigen receptors (CARs)," as used herein, may refer to artificial T-cell receptors, chimeric T-cell receptors, or chimeric immunoreceptors, for example, and encompass engineered receptors that graft an artificial specificity onto a particular immune effector cell. CARs may be employed to impart the specificity of a monoclonal antibody onto a T cell, thereby allowing a large number of specific T cells to be generated, for example, for use in adoptive cell therapy. In specific embodiments, CARs direct specificity of the cell to a tumor associated antigen, for example. In some embodiments, CARs comprise an intracellular activation domain, a transmembrane domain, and an extracellular domain comprising a tumor associated antigen binding region. In particular aspects, CARs comprise fusions of single-chain variable fragments (scFv) derived from monoclonal antibodies, fused to CD3-zeta a transmembrane domain and endodomain. The specificity of other CAR designs may be derived from ligands of receptors (e.g., peptides) or from pattern-recognition receptors, such as Dectins. In certain cases, the spacing of the antigen-recognition domain can be modified to reduce activation-induced cell death. In certain cases, CARs comprise domains for additional co-stimulatory signaling, such as CD3ζ, FcR, CD27, CD28, CD137, DAP10, and/or OX40. In some cases, molecules can be co-expressed with the CAR, including co-stimulatory molecules, reporter genes for imaging (e.g., for positron emission tomography), gene products that conditionally ablate the T cells upon addition of a pro-drug, homing receptors, chemokines, chemokine receptors, cytokines, and cytokine receptors.

A polynucleotide or polynucleotide region (or a polypeptide or polypeptide region) has a certain percentage (for example, 80%, 85%, 90%, or 95%) of "sequence identity" or "homology" to another sequence means that, when aligned, that percentage of bases (or amino acids) are the same in comparing the two sequences. This alignment and the percent homology or sequence identity can be determined using software programs known in the art, for example those described in CURRENT PROTOCOLS IN MOLECULAR BIOLOGY (F. M. Ausubel et al., eds., 1987) Supplement 30, section 7.7.18, Table 7.7.1. Preferably, default parameters are used for alignment. A preferred alignment program is BLAST, using default parameters. In particular, preferred programs are BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR.

II. VGLL1 TCR Methods and Compositions

In some embodiments, the present disclosure provides VGLL1-specific TCRs. The TCR may comprise alpha chain CDRs of SEQ ID NOs:16-19, 39-41, 62-64, or 86-87 and/or beta chain CDRs of SEQ ID NOs:21-23, 44-46, 67-69, or 90-92. The TCR may comprise an alpha variable chain with at least 90%, 91%, 92%, 93%, 94%, 95%, 96%, 97%, 98%, 99%, or 100%, identity or similarity to SEQ ID NOs:15, 38, 61, or 84 and/or a beta variable chain with at least 90%, 91%, 92%, 93%, 94%, 95%, 96%, 97%, 98%, 99%, or 100%, identity or similarity to SEQ ID NOs:20, 43, 66, or 89. The TCR may comprise an amino acid sequence with at least 90%, 91%, 92%, 93%, 94%, 95%, 96%, 97%, 98%, 99%, or 100%, identity or similarity to SEQ ID NOs:13, 36, 59, or 82.

Also provided herein are polynucleotides encoding the alpha chain and/or beta chain of the VGLL1 TCRs provided herein. Polynucleotides encoding the present TCRs may comprise alpha chain CDRs of SEQ ID NOs:4-6, 27-29, 50-52, or 73-75 and/or beta chain CDRs of SEQ ID NOs: 10-12, 33-35, 56-58, or 79-81. The TCR may be encoded by an alpha chain with at least 90%, 91%, 92%, 93%, 94%, 95%, 96%, 97%, 98%, 99%, or 100%, identity or similarity to SEQ ID NOs:1, 24, 47, or 70 and/or a beta chain with at least 90%, 91%, 92%, 93%, 94%, 95%, 96%, 97%, 98%, 99%, or 100%, identity or similarity to SEQ ID NOs:7, 30, 53, or 76. The TCR may be encoded by an alpha variable chain with at least 90%, 91%, 92%, 93%, 94%, 95%, 96%, 97%, 98%, 99%, or 100%, identity or similarity to SEQ ID NOs:3, 26, 49, or 72 and/or a beta variable chain with at least 90%, 91%, 92%, 93%, 94%, 95%, 96%, 97%, 98%, 99%, or 100%, identity or similarity to SEQ ID NOs:9, 32, 55, or 78.

The antigen binding region of the present TCRs may be included in a chimeric antigen receptor (CAR) as the extracellular domain comprising an antigen binding region. The TCR may be transfected into cells (e.g., autologous or allogeneic cells) that may be used in an adoptive cell transfer therapy. In some embodiments, the CAR is humanized to reduce immunogenicity (hCAR).

VGLL1 TCR sequences are provided below.

```
VGLL1 TCR #1 TRAV19*01 J56*01/TRBVC1
5-6*01 J1-1 Alpha Chain
                                    (SEQ ID NO: 1)
TCTAGACCGCCATGGGTCGACGCCACCATGAACATGCTGACTGCC
```

-continued

AGCCTGTTGAGGGCAGTCATAGCCTCCATCTGTGTTGTATCCAGC
ATGGCTCAGAAGGTAACTCAAGCGCAGACTGAAATTTCTGTGGTG
GAGAAGGAGGATGTGACCTTGGACTGTGTGTATGAAACCCGTGAT
ACTACTTATTACTTATTCTGGTACAAGCAACCACCAAGTGGAGAA
TTGGTTTTCCTTATTCGTCGGAACTCTTTTGATGAGCAAAATGAA
ATAAGTGGTCGGTATTCTTGGAACTTCCAGAAATCCACCAGTTCC
TTCAACTTCACCATCACAGCCTCACAAGTCGTGGACTCAGCAGTA
TACTTCTGTGCTCTGAGTCCTGGAGCCAATAGTAAGCTGACATTT
GGAAAAGGAATAACTCTGAGTGTTAGACCAGATATCCAGAACCCT
GACCCTGCCGTGTACCAGCTGAGAGACTCTAAATCCAGTGACAAG
TCTGTCTGCCTATTCACCGATTTTGATTCTCAAACAAATGTGTCA
CAAAGTAAGGATTCTGATGTGTATATCACAGACAAAACTGTGCTA
GACATGAGGTCTATGGACTTCAAGAGCAACAGTGCTGTGGCCTGG
AGCAACAAATCTGACTTTGCATGTGCAAACGCCTTCAACAACAGC
ATTATTCCAGAAGACACCTTCTTCCCCAGCCCAGAAAGTTCCTGT
GATGTCAAGCTGGTCGAGAAAAGCTTTGAAACAGATACGAACCTA
AACTTTCAAAACCTGTCAGTGATTGGGTTCCGAATCCTCCTCCTG
AAAGTGGCCGGGTTTAATCTGCTCATGACGCTGCGGCTGTGGTCC
AGC

VGLL1 TCR #1 Alpha Chain Signal peptide
                                      (SEQ ID NO: 2)
ATGAACATGCTGACTGCCAGCCTGTTGAGGGCAGTCATAGCCTCC
ATCTGTGTTGTATCCAGCATGGCT VGLL1 TCR #1 Alpha Chain V-region
                                      (SEQ ID NO: 3)
CAGAAGGTAACTCAAGCGCAGACTGAAATTTCTGTGGTGGAGAAG
GAGGATGTGACCTTGGACTGTGTGTATGAAACCCGTGATACTACT
TATTACTTATTCTGGTACAAGCAACCACCAAGTGGAGAATTGGTT
TTCCTTATTCGTCGGAACTCTTTTGATGAGCAAAATGAAATAAGT
GGTCGGTATTCTTGGAACTTCCAGAAATCCACCAGTTCCTTCAAC
TTCACCATCACAGCCTCACAAGTCGTGGACTCAGCAGTATACTTC
TGTGCTCTGAGTCCTGGAGCCAATAGTAAGCTGACATTTGGAAAA
GGAATAACTCTGAGTGTTAGACCAG VGLL1 TCR #1 Alpha Chain CDR1
                                      (SEQ ID NO: 4)
ACCCGTGATACTACTTATTAC VGLL1 TCR #1 Alpha Chain CDR2
                                      (SEQ ID NO: 5)
CGGAACTCTTTTGATGAGCAAAAT VGLL1 TCR #1 Alpha Chain CDR3
                                      (SEQ ID NO: 6)
TGTGCTCTGAGTCCTGGAGCCAATAGTAAGCTGACATTT VGLL1 TCR #1 Beta Chain
                                      (SEQ ID NO: 7)
ATGGGCCCCGGGCTCCTCTGCTGGGCACTGCTTTGTCTCCTGGGA
GCAGGCTTAGTGGACGCTGGAGTCACCCAAAGTCCCACACACCTG
ATCAAAACGAGAGGACAGCAAGTGACTCTGAGATGCTCTCCTAAG -continued TCTGGGCATGACACTGTGTCCTGGTACCAACAGGCCCTGGGTCAG
GGGCCCCAGTTTATCTTTCAGTATTATGAGGAGGAAGAGAGACAG
AGAGGCAACTTCCCTGATCGATTCTCAGGTCACCAGTTCCCTAAC
TATAGCTCTGAGCTGAATGTGAACGCCTTGTTGCTGGGGGACTCG
GCCCTCTATCTCTGTGCCAGCAGCGTCGGGACAGGTATCACTGAA
GCTTTCTTTGGACAAGGCACCAGACTCACAGTTGTAGAGGACCTG
AACAAGGTGTTCCCACCCGAGGTCGCTGTGTTTGAGCCATCAGAA
GCAGAGATCTCCCACACCCAAAAGGCCACACTGGTGTGCCTGGCC
ACAGGCTTCTTCCCTGACCACGTGGAGCTGAGCTGGTGGGTGAAT
GGGAAGGAGGTGCACAGTGGGGTCAGCACGGACCCGCAGCCCCTC
AAGGAGCAGCCCGCCCTCAATGACTCCAGATACTGCCTGAGCAGC
CGCCTGAGGGTCTCGGCCACCTTCTGGCAGAACCCCCGCAACCAC
TTCCGCTGTCAAGTCCAGTTCTACGGGCTCTCGGAGAATGACGAG
TGGACCCAGGATAGGGCCAAACCCGTCACCCAGATCGTCAGCGCC
GAGGCCTGGGGTAGAGCAGACTGTGGCTTTACCTCGGTGTCCTAC
CAGCAAGGGGTCCTGTCTGCCACCATCCTCTATGAGATCCTGCTA
GGGAAGGCCACCCTGTATGCTGTGCTGGTCAGCGCCCTTGTGTTG
ATGGCCATGGTCAAGAGAAAGGATTTCTGACTCGAGAAGCTTGCG
GCCGCGGATCCGATAAAATAA VGLL1 TCR #1 Beta Chain Signal peptide
                                      (SEQ ID NO: 8)
ATGGGCCCCGGGCTCCTCTGCTGGGCACTGCTTTGTCTCCTGGGA
GCAGGCTTAGTGGACGCT VGLL1 TCR #1 Beta Chain V-region
                                      (SEQ ID NO: 9)
GGAGTCACCCAAAGTCCCACACACCTGATCAAAACGAGAGGACAG
CAAGTGACTCTGAGATGCTCTCCTAAGTCTGGGCATGACACTGTG
TCCTGGTACCAACAGGCCCTGGGTCAGGGGCCCCAGTTTATCTTT
CAGTATTATGAGGAGGAAGAGAGACAGAGAGGCAACTTCCCTGAT
CGATTCTCAGGTCACCAGTTCCCTAACTATAGCTCTGAGCTGAAT
GTGAACGCCTTGTTGCTGGGGGACTCGGCCCTCTATCTCTGTGCC
AGCAGCGTCGGGACAGGTATCACTGAAGCTTTCTTTGGACAAGGC
ACCAGACTCACAGTTGTAG VGLL1 TCR #1 Beta Chain CDR1
                                      (SEQ ID NO: 10)
TCTGGGCATGACACT VGLL1 TCR #1 Beta Chain CDR2
                                      (SEQ ID NO: 11)
TATTATGAGGAGGAAGAG VGLL1 TCR #1 Beta Chain CDR3
                                      (SEQ ID NO: 12)
TGTGCCAGCAGCGTCGGGACAGGTATCACTGAAGCTTTCTTT VGLL1 TCR #1 Amino Acid Sequence
                                      (SEQ ID NO: 13)
MNMLTASLLRAVIASICVVSSMAQKVTQAQTEISVVEKEDVTLDC
VYETRDTTYYLFWYKQPPSGELVFLIRRNSFDEQNEISGRYSWNF

```
QKSTSSFNFTITASQVVDSAVYFCALSPGANSKLTFGKGITLSVR

PDIQNPDPAVYQLRDSKSSDKSVCLFTDFDSQTNVSQSKDSDVYI

TDKTVLDMRSMDFKSNSAVAWSNKSDFACANAFNNSIIPEDTFFP

SPESSCDVKLVEKSFETDTNLNFQNLSVIGFRILLLKVAGFNLLM

TLRLWSSRAKRSGSGATNFSLLKQAGDVEENPGPMGPGLLCWALL

CLLGAGLVDAGVTQSPTHLIKTRGQQVTLRCSPKSGHDTVSWYQQ

ALGQGPQFIFQYYEEEERQRGNFPDRFSGHQFPNYSSELNVNALL

LGDSALYLCASSVGTGITEAFFGQGTRLTVVEDLNKVFPPEVAVF

EPSEAEISHTQKATLVCLATGFFPDHVELSWWVNGKEVHSGVSTD

PQPLKEQPALNDSRYCLSSRLRVSATFWQNPRNHFRCQVQFYGLS

ENDEWTQDRAKPVTQIVSAEAWGRADCGFTSVSYQQGVLSATILY

EILLGKATLYAVLVSALVLMAMVKRKDF

VGLL1 TCR #1 Alpha Chain Signal peptide
                                   (SEQ ID NO: 14)
MNMLTASLLRAVIASICVVSSM VGLL1 TCR #1 Alpha Chain V-region
                                   (SEQ ID NO: 15)
AQKVTQAQTEISVVEKEDVTLDCVYETRDTTYYLFWYKQPPSGEL

VFLIRRNSFDEQNEISGRYSWNFQKSTSSFNFTITASQVVDSAVY

FCALSPGANSKLTFGKGITLSVRPDIQ

VGLL1 TCR #1 Alpha Chain CDR1
                                   (SEQ ID NO: 16)
TRDTTYY VGLL1 TCR #1 Alpha Chain CDR2
                                   (SEQ ID NO: 17)
RNSFDEQN VGLL1 TCR #1 Alpha Chain CDR3
                                   (SEQ ID NO: 18)
CALSPGANSKLTF VGLL1 TCR #1 Beta Chain Signal peptide
                                   (SEQ ID NO: 19)
MGPGLLCWALLCLLG VGLL1 TCR #1 Beta Chain V-region
                                   (SEQ ID NO: 20)
AGLVDAGVTQSPTHLIKTRGQQVTLRCSPKSGHDTVSWYQQALGQ

GPQFIFQYYEEEERQRGNFPDRFSGHQFPNYSSELNVNALLLGDS

ALYLCASSVGTGITEAFFGQGTRLTVVE

VGLL1 TCR #1 Beta Chain CDR1
                                   (SEQ ID NO: 21)
SGHDT VGLL1 TCR #1 Beta Chain CDR2
                                   (SEQ ID NO: 22)
YYEEEE VGLL1 TCR #1 Beta Chain CDR3
                                   (SEQ ID NO: 23)
CASSVGTGITEAFF VGLL1 TCR#2 TRAV13-1*02 J10/TRBVC1 5-6*01
J1-1 Alpha Chain
                                   (SEQ ID NO: 24)
TCTAGACCGCCATGGGTCGACGCCACCATGACATCCATTCGAGCT

GTATTTATATTCCTGTGGCTGCAGCTGGACTTGGTGAATGGAGAG

AATGTGGAGCAGCATCCTTCAACCCTGAGTGTCCAGGAGGGAGAC

AGCGCTGTTATCAAGTGTACTTATTCAGACAGTGCCTCAAACTAC

TTCCCTTGGTATAAGCAAGAACTTGGAAAAAGACCTCAGCTTATT

ATAGACATTCGTTCAAATGTGGGCGAAAAGAAAGACCAACGAATT

GCTGTTACATTGAACAAGACAGCCAAACATTTCTCCCTGCACATC

ACAGAGACCCAACCTGAAGACTCGGCTGTCTACTTCTGTGCAGCA

AGGGGACTCACGGGAGGAGGAAACAAACTCACCTTTGGGACAGGC

ACTCAGCTAAAAGTGGAACTCAATATCCAGAACCCTGACCCTGCC

GTGTACCAGCTGAGAGACTCTAAATCCAGTGACAAGTCTGTCTGC

CTATTCACCGATTTTGATTCTCAAACAAATGTGTCACAAAGTAAG

GATTCTGATGTGTATATCACGGACAAAACTGTGCTAGACATGAGG

TCTATGGACTTCAAGAGCAACAGTGCTGTGGCCTGGAGCAACAAA

TCTGACTTTGCATGTGCAAACGCCTTCAACAACAGCATTATTCCA

GAAGACACCTTCTTCCCCAGCCCAGAAAGTTCCTGTGATGTCAAG

CTGGTCGAGAAAAGCTTTGAAACAGATACGAACCTAAACTTTCAA

AACCTGTCAGTGATTGGGTTCCGAATCCTCCTCCTGAAAGTGGCC

GGGTTTAATCTGCTCATGACGCTGCGGCTGTGGTCCAGC

VGLL1 TCR #2 Alpha Chain Signal peptide
                                   (SEQ ID NO: 25)
ATGACATCCATTCGAGCTGTATTTATATTCCTGTGGCTGCAGCTG

GACTTGGTGAAT

VGLL1 TCR #2 Alpha Chain V-region
                                   (SEQ ID NO: 26)
GGAGAGAATGTGGAGCAGCATCCTTCAACCCTGAGTGTCCAGGAG

GGAGACAGCGCTGTTATCAAGTGTACTTATTCAGACAGTGCCTCA

AACTACTTCCCTTGGTATAAGCAAGAACTTGGAAAAAGACCTCAG

CTTATTATAGACATTCGTTCAAATGTGGGCGAAAAGAAAGACCAA

CGAATTGCTGTTACATTGAACAAGACAGCCAAACATTTCTCCCTG

CACATCACAGAGACCCAACCTGAAGACTCGGCTGTCTACTTCTGT

GCAGCAAGGGGACTCACGGGAGGAGGAAACAAACTCACCTTTGGG

ACAGGCACTCAGCTAAAAGTGGAACTCA

VGLL1 TCR #2 Alpha Chain CDR1
                                   (SEQ ID NO: 27)
GACAGTGCCTCAAACTAC VGLL1 TCR #2 Alpha Chain CDR2
                                   (SEQ ID NO: 28)
ATTCGTTCAAATGTGGGCGAA VGLL1 TCR #2 Alpha Chain CDR3
                                   (SEQ ID NO: 29)
TGTGCAGCAAGGGGACTCACGGGAGGAGGAAACAAACTCACCTTT VGLL1 TCR #2 Beta Chain
                                   (SEQ ID NO: 30)
ATGGGCCCCGGGCTCCTCTGCTGGGCACTGCTTTGTCTCCTGGGA

GCAGGCTTAGTGGACGCTGGAGTCACCCAAAGTCCCACACACCTG

ATCAAAACGAGAGGACAGCAAGTGACTCTGAGATGCTCTCCTAAG

TCTGGGCATGACACTGTGTCCTGGTACCAACAGGCCCTGGGTCAG

GGGCCCCAGTTTATCTTTCAGTATTATGAGGAGGAAGAGAGACAG

AGAGGCAACTTCCCTGATCGATTCTCAGGTCACCAGTTCCCTAAC
```

-continued

```
TATAGCTCTGAGCTGAATGTGAACGCCTTGTTGCTGGGGGACTCG

GCCCTCTATCTCTGTGCCAGCAGCGTCGGGACAGGTATCACTGAA

GCTTTCTTTGGACAAGGCACCAGACTCACAGTTGTAGAGGACCTG

AACAAGGTGTTCCCACCCGAGGTCGCTGTGTTTGAGCCATCAGAA

GCAGAGATCTCCCACACCCAAAAGGCCACACTGGTGTGCCTGGCC

ACAGGCTTCTTCCCTGACCACGTGGAGCTGAGCTGGTGGGTGAAT

GGGAAGGAGGTGCACAGTGGGGTCAGCACGGACCCGCAGCCCCTC

AAGGAGCAGCCCGCCCTCAATGACTCCAGATACTGCCTGAGCAGC

CGCCTGAGGGTCTCGGCCACCTTCTGGCAGAACCCCCGCAACCAC

TTCCGCTGTCAAGTCCAGTTCTACGGGCTCTCGGAGAATGACGAG

TGGACCCAGGATAGGGCCAAACCCGTCACCCAGATCGTCAGCGCC

GAGGCCTGGGGTAGAGCAGACTGTGGCTTTACCTCGGTGTCCTAC

CAGCAAGGGGTCCTGTCTGCCACCATCCTCTATGAGATCCTGCTA

GGGAAGGCCACCCTGTATGCTGTGCTGGTCAGCGCCCTTGTGTTG

ATGGCCATGGTCAAGAGAAAGGATTTCTGA

CTCGAGAAGCTTGCGGCCGCGGATCCGATAA
```

VGLL1 TCR #2 Beta Chain Signal peptide
(SEQ ID NO: 31)
ATGGGCCCCGGGCTCCTCTGCTGGGCACTGCTTTGTCTCCTGGGA
GCAGGCTTAGTGGACGCT VGLL1 TCR #2 Beta Chain V-region
(SEQ ID NO: 32)
GGAGTCACCCAAAGTCCCACACACCTGATCAAAACGAGAGGACAG
CAAGTGACTCTGAGATGCTCTCCTAAGTCTGGGCATGACACTGTG
TCCTGGTACCAACAGGCCCTGGGTCAGGGGCCCCAGTTTATCTTT
CAGTATTATGAGGAGGAAGAGAGACAGAGAGGCAACTTCCCTGAT
CGATTCTCAGGTCACCAGTTCCCTAACTATAGCTCTGAGCTGAAT
GTGAACGCCTTGTTGCTGGGGGACTCGGCCCTCTATCTCTGTGCC
AGCAGCGTCGGGACAGGTATCACTGAAGCTTTCTTTGGACAAGGC
ACCAGACTCACAGTTGTAG VGLL1 TCR #2 Beta Chain CDR1
(SEQ ID NO: 33)
TCTGGGCATGACACT VGLL1 TCR #2 Beta Chain CDR2
(SEQ ID NO: 34)
TATTATGAGGAGGAAGAG VGLL1 TCR #2 Beta Chain CDR3
(SEQ ID NO: 35)
TGTGCCAGCAGCGTCGGGACAGGTATCACTGAAGCTTTCTTT VGLL1 TCR #2 Amino Acid Sequence
(SEQ ID NO: 36)
MTSIRAVFIFLWLQLDLVNGENVEQHPSTLSVQEGDSAVIKCTYS
DSASNYFPWYKQELGKRPQLIIDIRSNVGEKKDQRIAVTLNKTAK
HFSLHITETQPEDSAVYFCAARGLTGGGNKLTFGTGTQLKVELNI
QNPDPAVYQLRDSKSSDKSVCLFTDFDSQTNVSQSKDSDVYITDK
TVLDMRSMDFKSNSAVAWSNKSDFACANAFNNSIIPEDTFFPSPE
SSCDVKLVEKSFETDTNLNFQNLSVIGFRILLLKVAGFNLLMTLR
LWSSRAKRSGSGATNFSLLKQAGDVEENPGPMGPGLLCWALLCLL
GAGLVDAGVTQSPTHLIKTRGQQVTLRCSPKSGHDTVSWYQQALG
QGPQFIFQYYEEEERQRGNFPDRFSGHQFPNYSSELNVNALLLGD
SALYLCASSVGTGITEAFFGQGTRLTVVEDLNKVFPPEVAVFEPS
EAEISHTQKATLVCLATGFFPDHVELSWWVNGKEVHSGVSTDPQP
LKEQPALNDSRYCLSSRLRVSATFWQNPRNHFRCQVQFYGLSEND
EWTQDRAKPVTQIVSAEAWGRADCGFTSVSYQQGVLSATILYEIL
LGKATLYAVLVSALVLMAMVKRKDF VGLL1 TCR #2 Alpha Chain Signal peptide
(SEQ ID NO: 37)
MTSIRAVFIFLWLQLDLVNG VGLL1 TCR #2 Alpha Chain V-region
(SEQ ID NO: 38)
ENVEQHPSTLSVQEGDSAVIKCTYSDSASNYFPWYKQELGKRPQL
IIDIRSNVGEKKDQRIAVTLNKTAKHFSLHITETQPEDSAVYFCA
ARGLTGGGNKLTFGTGTQLKVELNIQ VGLL1 TCR #2 Alpha Chain CDR1
(SEQ ID NO: 39)
DSASNY VGLL1 TCR #2 Alpha Chain CDR2
(SEQ ID NO: 40)
IRSNVGE VGLL1 TCR #2 Alpha Chain CDR3
(SEQ ID NO: 41)
CAARGLTGGGNKLTF VGLL1 TCR #2 Beta Chain Signal peptide
(SEQ ID NO: 42)
MGPGLLCWALLCLLGAGLVDA VGLL1 TCR #2 Beta Chain V-region
(SEQ ID NO: 43)
GVTQSPTHLIKTRGQQVTLRCSPKSGHDTVSWYQQALGQGPQFIF
QYYEEEERQRGNFPDRFSGHQFPNYSSELNVNALLLGDSALYLCA
SSVGTGITEAFFGQGTRLTVVE VGLL1 TCR #2 Beta Chain CDR1
(SEQ ID NO: 44)
SGHDT VGLL1 TCR #2 Beta Chain CDR2
(SEQ ID NO: 45)
YYEEEE VGLL1 TCR #2 Beta Chain CDR3
(SEQ ID NO: 46)
CASSVGTGITEAFF VGLL1 TCR#3 TRAV13-1*02 J1301/TRBVC1
5-6*01 J1-1 Alpha Chain
(SEQ ID NO: 47)
TCTAGACCGCCATGGGTCGACGCCACCATGACATCCATTCGAGCT
GTATTTATATTCCTGTGGCTGCAGCTGGACTTGGTGAATGGAGAG
AATGTGGAGCAGCATCCTTCAACCCTGAGTGTCCAGGAGGGAGAC
AGCGCTGTTATCAAGTGTACTTATTCAGACAGTGCCTCAAACTAC
TTCCCTTGGTATAAGCAAGAACTTGGAAAAAGACCTCAGCTTATT
ATAGACATTCGTTCAAATGTGGGCGAAAAGAAAGACCAACGAATT

```
GCTGTTACATTGAACAAGACAGCCAAACATTTCTCCCTGCACATC
ACAGAGACCCAACCTGAAGACTCGGCTGTCTACTTCTGTGCAGCA
ATTCCTAATTCTGGGGGTTACCAGAAAGTTACCTTTGGAATTGGA
ACAAAGCTCCAAGTCATCCCAAATATCCAGAACCCTGACCCTGCC
GTGTACCAGCTGAGAGACTCTAAATCCAGTGACAAGTCTGTCTGC
CTATTCACCGATTTTGATTCTCAAACAAATGTGTCACAAAGTAAG
GATTCTGATGTGTATATCACAGACAAAACTGTGCTAGACATGAGG
TCTATGGACTTCAAGAGCAACAGTGCTGTGGCCTGGAGCAACAAA
TCTGACTTTGCATGTGCAAACGCCTTCAACAACAGCATTATTCCA
GAAGACACCTTCTTCCCCAGCCCAGAAAGTTCCTGTGATGTCAAG
CTGGTCGAGAAAGCTTTGAAACAGATACGAACCTAAACTTTCAA
AACCTGTCAGTGATTGGGTTCCGAATCCTCCTCCTGAAAGTGGCC
GGGTTTAATCTGCTCATGACGCTGCGGCTGTGGTCCAGC
```

VGLL1 TCR #3 Alpha Chain Signal peptide
(SEQ ID NO: 48)
```
ATGACATCCATTGAGCTGTATTTATATTCCTGTGGCTGCAGCTG
GACTTGGTGAAT
```

VGLL1 TCR #3 Alpha Chain V-region
(SEQ ID NO: 49)
```
GGAGAGAATGTGGAGCAGCATCCTTCAACCCTGAGTGTCCAGGAG
GGAGACAGCGCTGTTATCAAGTGTACTTATTCAGACAGTGCCTCA
AACTACTTCCCTTGGTATAAGCAAGAACTTGGAAAAAGACCTCAG
CTTATTATAGACATTCGTTCAAATGTGGGCGAAAAGAAAGACCAA
CGAATTGCTGTTACATTGAACAAGACAGCCAAACATTTCTCCCTG
CACATCACAGAGACCCAACCTGAAGACTCGGCTGTCTACTTCTGT
GCAGCAATTCCTAATTCTGGGGGTTACCAGAAAGTTACCTTTGGA
ATTGGAACAAAGCTCCAAGTCATCCCAAA
```

VGLL1 TCR #3 Alpha Chain CDR1
(SEQ ID NO: 50)
```
GACAGTGCCTCAAACTAC
```

VGLL1 TCR #3 Alpha Chain CDR2
(SEQ ID NO: 51)
```
ATTCGTTCAAATGTGGGCGAA
```

VGLL1 TCR #3 Alpha Chain CDR3
(SEQ ID NO: 52)
```
TGTGCAGCAATTCCTAATTCTGGGGGTTACCAGAAAGTTACCTTT
```

VGLL1 TCR #3 Beta Chain
(SEQ ID NO: 53)
```
ATGGGCCCCGGGCTCCTCTGCTGGGCACTGCTTTGTCTCCTGGGA
GCAGGCTTAGTGGACGCTGGAGTCACCCAAAGTCCCACACACCTG
ATCAAAACGAGAGGACAGCAAGTGACTCTGAGATGCTCTCCTAAG
TCTGGGCATGACACTGTGTCCTGGTACCAACAGGCCCTGGGTCAG
GGGCCCCAGTTTATCTTTCAGTATTATGAGGAGGAAGAGAGACAG
AGAGGCAACTTCCCTGATCGATTCTCAGGTCACCAGTTCCCTAAC
TATAGCTCTGAGCTGAATGTGAACGCCTTGTTGCTGGGGGACTCG
GCCCTCTATCTCTGTGCCAGCAGCGTCGGGACAGGTATCACTGAA
GCTTTCTTTGGACAAGGCACCAGACTCACAGTTGTAGAGGACCTG
AACAAGGTGTTCCCACCCGAGGTCGCTGTGTTTGAGCCATCAGAA
GCAGAGATCTCCCACACCCAAAAGGCCACACTGGTGTGCCTGGCC
ACAGGCTTCTTCCCTGACCACGTGGAGCTGAGCTGGTGGGTGAAT
GGGAAGGAGGTGCACAGTGGGGTCAGCACGGACCCGCAGCCCCTC
AAGGAGCAGCCCGCCCTCAATGACTCCAGATACTGCCTGAGCAGC
CGCCTGAGGGTCTCGGCCACCTTCTGGCAGAACCCCCGCAACCAC
TTCCGCTGTCAAGTCCAGTTCTACGGGCTCTCGGAGAATGACGAG
TGGACCCAGGATAGGGCCAAACCCGTCACCCAGATCGTCAGCGCC
GAGGCCTGGGGTAGAGCAGACTGTGGCTTTACCTCGGTGTCCTAC
CAGCAAGGGGTCCTGTCTGCCACCATCCTCTATGAGATCCTGCTA
GGGAAGGCCACCCTGTATGCTGTGCTGGTCAGCGCCCTTGTGTTG
ATGGCCATGGTCAAGAGAAAGGATTTCTGA*CTCGAGAAGCTTGCG*
*GCCGC*GGATCCGATAAA
```

VGLL1 TCR #3 Beta Chain Signal peptide
(SEQ ID NO: 54)
```
ATGGGCCCCGGGCTCCTCTGCTGGGCACTGCTTTGTCTCCTGGGA
GCAGGCTTAGTGGACGCT
```

VGLL1 TCR #3 Beta Chain V-region
(SEQ ID NO: 55)
```
GGAGTCACCCAAAGTCCCACACACCTGATCAAAACGAGAGGACAG
CAAGTGACTCTGAGATGCTCTCCTAAGTCTGGGCATGACACTGTG
TCCTGGTACCAACAGGCCCTGGGTCAGGGGCCCCAGTTTATCTTT
CAGTATTATGAGGAGGAAGAGAGACAGAGAGGCAACTTCCCTGAT
CGATTCTCAGGTCACCAGTTCCCTAACTATAGCTCTGAGCTGAAT
GTGAACGCCTTGTTGCTGGGGGACTCGGCCCTCTATCTCTGTGCC
AGCAGCGTCGGGACAGGTATCACTGAAGCTTTCTTTGGACAAGGC
ACCAGACTCACAGTTGTAG
```

VGLL1 TCR #3 Beta Chain CDR1
(SEQ ID NO: 56)
```
TCTGGGCATGACACT
```

VGLL1 TCR #3 Beta Chain CDR2
(SEQ ID NO: 57)
```
TATTATGAGGAGGAAGAG
```

VGLL1 TCR #3 Beta Chain CDR3
(SEQ ID NO: 58)
```
TGTGCCAGCAGCGTCGGGACAGGTATCACTGAAGCTTTCTTT
```

VGLL1 TCR #3 Amino Acid Sequence
(SEQ ID NO: 59)
```
MTSIRAVFIFLWLQLDLVNGENVEQHPSTLSVQEGDSAVIKCTYS
DSASNYFPWYKQELGKRPQLIIDIRSNVGEKKDQRIAVTLNKTAK
HFSLHITETQPEDSAVYFCAAIPNSGGYQKVTFGIGTKLQVIPNI
QNPDPAVYQLRDSKSSDKSVCLFTDFDSQTNVSQSKDSDVYITDK
TVLDMRSMDFKSNSAVAWSNKSDFACANAFNNSIIPEDTFFPSPE
SSCDVKLVEKSFETDTNLNFQNLSVIGFRILLLKVAGFNLLMTLR
LWSSRAKRSGSGATNFSLLKQAGDVEENPGPMGPLLCWALLCLL
GAGLVDAGVTQSPTHLIKTRGQQVTLRCSPKSGHDTVSWYQQALG
```

```
QGPQFIFQYYEEEERQRGNFPDRFSGHQFPNYSSELNVNALLLGD

SALYLCASSVGTGITEAFFGQGTRLTVVEDLNKVFPPEVAVFEPS

EAEISHTQKATLVCLATGFFPDHVELSWWVNGKEVHSGVSTDPQP

LKEQPALNDSRYCLSSRLRVSATFWQNPRNHFRCQVQFYGLSEND

EWTQDRAKPVTQIVSAEAWGRADCGFTSVSYQQGVLSATILYEIL

LGKATLYAVLVSALVLMAMVKRKDF

VGLL1 TCR #3 Alpha Chain Signal peptide
                                 (SEQ ID NO: 60)
MTSIRAVFIFLWLQLDLVNG VGLL1 TCR #3 Alpha Chain V-region
                                 (SEQ ID NO: 61)
ENVEQHPSTLSVQEGDSAVIKCTYSDSASNYFPWYKQELGKRPQL

IIDIRSNVGEKKDQRIAVTLNKTAKHFSLHITETQPEDSAVYFCA

AIPNSGGYQKVTFGIGTKLQVIPNI

VGLL1 TCR #3 Alpha Chain CDR1
                                 (SEQ ID NO: 62)
DSASNY VGLL1 TCR #3 Alpha Chain CDR2
                                 (SEQ ID NO: 63)
IRSNVGE VGLL1 TCR #3 Alpha Chain CDR3
                                 (SEQ ID NO: 64)
CAAIPNSGGYQKVTF VGLL1 TCR #3 Beta Chain Signal peptide
                                 (SEQ ID NO: 65)
MGPGLLCWALLCLLGAGLVDA VGLL1 TCR #3 Beta Chain V-region
                                 (SEQ ID NO: 66)
GVTQSPTHLIKTRGQQVTLRCSPKSGHDTVSWYQQALGQGPQFIF

QYYEEEERQRGNFPDRFSGHQFPNYSSELNVNALLLGDSALYLCA

SSVGTGITEAFFGQGTRLTVV

VGLL1 TCR #3 Beta Chain CDR1
                                 (SEQ ID NO: 67)
SGHDT VGLL1 TCR #3 Beta Chain CDR2
                                 (SEQ ID NO: 68)
YYEEE VGLL1 TCR #3 Beta Chain CDR3
                                 (SEQ ID NO: 69)
CASSVGTGITEAFF VGLL1 TCR #4 TRAV23 J12/TRBV5-6*01 FJ1-1*01
F Alpha Chain
                                 (SEQ ID NO: 70)
TCTAGACCGCCATGGGTCGACGCCACCATGGACAAGATCTTAGGA

GCATCATTTTTAGTTCTGTGGCTTCAACTATGCTGGGTGAGTGGC

CAACAGAAGGAGAAAGTGACCAGCAGCAGGTGAAACAAAGTCCT

CAATCTTTGATAGTCCAGAAAGGAGGGATTTCAATTATAAACTGT

GCTTATGAGAACACTGCGTTTGACTACTTTCCATGGTACCAACAA

TTCCCTGGGAAAGGCCCTGCATTATTGATAGCCATACGTCCAGAT

GTGAGTGAAAAGAAAGAAGGAAGATTCACAATCTCCTTCAATAAA

AGTGCCAAGCAGTTCTCATTGCATATCATGGATTCCCAGCCTGGA

GACTCAGCCACCTACTTCTGTGCAGCCGTAAGATACAACTTCAAC
```

```
AAATTTTACTTTGGATCTGGGACCAAACTCAATGTAAAACCAAAT

ATCCAGAACCCTGACCCTGCCGTGTACCAGCTGAGAGACTCTAAA

TCCAGTGACAAGTCTGTCTGCCTATTCACCGATTTTGATTCTCAA

ACAAATGTGTCACAAAGTAAGGATTCTGATGTGTATATCACAGAC

AAAACTGTGCTAGACATGAGGTCTATGGACTTCAAGAGCAACAGT

GCTGTGGCCTGGAGCAACAAATCTGACTTTGCATGTGCAAACGCC

TTCAACAACAGCATTATTCCAGAAGACACCTTCTTCCCCAGCCCA

GAAAGTTCCTGTGATGTCAAGCTGGTCGAGAAAAGCTTTGAAACA

GATACGAACCTAAACTTTCAAAACCTGTCAGTGATTGGGTTCCGA

ATCCTCCTCCTGAAAGTGGCCGGGTTTAATCTGCTCATGACGCTG

CGGCTGTGGTCCAGC

VGLL1 TCR #4 Alpha Chain Signal peptide
                                 (SEQ ID NO: 71)
ATGGACAAGATCTTAGGAGCATCATTTTTAGTTCTGTGGCTTCAA

CTATGCTGGGTGAGTGGC

VGLL1 TCR #4 Alpha Chain V-region
                                 (SEQ ID NO: 72)
CAACAGAAGGAGAAAGTGACCAGCAGCAGGTGAAACAAAGTCCT

CAATCTTTGATAGTCCAGAAAGGAGGGATTTCAATTATAAACTGT

GCTTATGAGAACACTGCGTTTGACTACTTTCCATGGTACCAACAA

TTCCCTGGGAAAGGCCCTGCATTATTGATAGCCATACGTCCAGAT

GTGAGTGAAAAGAAAGAAGGAAGATTCACAATCTCCTTCAATAAA

AGTGCCAAGCAGTTCTCATTGCATATCATGGATTCCCAGCCTGGA

GACTCAGCCACCTACTTCTGTGCAGCCGTAAGATACAACTTCAAC

AAATTTTACTTTGGATCTGGGACCAAACTCAATGTAAAACCAAA

VGLL1 TCR #4 Alpha Chain CDR1
                                 (SEQ ID NO: 73)
AACACTGCGTTTGACTAC VGLL1 TCR #4 Alpha Chain CDR2
                                 (SEQ ID NO: 74)
ATACGTCCAGATGTGAGTGAA VGLL1 TCR #4 Alpha Chain CDR3
                                 (SEQ ID NO: 75)
TGTGCAGCCGTAAGATACAACTTCAACAAATTTTACTTT VGLL1 TCR #4 Beta Chain
                                 (SEQ ID NO: 76)
ATGGGCCCCGGGCTCCTCTGCTGGGCACTGCTTTGTCTCCTGGGA

GCAGGCTTAGTGGACGCTGGAGTCACCCAAAGTCCCACACACCTG

ATCAAAACGAGAGGACAGCAAGTGACTCTGAGATGCTCTCCTAAG

TCTGGGCATGACACTGTGTCCTGGTACCAACAGGCCCTGGGTCAG

GGGCCCCAGTTTATCTTTCAGTATTATGAGGAGGAAGAGAGACAG

AGAGGCAACTTCCCTGATCGATTCTCAGGTCACCAGTTCCCTAAC

TATAGCTCTGAGCTGAATGTGAACGCCTTGTTGCTGGGGGACTCG

GCCCTCTATCTCTGTGCCAGCAGCGTCGGGACAGGTATCACTGAA

GCTTTCTTTGGACAAGGCACCAGACTCACAGTTGTAGAGGACCTG

AACAAGGTGTTCCCACCCGAGGTCGCTGTGTTTGAGCCATCAGAA

GCAGAGATCTCCCACACCCAAAAGGCCACACTGGTGTGCCTGGCC
```

ACAGGCTTCTTCCCTGACCACGTGGAGCTGAGCTGGTGGGTGAAT

GGGAAGGAGGTGCACAGTGGGGTCAGCACGGACCCGCAGCCCCTC

AAGGAGCAGCCCGCCCTCAATGACTCCAGATACTGCCTGAGCAGC

CGCCTGAGGGTCTCGGCCACCTTCTGGCAGAACCCCGCAACCAC

TTCCGCTGTCAAGTCCAGTTCTACGGGCTCTCGGAGAATGACGAG

TGGACCCAGGATAGGGCCAAACCCGTCACCCAGATCGTCAGCGCC

GAGGCCTGGGGTAGAGCAGACTGTGGCTTTACCTCGGTGTCCTAC

CAGCAAGGGGTCCTGTCTGCCACCATCCTCTATGAGATCCTGCTA

GGGAAGGCCACCCTGTATGCTGTGCTGGTCAGCGCCCTTGTGTTG

ATGGCCATGGTCAAGAGAAAGGATTTCTGACTCGAGAAGCTTGCG

GCCGCGGATCCGATAAA

VGLL1 TCR #4 Beta Chain Signal peptide
(SEQ ID NO: 77)
ATGGGCCCCGGGCTCCTCTGCTGGGCACTGCTTTGTCTCCTGGGA

GCAGGCTTAGTGGACGCT

VGLL1 TCR #4 Beta Chain V-region
(SEQ ID NO: 78)
GGAGTCACCCAAAGTCCCACACACCTGATCAAAACGAGAGGACAG

CAAGTGACTCTGAGATGCTCTCCTAAGTCTGGGCATGACACTGTG

TCCTGGTACCAACAGGCCCTGGGTCAGGGGCCCCAGTTTATCTTT

CAGTATTATGAGGAGGAAGAGAGACAGAGAGGCAACTTCCCTGAT

CGATTCTCAGGTCACCAGTTCCCTAACTATAGCTCTGAGCTGAAT

GTGAACGCCTTGTTGCTGGGGGACTCGGCCCTCTATCTCTGTGCC

AGCAGCGTCGGGACAGGTATCACTGAAGCTTTCTTTGGACAAGGC

ACCAGACTCACAGTTGTAG

VGLL1 TCR #4 Beta Chain CDR1
(SEQ ID NO: 79)
TCTGGGCATGACACT

VGLL1 TCR #4 Beta Chain CDR2
(SEQ ID NO: 80)
TATTATGAGGAGGAAGAG

VGLL1 TCR #4 Beta Chain CDR3
(SEQ ID NO: 81)
TGTGCCAGCAGCGTCGGGACAGGTATCACTGAAGCTTTCTTT VGLL1 TCR #4 Amino Acid Sequence
(SEQ ID NO: 82)
MDKILGASFLVLWLQLCWVSGQQKEKSDQQQVKQSPQSLIVQKGG

ISIINCAYENTAFDYFPWYQQFPGKGPALLIAIRPDVSEKKEGRF

TISFNKSAKQFSLHIMDSQPGDSATYFCAAVRYNFNKFYFGSGTK

LNVKPNIQNPDPAVYQLRDSKSSDKSVCLFTDFDSQTNVSQSKDS

DVYITDKTVLDMRSMDFKSNSAVAWSNKSDFACANAFNNSIIPED

TFFPSPESSCDVKLVEKSFETDTNLNFQNLSVIGFRILLLKVAGF

NLLMTLRLWSSRAKRSGSGATNFSLLKQAGDVEENPGPMGPGLLC

WALLCLLGAGLVDAGVTQSPTHLIKTRGQQVTLRCSPKSGHDTVS

WYQQALGQGPQFIFQYYEEEERQRGNFPDRFSGHQFPNYSSELNV

NALLLGDSALYLCASSVGTITEAFFGQGTRLTVVEDLNKVFPPE

VAVFEPSEAEISHTQKATLVCLATGFFPDHVELSWWVNGKEVHSG

VSTDPQPLKEQPALNDSRYCLSSRLRVSATFWQNPRNHFRCQVQF

YGLSENDEWTQDRAKPVTQIVSAEAWGRADCGFTSVSYQQGVLSA

TILYEILLGKATLYAVLVSALVLMAMVKRKDF

VGLL1 TCR #4 Alpha Chain Signal peptide
(SEQ ID NO: 83)
MDKILGASFLVLWLQLCWVSG

VGLL1 TCR #4 Alpha Chain V-region
(SEQ ID NO: 84)
QQKEKSDQQQVKQSPQSLIVQKGGISIINCAYENTAFDYFPWYQQ

FPGKGPALLIAIRPDVSEKKEGRFTISFNKSAKQFSLHIMDSQPG

DSATYFCAAVRYNFNKFYFGSGTKLNVKPNIQ

VGLL1 TCR #4 Alpha Chain CDR1
(SEQ ID NO: 85)
NTAFDY

VGLL1 TCR #4 Alpha Chain CDR2
(SEQ ID NO: 86)
IRPDVSE

VGLL1 TCR #4 Alpha Chain CDR3
(SEQ ID NO: 87)
CAAVRYNFNKFYF

VGLL1 TCR #4 Beta Chain Signal peptide
(SEQ ID NO: 88)
MGPGLLCWALLCLLGAGLVDA

VGLL1 TCR #4 Beta Chain V-region
(SEQ ID NO: 89)
GVTQSPTHLIKTRGQQVTLRCSPKSGHDTVSWYQQALGQGPQFIF

QYYEEEERQRGNFPDRFSGHQFPNYSSELNVNALLLGDSALYLCA

SSVGTITEAFFGQGTRLTVV

VGLL1 TCR #4 Beta Chain CDR1
(SEQ ID NO: 90)
SGHDT

VGLL1 TCR #4 Beta Chain CDR2
(SEQ ID NO: 91)
YYEEEE

VGLL1 TCR #4 Beta Chain CDR3
(SEQ ID NO: 92)
CASSVGTITEAFF

In some embodiments, host cells, such as T cells (e.g., CD4+ T cells, CD8+ T cells, γδ T cells, and Tregs), NK cells, invariant NK cells, NKT cells, mesenchymal stem cells (MSCs), or induced pluripotent stem (iPS) cells of the present disclosure can be genetically engineered to express antigen receptors such as engineered TCRs and/or CARs. Thus, further provided herein are cells, such as T cells, NK cells, invariant NK cells, NKT cells, MSCs, or iPS cells, engineered to express the VGLL1-specific TCRs provided herein. For example, the autologous or allogeneic cells (e.g., isolated from an umbilical cord) are modified to express a TCR having antigenic specificity for a cancer antigen. These non-T cell effector immune cells may express a TCR together with CD3 molecules or other signaling domains linked to the TCR, which would initiate the signal transduction in these cells. Suitable methods of modification are known in the art. See, for instance, Sambrook and Ausubel, supra. For example, the T cells may be transduced to express a TCR having antigenic specificity for a cancer antigen using transduction techniques described in Heemskerk et al. *Hum Gene Ther.* 19:496-510 (2008) and Johnson et al. *Blood* 114:535-46 (2009).

In some embodiments, antigen-specific cells can be generated by using the VGLL1 TCRs provided herein (e.g., SEQ ID NOs:1-92). In this method, the TCR sequence is inserted into a vector (e.g., retroviral or lentiviral vector) which is introduced into host cells, such as T cells (e.g., CD4$^+$ T cells, CD8$^+$ T cells, γδ T cells, and Tregs), NK cells, invariant NK cells, NKT cells, MSCs, or iPS cells to generate antigen-specific cells which can be used for adoptive cell therapy for cancer patients.

The engineered immune cells may be constructed using any of the many well-established gene transfer methods known to those skilled in the art. In certain embodiments, the engineered cells are constructed using viral vector-based gene transfer methods to introduce nucleic acids encoding a VGLL1-specific TCR. The viral vector-based gene transfer method may comprise a lentiviral vector, a retroviral vector, an adenoviral or an adeno-associated viral vector. In certain embodiments, the engineered cells are constructed using non-viral vector-based gene transfer methods to introduce nucleic acids encoding a VGLL1-specific TCR. The vector for the TCR may comprises the alpha chain polypeptide and the beta chain polypeptide, which may be linked by a linker domain or IRES sequence. In certain embodiments, the non-viral vector-based gene transfer method comprises a gene-editing method selected from the group consisting of a zinc-finger nuclease (ZFN), a transcription activator-like effector nuclease (TALENs), and a clustered regularly interspaced short palindromic repeats (CRISPR)/CRISPR-associated protein 9 (Cas9) nuclease. In certain embodiments, the non-viral vector-based gene editing method comprises a transfection or transformation method selected from the group consisting of lipofection, nucleofection, virosomes, liposomes, polycation or lipid:nucleic acid conjugates, naked DNA, artificial virions, and agent-enhanced uptake of DNA.

Electroporation of RNA coding for the full length TCR α and β (or γ and δ) chains can be used as alternative to overcome long-term problems with autoreactivity caused by pairing of retrovirally transduced and endogenous TCR chains. Even if such alternative pairing takes place in the transient transfection strategy, the possibly generated autoreactive T cells will normally lose this autoreactivity after some time, because the introduced TCR α and β chain are only transiently expressed. When the introduced TCR α and β chain expression is diminished, only normal autologous T cells are left. This is not the case when full length TCR chains are introduced by stable retroviral transduction, which do not lose the introduced TCR chains, causing a constantly present autoreactivity in the patient.

Exemplary antigen receptors, including CARs and recombinant TCRs, as well as methods for engineering and introducing the receptors into cells, include those described, for example, in international patent application publication numbers WO200014257, WO2013126726, WO2012/129514, WO2014031687, WO2013/166321, WO2013/071154, WO2013/123061 U.S. patent application publication numbers US2002131960, US2013287748, US20130149337, U.S. Pat. Nos. 6,451,995, 7,446,190, 8,252,592, 8,339,645, 8,398,282, 7,446,179, 6,410,319, 7,070,995, 7,265,209, 7,354,762, 7,446,191, 8,324,353, and 8,479,118, and European patent application number EP2537416, and/or those described by Sadelain et al., *Cancer Discov.* 2013 April; 3(4): 388-398; Davila et al. (2013) *PLoS ONE* 8(4): e61338; Turtle et al., *Curr. Opin. Immunol.*, 2012 October; 24(5): 633-39; Wu et al., *Cancer,* 2012 Mar. 18(2): 160-75. In some aspects, the genetically engineered antigen receptors include a CAR as described in U.S. Pat. No. 7,446,190, and those described in International Patent Application Publication No.: WO/2014055668 A1.

A. T Cell Receptors

In some embodiments, the genetically engineered antigen receptors include recombinant TCRs and/or TCRs cloned from naturally occurring T cells. A "T cell receptor" or "TCR" refers to a molecule that contains a variable a and β chains (also known as TCRα and TCRβ, respectively) or a variable γ and δ chains (also known as TCRγ and TCRδ, respectively) and that is capable of specifically binding to an antigen peptide bound to a MHC receptor. In some embodiments, the TCR is in the αβ form.

Typically, TCRs that exist in αβ and γδ forms are generally structurally similar, but T cells expressing them may have distinct anatomical locations or functions. A TCR can be found on the surface of a cell or in soluble form. Generally, a TCR is found on the surface of T cells (or T lymphocytes) where it is generally responsible for recognizing antigens bound to major histocompatibility complex (MHC) molecules. In some embodiments, a TCR also can contain a constant domain, a transmembrane domain and/or a short cytoplasmic tail (see, e.g., Janeway et al, Immunobiology: The Immune System in Health and Disease, 3$^{rd}$ Ed., Current Biology Publications, p. 433, 1997). For example, in some aspects, each chain of the TCR can possess one N-terminal immunoglobulin variable domain, one immunoglobulin constant domain, a transmembrane region, and a short cytoplasmic tail at the C-terminal end. In some embodiments, a TCR is associated with invariant proteins of the CD3 complex involved in mediating signal transduction. Unless otherwise stated, the term "TCR" should be understood to encompass functional TCR fragments thereof. The term also encompasses intact or full-length TCRs, including TCRs in the αβ form or γδ form.

Thus, for purposes herein, reference to a TCR includes any TCR or functional fragment, such as an antigen-binding portion of a TCR that binds to a specific antigenic peptide bound in an MHC molecule, i.e. MHC-peptide complex. An "antigen-binding portion" or antigen-binding fragment" of a TCR, which can be used interchangeably, refers to a molecule that contains a portion of the structural domains of a TCR, but that binds the antigen (e.g. MHC-peptide complex) to which the full TCR binds. In some cases, an antigen-binding portion contains the variable domains of a TCR, such as variable a chain and variable R chain of a TCR, sufficient to form a binding site for binding to a specific MHC-peptide complex, such as generally where each chain contains three complementarity determining regions.

In some embodiments, the variable domains of the TCR chains associate to form loops, or complementarity determining regions (CDRs) analogous to immunoglobulins, which confer antigen recognition and determine peptide specificity by forming the binding site of the TCR molecule and determine peptide specificity. Typically, like immunoglobulins, the CDRs are separated by framework regions (FRs) (see, e.g., Jores et al., *PNAS U.S.A.* 87:9138, 1990; Chothia et al., *EMBO J.* 7:3745, 1988; see also Lefranc et al., *Dev. Comp. Immunol.* 27:55, 2003). In some embodiments, CDR3 is the main CDR responsible for recognizing processed antigen, although CDR1 of the alpha chain has also been shown to interact with the N-terminal part of the antigenic peptide, whereas CDR1 of the beta chain interacts with the C-terminal part of the peptide. CDR2 is thought to recognize the MHC molecule. In some embodiments, the variable region of the β-chain can contain a further hyper-variability (HV4) region.

In some embodiments, the TCR chains contain a constant domain. For example, like immunoglobulins, the extracellular portion of TCR chains (e.g., a-chain, β-chain) can contain two immunoglobulin domains, a variable domain (e.g., $V_a$ or Vp; typically amino acids 1 to 116 based on Kabat numbering Kabat et al., "Sequences of Proteins of Immunological Interest, US Dept. Health and Human Services, Public Health Service National Institutes of Health, 1991, $5^{th}$ ed.) at the N-terminus, and one constant domain (e.g., a-chain constant domain or $C_a$, typically amino acids 117 to 259 based on Kabat, β-chain constant domain or Cp, typically amino acids 117 to 295 based on Kabat) adjacent to the cell membrane. For example, in some cases, the extracellular portion of the TCR formed by the two chains contains two membrane-proximal constant domains, and two membrane-distal variable domains containing CDRs. The constant domain of the TCR domain contains short connecting sequences in which a cysteine residue forms a disulfide bond, making a link between the two chains. In some embodiments, a TCR may have an additional cysteine residue in each of the α and β chains such that the TCR contains two disulfide bonds in the constant domains.

In some embodiments, the TCR chains can contain a transmembrane domain. In some embodiments, the transmembrane domain is positively charged. In some cases, the TCR chains contains a cytoplasmic tail. In some cases, the structure allows the TCR to associate with other molecules like CD3. For example, a TCR containing constant domains with a transmembrane region can anchor the protein in the cell membrane and associate with invariant subunits of the CD3 signaling apparatus or complex.

Generally, CD3 is a multi-protein complex that can possess three distinct chains (γ, δ, and ε) in mammals and the ζ-chain. For example, in mammals the complex can contain a CD3γ chain, a CD3δ chain, two CD3ε chains, and a homodimer of CDζ chains. The CD3γ, CD3δ, and CD3ε chains are highly related cell surface proteins of the immunoglobulin superfamily containing a single immunoglobulin domain. The transmembrane regions of the CD3γ, CD3δ, and CD3ε chains are negatively charged, which is a characteristic that allows these chains to associate with the positively charged T cell receptor chains. The intracellular tails of the CD3γ, CD3δ, and CD3ε chains each contain a single conserved motif known as an immunoreceptor tyrosine-based activation motif or ITAM, whereas each CDζ chain has three. Generally, ITAMs are involved in the signaling capacity of the TCR complex. These accessory molecules have negatively charged transmembrane regions and play a role in propagating the signal from the TCR into the cell. The CD3- and ζ-chains, together with the TCR, form what is known as the T cell receptor complex.

In some embodiments, the TCR may be a heterodimer of two chains α and β (or optionally γ and δ) or it may be a single chain TCR construct. In some embodiments, the TCR is a heterodimer containing two separate chains (α and β chains or γ and δ chains) that are linked, such as by a disulfide bond or disulfide bonds. In some embodiments, a TCR for a target antigen (e.g., a cancer antigen) is identified and introduced into the cells. In some embodiments, nucleic acid encoding the TCR can be obtained from a variety of sources, such as by polymerase chain reaction (PCR) amplification of publicly available TCR DNA sequences. In some embodiments, the TCR is obtained from a biological source, such as from cells such as from a T cell (e.g. cytotoxic T cell), T cell hybridomas or other publicly available source. In some embodiments, the T cells can be obtained from in vivo isolated cells. In some embodiments, a high-affinity T cell clone can be isolated from a patient, and the TCR isolated. In some embodiments, the T cells can be a cultured T cell hybridoma or clone. In some embodiments, the TCR clone for a target antigen has been generated in transgenic mice engineered with human immune system genes (e.g., the human leukocyte antigen system, or HLA). See, e.g., tumor antigens (see, e.g., Parkhurst et al. (2009) *Clin Cancer Res*. 15: 169-180 and Cohen et al. (2005) *J Immunol*. 175:5799-5808). In some embodiments, phage display is used to isolate TCRs against a target antigen (see, e.g., Varela-Rohena et al. (2008) *Nat Med*. 14: 1390-1395 and Li (2005) *Nat Biotechnol*. 23:349-354). In some embodiments, the TCR or antigen-binding portion thereof can be synthetically generated from knowledge of the sequence of the TCR.

B. Chimeric T Cell Receptors

In some embodiments, the engineered antigen receptors include CARs, including activating or stimulatory CARs, costimulatory CARs (see WO2014/055668), and/or inhibitory CARs (iCARs, see Fedorov et al., Sci. Transl. Medicine, 5(215) (December, 2013). The CARs generally include an extracellular antigen (or ligand) binding domain linked to one or more intracellular signaling components, in some aspects via linkers and/or transmembrane domain(s). Such molecules typically mimic or approximate a signal through a natural antigen receptor, a signal through such a receptor in combination with a costimulatory receptor, and/or a signal through a costimulatory receptor alone. In some embodiments, the CAR includes an antigen-binding portion or portions of an antibody molecule, such as a single-chain antibody fragment (scFv) derived from the variable heavy (VH) and variable light (VL) chains of a monoclonal antibody (mAb).

The arrangement of the antigen-binding domain of a CAR may be multimeric, such as a diabody or multimers. The multimers can be formed by cross pairing of the variable portions of the light and heavy chains into what may be referred to as a diabody. The hinge portion of the CAR may in some embodiments be shortened or excluded (i.e., generating a CAR that only includes an antigen binding domain, a transmembrane region and an intracellular signaling domain). A multiplicity of hinges may be used with the present invention, e.g., as shown in Table 1. In some embodiments, the hinge region may have the first cysteine maintained, or mutated by a proline or a serine substitution, or be truncated up to the first cysteine. The Fc portion may be deleted from scFv used to as an antigen-binding region to generate CARs according to the present invention. In some embodiments, an antigen-binding region may encode just one of the Fc domains, e.g., either the CH2 or CH3 domain from human immunoglobulin. One may also include the hinge, CH2, and CH3 region of a human immunoglobulin that has been modified to improve dimerization and oligermerization. In some embodiments, the hinge portion of may comprise or consist of a 8-14 amino acid peptide (e.g., a 12 AA peptide), a portion of CD8a, or the IgG4 Fc. In some embodiments, the antigen binding domain may be suspended from cell surface using a domain that promotes oligomerization, such as CD8 alpha. In some embodiments, the antigen binding domain may be suspended from cell surface using a domain that is recognized by monoclonal antibody (mAb) clone 2D3 (mAb clone 2D3 described, e.g., in Singh et al., 2008).

The endodomain or intracellular signaling domain of a CAR can generally cause or promote the activation of at least one of the normal effector functions of an immune cell comprising the CAR. For example, the endodomain may promote an effector function of a T cell such as, e.g., cytolytic activity or helper activity including the secretion of cytokines. The effector function in a naive, memory, or memory-type T cell may include antigen-dependent proliferation. The terms "intracellular signaling domain" or "endodomain" refers to the portion of a CAR that can transduce the effector function signal and/or direct the cell to perform a specialized function. While usually the entire intracellular signaling domain may be included in a CAR, in some cases a truncated portion of an endodomain may be included. Generally, endodomains include truncated endodomains, wherein the truncated endodomain retains the ability to transduce an effector function signal in a cell.

In some embodiments, an endodomain comprises the zeta chain of the T cell receptor or any of its homologs (e.g., eta, delta, gamma, or epsilon), MB1 chain, B29, Fc RIII, Fc RI, and combinations of signaling molecules, such as CDζ and CD28, CD27, 4-1BB, DAP-10, OX40, and combinations thereof, as well as other similar molecules and fragments. Intracellular signaling portions of other members of the families of activating proteins can be used, such as FcγRIII and FcεRI. Examples of these alternative transmembrane and intracellular domains can be found, e.g., Gross et al. (1992), Stancovski et al. (1993), Moritz et al. (1994), Hwu et al. (1995), Weijtens et al. (1996), and Hekele et al. (1996), which are incorporated herein be reference in their entirety. In some embodiments, an endodomain may comprise the human CDζ intracellular domain.

The antigen-specific extracellular domain and the intracellular signaling-domain are preferably linked by a transmembrane domain. Transmembrane domains that may be included in a CAR include, e.g., the human IgG4 Fc hinge and Fc regions, the human CD4 transmembrane domain, the human CD28 transmembrane domain, the transmembrane human CDζ domain, or a cysteine mutated human CDζ domain, or a transmembrane domains from a human transmembrane signaling protein such as, e.g., the CD16 and CD8 and erythropoietin receptor.

In some embodiments, the endodomain comprises a sequence encoding a costimulatory receptors such as, e.g., a modified CD28 intracellular signaling domain, or a CD28, CD27, OX-40 (CD134), DAP10, or 4-1BB (CD137) costimulatory receptor. In some embodiments, both a primary signal initiated by CD3ζ, an additional signal provided by a human costimulatory receptor may be included in a CAR to more effectively activate a transformed T cells, which may help improve in vivo persistence and the therapeutic success of the adoptive immunotherapy. As noted in Table 1, the endodomain or intracellular receptor signaling domain may comprise the zeta chain of CD3 alone or in combination with an Fcγ RIII costimulatory signaling domains such as, e.g., CD28, CD27, DAP10, CD137, OX40, CD2, 4-1BB. In some embodiments, the endodomain comprises part or all of one or more of TCR zeta chain, CD28, CD27, OX40/CD134, 4-1BB/CD137, FcεRIγ, ICOS/CD278, IL-2Rbeta/CD122, IL-2Ralpha/CD132, DAP10, DAP12, and CD40. In some embodiments, 1, 2, 3, 4 or more cytoplasmic domains may be included in an endodomain. For example, in some CARs it has been observed that at least two or three signaling domains fused together can result in an additive or synergistic effect.

In some aspects, an isolated nucleic acid segment and expression cassette including DNA sequences that encode a CAR may be generated. A variety of vectors may be used. In some preferred embodiments, the vector may allow for delivery of the DNA encoding a CAR to immune such as T cells. CAR expression may be under the control of regulated eukaryotic promoter such as, e.g., the MNDU3 promoter, CMV promoter, EF1alpha promoter, or Ubiquitin promoter. Also, the vector may contain a selectable marker, if for no other reason, to facilitate their manipulation in vitro. In some embodiments, the CAR can be expressed from mRNA in vitro transcribed from a DNA template.

Chimeric antigen receptor molecules are recombinant and are distinguished by their ability to both bind antigen and transduce activation signals via immunoreceptor activation motifs (ITAM's) present in their cytoplasmic tails. Receptor constructs utilizing an antigen-binding moiety (for example, generated from single chain antibodies (scFv)) afford the additional advantage of being "universal" in that they can bind native antigen on the target cell surface in an HLA-independent fashion. For example, a scFv constructs may be fused to sequences coding for the intracellular portion of the CD3 complex's zeta chain (ζ), the Fc receptor gamma chain, and sky tyrosine kinase (Eshhar et al., 1993; Fitzer-Attas et al., 1998). Re-directed T cell effector mechanisms including tumor recognition and lysis by CTL have been documented in several murine and human antigen-scFv: ζ systems (Eshhar et al., 1997; Altenschmidt et al., 1997; Brocker et al., 1998).

In some embodiments, a TCR is included in a CAR as the antigen binding domain (e.g., as a scFv region) and the CAR further comprises a hinge region, a transmembrane region, and an endodomain.

C. Soluble TCRs and BiTEs

In addition, the present disclosure provides soluble TCRs which can be used to treat positive cancer patients directly. Soluble bispecific T cell-engaging molecules (BiTEs) can be generated by linking the VGLL1 TCR to CD3-specific Fab fragments. These bispecific molecules can bind the tumor cell surface via their VGLL1 TCR binding to the peptide/HLA complex, and the CD3-specific Fab fragments would crosslink the TCR. This would result in cellular activation and elimination of the target cell. Thus, these soluble bispecific TCR constructs can be used for treating the cancer patients directly.

Finally, the soluble TCR can be used as a probe for diagnostic evaluation of peptide/MHC in tumor cells or to direct therapeutic molecules to the tumor site. This soluble TCR molecule also could be labeled with tracers such as a fluorescent probe or radioactive probe, and then used for diagnostic evaluation of the presentation of peptide/MHC in tumor cells. Furthermore, this soluble TCR molecule could be linked with therapeutic molecules such as toxin, and then direct these therapeutic molecules to the tumor sites for the treatment of cancer patients.

In some embodiments, the present disclosure provides soluble TCRs, such as a VGLL1-specific TCR provided herein. Soluble TCRs may be used for investigating specific TCR-pMHC interactions or as a diagnostic tool to detect infection, or to detect autoimmune disease markers. Soluble TCRs may have applications in staining, for example to stain cells for the presence of a particular peptide antigen presented in the context of the MHC. Similarly, soluble TCRs can be used to deliver a therapeutic agent, for example a cytotoxic compound or an immunostimulating compound, to cells presenting a particular antigen. Soluble TCRs may also be used to inhibit T cells, for example, those reacting to an auto-immune peptide antigen. In some aspects, the TCR is linked to another molecule that delivers a cell in proximity to the tumor. In further aspects, the TCR delivers a toxin, a cytokine, costimulatory ligand, or inhibitor ligand and directs the molecule, cell or compound to the target cells expressing the peptide-MHC.

In some aspects, the present disclosure provides a soluble T cell receptor (sTCR), which comprises (i) all or part of a TCR α chain (e.g., SEQ ID NOs:1, 24, 47, or 70), except the transmembrane domain thereof, and (ii) all or part of a TCR β chain (e.g., SEQ ID NOs: 7, 30, 53, or 76), except the transmembrane domain thereof, wherein (i) and (ii) each comprise a functional variable domain and at least a part of the constant domain of the TCR chain, and are linked by a disulphide bond between constant domain residues which is not present in native TCR.

In some aspects, the soluble TCR comprises a TCR α or γ chain extracellular domain dimerized to a TCR β or δ chain extracellular domain respectively, by means of a pair of C-terminal dimerization peptides, such as leucine zippers.

A soluble TCR of the present disclosure may be provided in substantially pure form, or as a purified or isolated preparation. For example, it may be provided in a form which is substantially free of other proteins.

A plurality of soluble TCRs of the present disclosure may be provided in a multivalent complex. Thus, the present disclosure provides, in one aspect, a multivalent TCR complex, which comprises a plurality of soluble TCRs as described herein. Each of the plurality of soluble TCRs is preferably identical.

In its simplest form, a multivalent TCR complex according to the present disclosure comprises a multimer of two or three or four or more T cell receptor molecules associated (e.g. covalently or otherwise linked) with one another, preferably via a linker molecule. Suitable linker molecules include, but are not limited to, multivalent attachment molecules such as avidin, streptavidin, neutravidin and extravidin, each of which has four binding sites for biotin. Thus, biotinylated TCR molecules can be formed into multimers of TCRs having a plurality of TCR binding sites. The number of TCR molecules in the multimer will depend upon the quantity of TCR in relation to the quantity of linker molecule used to make the multimers, and also on the presence or absence of any other biotinylated molecules. Preferred multimers are dimeric, trimeric or tetrameric TCR complexes.

Suitable structures for use in the present methods include membrane structures such as liposomes and solid structures which are preferably particles such as beads, for example latex beads. Other structures which may be externally coated with T cell receptor molecules are also suitable. Preferably, the structures are coated with T cell receptor multimers rather than with individual T cell receptor molecules.

In the case of liposomes, the T cell receptor molecules or multimers thereof may be attached to or otherwise associated with the membrane. Techniques for this are well known to those skilled in the art.

A label or another moiety, such as a toxic or therapeutic moiety, may be included in a multivalent TCR complex of the present disclosure. For example, the label or other moiety may be included in a mixed molecule multimer. An example of such a multimeric molecule is a tetramer containing three TCR molecules and one peroxidase molecule. This could be achieved by mixing the TCR and the enzyme at a molar ratio of 3:1 to generate tetrameric complexes, and isolating the desired complex from any complexes not containing the correct ratio of molecules. These mixed molecules could contain any combination of molecules, provided that steric hindrance does not compromise or does not significantly compromise the desired function of the molecules. The positioning of the binding sites on the streptavidin molecule is suitable for mixed tetramers since steric hindrance is not likely to occur.

The TCR (or multivalent complex thereof) of the present disclosure may alternatively or additionally be associated with (e.g. covalently or otherwise linked to) a therapeutic agent which may be, for example, a toxic moiety for use in cell killing, or an immunostimulating agent such as an interleukin or a cytokine. A multivalent TCR complex of the present disclosure may have enhanced binding capability for a TCR ligand compared to a non-multimeric T cell receptor heterodimer. Thus, the multivalent TCR complexes according to the present disclosure are particularly useful for tracking or targeting cells presenting particular antigens in vitro or in vivo, and are also useful as intermediates for the production of further multivalent TCR complexes having such uses. The TCR or multivalent TCR complex may therefore be provided in a pharmaceutically acceptable formulation for use in vivo.

The present disclosure also provides a method for delivering a therapeutic agent to a target cell, which method comprises contacting potential target cells with a TCR or multivalent TCR complex in accordance with the present disclosure under conditions to allow attachment of the TCR or multivalent TCR complex to the target cell, said TCR or multivalent TCR complex being specific for the TCR ligand and having the therapeutic agent associated therewith.

In particular, the soluble TCR or multivalent TCR complex can be used to deliver therapeutic agents to the location of cells presenting a particular antigen. This would be useful in many situations and, in particular, against tumors. A therapeutic agent could be delivered such that it would exercise its effect locally but not only on the cell it binds to. Thus, one particular strategy envisages anti-tumor molecules linked to T cell receptors or multivalent TCR complexes specific for tumor antigens.

Many therapeutic agents could be employed for this use, for instance radioactive compounds, enzymes (perform for example) or chemotherapeutic agents (cisplatin for example). To ensure that toxic effects are exercised in the desired location the toxin could be inside a liposome linked to streptavidin so that the compound is released slowly. This will prevent damaging effects during the transport in the body and ensure that the toxin has maximum effect after binding of the TCR to the relevant antigen presenting cells.

The soluble TCRs of the present disclosure may be used to modulate T cell activation by binding to specific TCR ligand and thereby inhibiting T cell activation. Autoimmune diseases involving T cell-mediated inflammation and/or tissue damage would be amenable to this approach, for example type I diabetes. Knowledge of the specific peptide epitope presented by the relevant pMHC is required for this use.

The use of the soluble TCRs and/or multivalent TCR complexes of the present disclosure in the preparation of a composition for the treatment of cancer or autoimmune disease is also envisaged.

Also provided is a method of treatment of cancer or autoimmune disease comprising administration to a patient in need thereof of an effective amount of the soluble TCRs and/or multivalent TCR complexes of the present disclosure.

As is common in anti-cancer and autoimmune therapy the soluble TCRs of the present disclosure may be used in combination with other agents for the treatment of cancer and autoimmune disease, and other related conditions found in similar patient groups.

III. Adoptive Cell Transfer Therapies

Provided herein are methods for treating or delaying progression of cancer in an individual comprising administering to the individual an effective amount an antigen-specific cell (e.g., autologous or allogeneic T cells (e.g., regulatory T cells, CD4+ T cells, CD8+ T cells, or gamma-delta T cells), NK cells, invariant NK cells, NKT cells, MSCs, or iPS cells) therapy, such as a VGLL1-specific cell therapy. Adoptive T cell therapies with genetically engineered TCR-transduced T cells (e.g., expressing a TCR comprising one of SEQ ID NOs: 1-92) are also provided herein. In some embodiments, the adoptive cell transfer therapy is provided to a subject (e.g., a human patient) in combination with as second therapy, such as a chemotherapy, a radiotherapy, a surgery, or a second immunotherapy.

Embodiments of the present disclosure concern obtaining and administering TCR-engineered cells to a subject as an immunotherapy to target cancer cells. In particular, the TCR-engineered cells are antigen-specific cells (e.g., VGLL1-specific cells). Several basic approaches for the derivation, activation and expansion of functional anti-tumor effector cells have been described in the last two decades. These include: autologous cells, such as tumor-infiltrating lymphocytes (TILs); T cells activated ex-vivo using autologous DCs, lymphocytes, artificial antigen-presenting cells (APCs) or beads coated with T cell ligands and activating antibodies, or cells isolated by virtue of capturing target cell membrane; allogeneic cells naturally expressing anti-host tumor T cell receptor (TCR); and non-tumor-specific autologous or allogeneic cells genetically reprogrammed or "redirected" to express tumor-reactive TCR or chimeric TCR molecules displaying antibody-like tumor recognition capacity known as "T-bodies". These approaches have given rise to numerous protocols for T cell preparation and immunization which can be used in the methods described herein.

A. T Cell Preparation

In some embodiments, the T cells are derived from the blood, bone marrow, lymph, or lymphoid organs. In some aspects, the cells are human cells. The cells typically are primary cells, such as those isolated directly from a subject and/or isolated from a subject and frozen. In some embodiments, the cells include one or more subsets of T cells or other cell types, such as whole T cell populations, CD4+ cells, CD8+ cells, and subpopulations thereof, such as those defined by function, activation state, maturity, potential for differentiation, expansion, recirculation, localization, and/or persistence capacities, antigen-specificity, type of antigen receptor, presence in a particular organ or compartment, marker or cytokine secretion profile, and/or degree of differentiation. With reference to the subject to be treated, the cells may be allogeneic and/or autologous. In some aspects, such as for off-the-shelf technologies, the cells are pluripotent and/or multipotent, such as stem cells, such as induced pluripotent stem cells (iPSCs). In some embodiments, the methods include isolating cells from the subject, preparing, processing, culturing, and/or engineering them, as described herein, and re-introducing them into the same patient, before or after cryopreservation.

Among the sub-types and subpopulations of T cells (e.g., CD4+ and/or CD8+ T cells) are naive T ($T_N$) cells, effector T cells ($T_{EFF}$), memory T cells and sub-types thereof, such as stem cell memory T ($TSC_M$), central memory T ($TC_M$), effector memory T ($T_{EM}$), or terminally differentiated effector memory T cells, tumor-infiltrating lymphocytes (TIL), immature T cells, mature T cells, helper T cells, cytotoxic T cells, mucosa-associated invariant T (MAIT) cells, naturally occurring and adaptive regulatory T (Treg) cells, helper T cells, such as TH1 cells, TH2 cells, TH3 cells, TH17 cells, TH9 cells, TH22 cells, follicular helper T cells, alpha/beta T cells, and delta/gamma T cells.

In some embodiments, one or more of the T cell populations is enriched for or depleted of cells that are positive for a specific marker, such as surface markers, or that are negative for a specific marker. In some cases, such markers are those that are absent or expressed at relatively low levels on certain populations of T cells (e.g., non-memory cells) but are present or expressed at relatively higher levels on certain other populations of T cells (e.g., memory cells).

In some embodiments, T cells are separated from a PBMC sample by negative selection of markers expressed on non-T cells, such as B cells, monocytes, or other white blood cells, such as CD14. In some aspects, a CD4+ or CD8+ selection step is used to separate CD4+ helper and CD8+ cytotoxic T cells. Such CD4+ and CD8+ populations can be further sorted into sub-populations by positive or negative selection for markers expressed or expressed to a relatively higher degree on one or more naive, memory, and/or effector T cell subpopulations.

In some embodiments, CD8+ T cells are further enriched for or depleted of naive, central memory, effector memory, and/or central memory stem cells, such as by positive or negative selection based on surface antigens associated with the respective subpopulation. In some embodiments, enrichment for central memory T ($T_{CM}$) cells is carried out to increase efficacy, such as to improve long-term survival, expansion, and/or engraftment following administration, which in some aspects is particularly robust in such subpopulations. See Terakura et al. (2012) *Blood.* 1:72-82; Wang et al. (2012) *J Immunother.* 35(9):689-701.

In some embodiments, the T cells are autologous T cells. In this method, tumor samples are obtained from patients and a single cell suspension is obtained. The single cell suspension can be obtained in any suitable manner, e.g., mechanically (disaggregating the tumor using, e.g., a gentleMACS™ Dissociator, Miltenyi Biotec, Auburn, Calif.) or enzymatically (e.g., collagenase or DNase). Single-cell suspensions of tumor enzymatic digests are cultured in interleukin-2 (IL-2). The cells are cultured until confluence (e.g., about $2\times10^6$ lymphocytes), e.g., from about 5 to about 21 days, preferably from about 10 to about 14 days.

The cultured T cells can be pooled and rapidly expanded. Rapid expansion provides an increase in the number of antigen-specific T cells of at least about 50-fold (e.g., 50-, 60-, 70-, 80-, 90-, or 100-fold, or greater) over a period of about 10 to about 14 days. More preferably, rapid expansion provides an increase of at least about 200-fold (e.g., 200-, 300-, 400-, 500-, 600-, 700-, 800-, 900-, or greater) over a period of about 10 to about 14 days.

Expansion can be accomplished by any of a number of methods as are known in the art. For example, T cells can be rapidly expanded using non-specific T cell receptor stimulation in the presence of feeder lymphocytes and either interleukin-2 (IL-2) or interleukin-15 (IL-15), with IL-2 being preferred. The non-specific T-cell receptor stimulus can include around 30 ng/ml of OKT3, a mouse monoclonal anti-CD3 antibody (available from Ortho-McNeil®, Raritan, N.J.). Alternatively, T cells can be rapidly expanded by stimulation of peripheral blood mononuclear cells (PBMC) in vitro with one or more antigens (including antigenic portions thereof, such as epitope(s), or a cell) of the cancer, which can be optionally expressed from a vector, such as an human leukocyte antigen A1 (HLA-A1) binding peptide, in the presence of a T-cell growth factor, such as IL-2. The in vitro-induced T-cells are rapidly expanded by re-stimulation with the same antigen(s) of the cancer pulsed onto HLA- A1-expressing antigen-presenting cells. Alternatively, the T-cells can be re-stimulated with irradiated, autologous lymphocytes or with irradiated HLA-A1+ allogeneic lymphocytes and IL-2, for example.

The autologous T-cells can be modified to express a T-cell growth factor that promotes the growth and activation of the autologous T-cells. Suitable T-cell growth factors include, for example, interleukin (IL)-2, IL-7, IL-15, and IL-12. Suitable methods of modification are known in the art. See, for instance, Sambrook et al., *Molecular Cloning: A Laboratory Manual*, 3rd ed., Cold Spring Harbor Press, Cold Spring Harbor, N.Y. 2001; and Ausubel et al., *Current Protocols in Molecular Biology*, Greene Publishing Associates and John Wiley & Sons, N Y, 1994. In particular aspects, modified autologous T-cells express the T-cell growth factor at high levels. T-cell growth factor coding sequences, such as that of IL-12, are readily available in the art, as are promoters, the operable linkage of which to a T-cell growth factor coding sequence promote high-level expression.

B. Methods of Treatment

Further provided herein are methods for treating or delaying progression of cancer in an individual comprising administering to the individual an effective amount an antigen-specific T cell therapy, such as a VGLL1-specific T cell therapy. Adoptive T cell therapies with genetically engineered TCR-transduced T cells (conjugate TCR to other bioreactive proteins (e.g., anti-CD3) are also provided herein. In further embodiments, methods are provided for the treatment of cancer comprising immunizing a subject with a purified tumor antigen or an immunodominant tumor antigen-specific peptide.

Examples of cancers contemplated for treatment include lung cancer, head and neck cancer, breast cancer, pancreatic cancer, prostate cancer, renal cancer, bone cancer, testicular cancer, cervical cancer, gastrointestinal cancer, lymphomas, pre-neoplastic lesions in the lung, colon cancer, melanoma, and bladder cancer. Additional exemplary cancers include, but are not limited to, lung cancer, head and neck cancer, breast cancer, pancreatic cancer, prostate cancer, renal cancer, bone cancer, testicular cancer, cervical cancer, gastrointestinal cancer, lymphomas, pre-neoplastic lesions in the lung, colon cancer, melanoma, and bladder cancer. Further examples cancers include melanomas, malignant melanomas, colon carcinomas, lymphomas, sarcomas, blastomas, renal carcinomas, gastrointestinal tumors, gliomas, prostate tumors, bladder cancer, rectal tumors, stomach cancer, oesophageal cancer, pancreatic cancer, liver cancer, mammary carcinomas, uterine cancer, cervical cancer, acute myeloid leukaemia (AML), acute lymphoid leukaemia (ALL), chronic myeloid leukaemia (CML), chronic lymphocytic leukaemia (CLL), leukaemia, hepatomas, various virus-induced tumors such as, for example, papilloma virus-induced carcinomas (e.g. cervical carcinoma), adenocarcino-mas, herpes virus-induced tumors (e.g. Burkitt's lymphoma, EBV-induced B cell lymphoma), heptatitis B-induced tumors (hepatocell carcinomas), HTLV-1- and HTLV-2-induced lym-phomas, acoustic neuroma, lung carcinomas, small-cell lung carcinomas, pharyngeal cancer, anal carcinoma, glioblastoma, rectal carcinoma, astrocytoma, brain tumors, retinoblastoma, basalioma, brain metastases, medulloblastomas, vaginal cancer, pancreatic cancer, testicular cancer, Hodgkin's syndrome, meningiomas, Schneeberger disease, hypophysis tumor, Mycosis fungoides, carcinoids, neurinoma, spinalioma, Burkitt's lymphoma, laryngeal cancer, renal cancer, thymoma, corpus carcinoma, bone cancer, non-Hodgkin's lymphomas, urethral cancer, CUP syndrome, head/neck tumors, oligodendrogli-oma, vulval cancer, intestinal cancer, colon carcinoma, oesophageal carcinoma, wart involvement, tumors of the small intestine, craniopharyngeomas, ovarian carcinoma, genital tumors, ovarian cancer, pancreatic carcinoma, endometrial carcinoma, liver metastases, penile cancer, tongue cancer, gall bladder cancer, leukaemia, plasmocytoma, lid tumor, and prostate cancer.

In some embodiments, T cells are autologous. However, the cells can be allogeneic. In some embodiments, the T cells are isolated from the patient themself, so that the cells are autologous. If the T cells are allogeneic, the T cells can be pooled from several donors. The cells are administered to the subject of interest in an amount sufficient to control, reduce, or eliminate symptoms and signs of the disease being treated.

In some embodiments, the subject can be administered nonmyeloablative lymphodepleting chemotherapy prior to the T cell therapy. The nonmyeloablative lymphodepleting chemotherapy can be any suitable such therapy, which can be administered by any suitable route. The nonmyeloablative lymphodepleting chemotherapy can comprise, for example, the administration of cyclophosphamide and fludarabine, particularly if the cancer is melanoma, which can be metastatic. An exemplary route of administering cyclophosphamide and fludarabine is intravenously. Likewise, any suitable dose of cyclophosphamide and fludarabine can be administered. In particular aspects, around 60 mg/kg of cyclophosphamide is administered for two days after which around 25 mg/m$^2$ fludarabine is administered for five days.

In certain embodiments, a T-cell growth factor that promotes the growth and activation of the autologous T cells is administered to the subject either concomitantly with the autologous T cells or subsequently to the autologous T cells. The T-cell growth factor can be any suitable growth factor that promotes the growth and activation of the autologous T-cells. Examples of suitable T-cell growth factors include interleukin (IL)-2, IL-7, IL-15, and IL-12, which can be used alone or in various combinations, such as IL-2 and IL-7, IL-2 and IL-15, IL-7 and IL-15, IL-2, IL-7 and IL-15, IL-12 and IL-7, IL-12 and IL-15, or IL-12 and IL2. IL-12 is a preferred T-cell growth factor.

The T cell may be administered intravenously, intramuscularly, subcutaneously, topically, orally, transdermally, intraperitoneally, intraorbitally, by implantation, by inhalation, intrathecally, intraventricularly, or intranasally. The appropriate dosage of the T cell therapy may be determined based on the type of disease to be treated, severity and course of the disease, the clinical condition of the individual, the individual's clinical history and response to the treatment, and the discretion of the attending physician.

Intratumoral injection, or injection into the tumor vasculature is specifically contemplated for discrete, solid, accessible tumors. Local, regional or systemic administration also may be appropriate. For tumors of >4 cm, the volume to be administered will be about 4-10 ml (in particular 10 ml), while for tumors of <4 cm, a volume of about 1-3 ml will be used (in particular 3 ml). Multiple injections delivered as single dose comprise about 0.1 to about 0.5 ml volumes.

C. Pharmaceutical Compositions

In select embodiments, it is contemplated that a cell expressing a TCR as disclosed herein, a protein containing the variable regions of a TCR, or a DNA encoding the variable regions of a TCR of the present disclosure may be comprised in a vaccine composition and administered to a subject to induce a therapeutic immune response in the subject towards a cancer, such as a cancer that expresses VGLL1. A vaccine composition for pharmaceutical use in a subject may comprise a tumor antigen peptide (e.g., VGLL1) composition disclosed herein and a pharmaceutically acceptable carrier. A therapeutic composition for pharmaceutical use in a subject may comprise a TCR composition disclosed herein, such as a soluble TCR (optionally attached to an imaging agent), and a pharmaceutically acceptable carrier.

As used herein, a "protective immune response" refers to a response by the immune system of a mammalian host to a cancer. A protective immune response may provide a therapeutic effect for the treatment of a cancer, e.g., decreasing tumor size, increasing survival, etc.

A person having ordinary skill in the medical arts will appreciate that the actual dosage amount of a therapeutic composition administered to an animal or human patient can be determined by physical and physiological factors such as body weight, severity of condition, the type of disease being treated, previous or concurrent therapeutic interventions, idiopathy of the patient and on the route of administration. The practitioner responsible for administration will, in any event, determine the concentration of active ingredient(s) in a composition and appropriate dose(s) for the individual subject.

A therapeutic composition disclosed herein can be administered intravenously, intradermally, intraarterially, intraperitoneally, intralesionally, intracranially, intraarticularly, intraprostaticaly, intrapleurally, intratracheally, intranasally, intravitreally, intravaginally, intrarectally, topically, intratumorally, intramuscularly, intraperitoneally, subcutaneously, subconjunctivally, intravesicularlly, mucosally, intrapericardially, intraumbilically, intraocularly, orally, topically, locally, and by inhalation, injection, infusion, continuous infusion, lavage, and localized perfusion. A therapeutic composition may also be administered to a subject via a catheter, in cremes, in lipid compositions, by ballistic particulate delivery, or by other method or any combination of the forgoing as would be known to one of ordinary skill in the art (see, for example, Remington: The Science and Practice of Pharmacy, 21$^{st}$ Ed. Lippincott Williams and Wilkins, 2005, incorporated herein by reference).

While any suitable carrier known to those of ordinary skill in the art may be employed in the pharmaceutical compositions of this invention, the type of carrier will vary depending on the mode of administration. For parenteral administration, such as subcutaneous injection, the carrier preferably comprises water, saline, alcohol, a fat, a wax or a buffer. For oral administration, any of the above carriers or a solid carrier, such as mannitol, lactose, starch, magnesium stearate, sodium saccharine, talcum, cellulose, glucose, sucrose, and magnesium carbonate, may be employed. Biodegradable microspheres (e.g., polylactic galactide) may also be employed as carriers for the pharmaceutical compositions of this invention. Suitable biodegradable microspheres are disclosed, for example, in U.S. Pat. Nos. 4,897, 268 and 5,075,109.

In some embodiments, the vaccine composition may be administered by microstructured transdermal or ballistic particulate delivery. Microstructures as carriers for vaccine formulation are a desirable configuration for vaccine applications and are widely known in the art (Gerstel and Place 1976 (U.S. Pat. No. 3,964,482); Ganderton and McAinsh 1974 (U.S. Pat. No. 3,814,097); U.S. Pat. Nos. 5,797,898, 5,770,219 and 5,783,208, and U.S. Patent Application 2005/ 0065463). In these embodiments, a support substrate can include, but is not limited to, a microcapsule, a micropar- ticle, a microsphere, a nanocapsule, a nanoparticle, a nanosphere, or a combination thereof.

Microstructures or ballistic particles that serve as a support substrate for an TCR, such as a soluble TCR, disclosed herein may be comprised of biodegradable material and non-biodegradable material, and such support substrates may be comprised of synthetic polymers, silica, lipids, carbohydrates, proteins, lectins, ionic agents, crosslinkers, and other microstructure components available in the art. Protocols and reagents for the immobilization of a peptide of the invention to a support substrate composed of such materials are widely available commercially and in the art.

In other embodiments, a vaccine composition comprises an immobilized or encapsulated TCR or soluble TCR disclosed herein and a support substrate. In these embodiments, a support substrate can include, but is not limited to, a lipid microsphere, a lipid nanoparticle, an ethosome, a liposome, a niosome, a phospholipid, a sphingosome, a surfactant, a transferosome, an emulsion, or a combination thereof. The formation and use of liposomes and other lipid nano- and microcarrier formulations is generally known to those of ordinary skill in the art, and the use of liposomes, microparticles, nanocapsules and the like have gained widespread use in delivery of therapeutics (e.g., U.S. Pat. No. 5,741,516, specifically incorporated herein in its entirety by reference). Numerous methods of liposome and liposome-like preparations as potential drug carriers, including encapsulation of peptides, have been reviewed (U.S. Pat. Nos. 5,567,434; 5,552,157; 5,565,213; 5,738,868 and 5,795,587, each of which is specifically incorporated in its entirety by reference).

In addition to the methods of delivery described herein, a number of alternative techniques are also contemplated for administering the disclosed vaccine compositions. By way of nonlimiting example, a vaccine composition may be administered by sonophoresis (i.e., ultrasound) which has been used and described in U.S. Pat. No. 5,656,016 for enhancing the rate and efficacy of drug permeation into and through the circulatory system; intraosseous injection (U.S. Pat. No. 5,779,708), or feedback-controlled delivery (U.S. Pat. No. 5,697,899), and each of the patents in this paragraph is specifically incorporated herein in its entirety by reference.

Any of a variety of adjuvants may be employed in the vaccines of the present disclosure to nonspecifically enhance the immune response. Most adjuvants contain a substance designed to protect the antigen from rapid catabolism, such as aluminum hydroxide or mineral oil, and a nonspecific stimulator of immune responses, such as lipid A, *Bortadella pertussis* or *Mycobacterium tuberculosis*. Suitable adjuvants are commercially available as, for example, Freund's Incomplete Adjuvant and Freund's Complete Adjuvant (Difco Laboratories, Detroit, Mich.) and Merck Adjuvant 65 (Merck and Company, Inc., Rahway, N.J.). Other suitable adjuvants include alum, biodegradable microspheres, monophosphoryl lipid A and quil A.

A soluble TCR may be formulated into a composition in a neutral or salt form. Pharmaceutically acceptable salts, include the acid addition salts (formed with the free amino groups of the protein) and which are formed with inorganic acids such as, for example, hydrochloric or phosphoric acids, or such organic acids such as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

In any case, the composition may comprise various antioxidants to retard oxidation of one or more component. Additionally, the prevention of the action of microorganisms can be brought about by preservatives such as various antibacterial and antifungal agents, including but not limited to parabens (e.g., methylparabens, propylparabens), chlorobutanol, phenol, sorbic acid, thimerosal or combinations thereof.

Sterile injectable solutions are prepared by incorporating the active peptides in the required amount in the appropriate solvent with various of the other ingredients enumerated above, as required, followed by filtered sterilization. Generally, dispersions are prepared by incorporating the various sterilized active ingredients into a sterile vehicle that contains the basic dispersion medium and/or the other ingredients. In the case of sterile powders for the preparation of sterile injectable solutions, suspensions or emulsion, the preferred methods of preparation are vacuum-drying or freeze-drying techniques which yield a powder of the active ingredient plus any additional desired ingredient from a previously sterile-filtered liquid medium thereof. The liquid medium should be suitably buffered if necessary and the liquid diluent first rendered isotonic prior to injection with sufficient saline or glucose. The preparation of highly concentrated compositions for direct injection is also contemplated, where the use of DMSO as solvent is envisioned to result in extremely rapid penetration, delivering high concentrations of the active agents to a small area.

The composition must be stable under the conditions of manufacture and storage, and preserved against the contaminating action of microorganisms, such as bacteria and fungi. It will be appreciated that endotoxin contamination should be kept minimally at a safe level, for example, less than 0.5 ng/mg protein.

In particular embodiments, prolonged absorption of an injectable composition can be brought about by the use in the compositions of agents delaying absorption, such as, for example, aluminum monostearate, gelatin or combinations thereof.

D. Combination Therapies

In certain embodiments, the compositions and methods of the present embodiments involve an antigen peptide or antigen-specific T cell population in combination with at least one additional therapy. The additional therapy may be radiation therapy, surgery (e.g., lumpectomy and a mastectomy), chemotherapy, gene therapy, DNA therapy, viral therapy, RNA therapy, immunotherapy, bone marrow transplantation, nanotherapy, monoclonal antibody therapy, or a combination of the foregoing. The additional therapy may be in the form of adjuvant or neoadjuvant therapy.

In some embodiments, the additional therapy is the administration of small molecule enzymatic inhibitor or anti-metastatic agent. In some embodiments, the additional therapy is the administration of side-effect limiting agents (e.g., agents intended to lessen the occurrence and/or severity of side effects of treatment, such as anti-nausea agents, etc.). In some embodiments, the additional therapy is radiation therapy. In some embodiments, the additional therapy is surgery. In some embodiments, the additional therapy is a combination of radiation therapy and surgery. In some embodiments, the additional therapy is gamma irradiation. In some embodiments, the additional therapy is therapy targeting PBK/AKT/mTOR pathway, HSP90 inhibitor, tubulin inhibitor, apoptosis inhibitor, and/or chemopreventative agent. The additional therapy may be one or more of the chemotherapeutic agents known in the art.

A T cell therapy may be administered before, during, after, or in various combinations relative to an additional cancer therapy, such as immune checkpoint therapy. The administrations may be in intervals ranging from concurrently to minutes to days to weeks. In embodiments where the T cell therapy is provided to a patient separately from an additional therapeutic agent, one would generally ensure that a significant period of time did not expire between the time of each delivery, such that the two compounds would still be able to exert an advantageously combined effect on the patient. In such instances, it is contemplated that one may provide a patient with the antibody therapy and the anti-cancer therapy within about 12 to 24 or 72 h of each other and, more particularly, within about 6-12 h of each other. In some situations it may be desirable to extend the time period for treatment significantly where several days (2, 3, 4, 5, 6, or 7) to several weeks (1, 2, 3, 4, 5, 6, 7, or 8) lapse between respective administrations.

Various combinations may be employed. For the example below an antigen-specific T cell therapy is "A" and an anti-cancer therapy is "B":

A/B/A B/A/B B/B/A A/A/B A/B/B B/A/A A/B/B/B B/A/B/B
B/B/B/A B/B/A/B A/A/B/B A/B/A/B A/B/B/A B/B/A/A
B/A/B/A B/A/A/B A/A/A/B B/A/A/A A/B/A/A A/A/B/A

Administration of any compound or therapy of the present embodiments to a patient will follow general protocols for the administration of such compounds, taking into account the toxicity, if any, of the agents. Therefore, in some embodiments there is a step of monitoring toxicity that is attributable to combination therapy.

1. Chemotherapy

A wide variety of chemotherapeutic agents may be used in accordance with the present embodiments. The term "chemotherapy" refers to the use of drugs to treat cancer. A "chemotherapeutic agent" is used to connote a compound or composition that is administered in the treatment of cancer. These agents or drugs are categorized by their mode of activity within a cell, for example, whether and at what stage they affect the cell cycle. Alternatively, an agent may be characterized based on its ability to directly cross-link DNA, to intercalate into DNA, or to induce chromosomal and mitotic aberrations by affecting nucleic acid synthesis.

Examples of chemotherapeutic agents include alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaI1 and calicheamicin omegaI1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2''-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, famesyl-protein tansferase inhibitors, transplatinum, and pharmaceutically acceptable salts, acids, or derivatives of any of the above.

2. Radiotherapy

Other factors that cause DNA damage and have been used extensively include what are commonly known as γ-rays, X-rays, and/or the directed delivery of radioisotopes to tumor cells. Other forms of DNA damaging factors are also contemplated, such as microwaves, proton beam irradiation (U.S. Pat. Nos. 5,760,395 and 4,870,287), and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

3. Immunotherapy

The skilled artisan will understand that additional immunotherapies may be used in combination or in conjunction with methods of the embodiments. In the context of cancer treatment, immunotherapeutics, generally, rely on the use of immune effector cells and molecules to target and destroy cancer cells. Rituximab (RITUXAN®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, *pertussis* toxin, etc.) and serve as a targeting agent. Alternatively, the effector may be a lymphocyte carrying a surface molecule that interacts, either directly or indirectly, with a tumor cell target. Various effector cells include cytotoxic T cells and NK cells Antibody-drug conjugates have emerged as a breakthrough approach to the development of cancer therapeutics. Cancer is one of the leading causes of deaths in the world. Antibody-drug conjugates (ADCs) comprise monoclonal antibodies (MAbs) that are covalently linked to cell-killing drugs. This approach combines the high specificity of MAbs against their antigen targets with highly potent cytotoxic drugs, resulting in "armed" MAbs that deliver the payload (drug) to tumor cells with enriched levels of the antigen. Targeted delivery of the drug also minimizes its exposure in normal tissues, resulting in decreased toxicity and improved therapeutic index. The approval of two ADC drugs, ADCETRIS® (brentuximab vedotin) in 2011 and KADCYLA® (trastuzumab emtansine or T-DM1) in 2013 by FDA validated the approach. There are currently more than 30 ADC drug candidates in various stages of clinical trials for cancer treatment (Leal et al., 2014). As antibody engineering and linker-payload optimization are becoming more and more mature, the discovery and development of new ADCs are increasingly dependent on the identification and validation of new targets that are suitable to this approach and the generation of targeting MAbs. Two criteria for ADC targets are upregulated/high levels of expression in tumor cells and robust internalization.

In one aspect of immunotherapy, the tumor cell must bear some marker that is amenable to targeting, i.e., is not present on the majority of other cells. Many tumor markers exist and any of these may be suitable for targeting in the context of the present embodiments. Common tumor markers include CD20, carcinoembryonic antigen, tyrosinase (p97), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies currently under investigation or in use are immune adjuvants, e.g., *Mycobacterium bovis, Plasmodium falciparum*, dinitrochlorobenzene, and aromatic compounds (U.S. Pat. Nos. 5,801,005 and 5,739,169; Hui and Hashimoto, 1998; Christodoulides et al., 1998); cytokine therapy, e.g., interferons α, β, and γ, IL-1, GM-CSF, and TNF (Bukowski et al., 1998; Davidson et al., 1998; Hellstrand et al., 1998); gene therapy, e.g., TNF, IL-1, IL-2, and p53 (Qin et al., 1998; Austin-*Ward and Villaseca,* 1998; U.S. Pat. Nos. 5,830,880 and 5,846,945); and monoclonal antibodies, e.g., anti-CD20, anti-ganglioside GM2, and anti-p185 (Hollander, 2012; Hanibuchi et al., 1998; U.S.

U.S. Pat. No. 5,824,311). It is contemplated that one or more anti-cancer therapies may be employed with the antibody therapies described herein.

In some embodiments, the immunotherapy may be an immune checkpoint inhibitor. Immune checkpoints either turn up a signal (e.g., co-stimulatory molecules) or turn down a signal. Inhibitory immune checkpoints that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies (e.g., International Patent Publication WO2015016718; Pardoll, 2012; both incorporated herein by reference). Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present disclosure. For example it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide. Exemplary antibodies are described in U.S. Pat. Nos. U.S. Pat. Nos. 8,735,553, 8,354,509, and 8,008,449, all incorporated herein by reference. Other PD-1 axis antagonists for use in the methods provided herein are known in the art such as described in U.S. Patent Application No. US20140294898, US2014022021, and US20110008369, all incorporated herein by reference.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO*, is an anti-PD-1 antibody described in WO2006/121168. Pembrolizumab, also known as MK-3475, Merck 3475, lambrolizumab, KEYTRUDA*, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156; Hurwitz et al., 1998; Camacho et al., 2004; and Mokyr et al., 1998 can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001014424, WO2000037504, and U.S. Pat. No. 8,017,114; all incorporated herein by reference.

An exemplary anti-CTLA-4 antibody is ipilimumab (also known as 10D1, MDX-010, MDX-101, and Yervoy®) or antigen binding fragments and variants thereof (see, e.g., WO0 1/14424). In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. U.S. Pat. Nos. 5,844,905, 5,885,796 and International Patent Application Nos. WO1995001994 and WO1998042752; all incorporated herein by reference, and immunoadhesins such as described in U.S. Pat. No. 8,329, 867, incorporated herein by reference.

4. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

5. Other Agents

It is contemplated that other agents may be used in combination with certain aspects of the present embodiments to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

IV. Articles of Manufacture or Kits

An article of manufacture or a kit is provided comprising antigen-specific T cells or TCRs is also provided herein. The article of manufacture or kit can further comprise a package insert comprising instructions for using the antigen-specific T cells to treat or delay progression of cancer in an individual or to enhance immune function of an individual having cancer. Any of the antigen-specific T cells described herein may be included in the article of manufacture or kits. Suitable containers include, for example, bottles, vials, bags and syringes. The container may be formed from a variety of materials such as glass, plastic (such as polyvinyl chloride or polyolefin), or metal alloy (such as stainless steel or hastelloy). In some embodiments, the container holds the formulation and the label on, or associated with, the container may indicate directions for use. The article of manufacture or kit may further include other materials desirable from a commercial and user standpoint, including other buffers, diluents, filters, needles, syringes, and package inserts with instructions for use. In some embodiments, the article of manufacture further includes one or more of another agent (e.g., a chemotherapeutic agent, and anti-neoplastic agent). Suitable containers for the one or more agent include, for example, bottles, vials, bags and syringes.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Vestigial-Like 1 is a Shared Targetable Cancer-Placenta Antigen Expressed by Pancreatic and Basal-Like Breast Cancers Immunopeptidome analysis of PDAC patient tumors identifies tumor-associated peptides: To identify peptide targets for CTL-based immunotherapy of PDAC, 39 tumor specimens derived from 35 PDAC patients treated at M.D. Anderson Cancer Center were analyzed. This included 34 freshly-excised surgical specimens (20 metastatic and 14 primary tumors), in addition to 3 patient-derived xenografts (PDX) and 2 organoid cell lines derived from metastases. Tumor cells were lysed and subjected to total HLA class I immunoprecipitation and acid elution, followed by tandem mass spectrometry (MS) to analyze the HLA-bound peptides. Eluted peptide fragmentation spectra were searched against the Swiss-Prot database (updated 9/2018) to identify matches encoded within the human proteome. Individual peptide matches were assessed using several orthogonal parameters, including Mascot Ion score, MST mass differential (delta mass), and predicted binding to the patient's HLA allotypes as determined by high-resolution genetic sequencing. Further validation and potential suitability as therapeutic TAA targets was determined by evaluating all peptide-encoding genes for (1) patient tumor tissue transcript expression as determined by RNAseq, (2) normal tissue transcript expression (GTex Portal database), and (3) overall expression in tumor tissues (TCGA database) (FIG. 1A).

Figure 7:
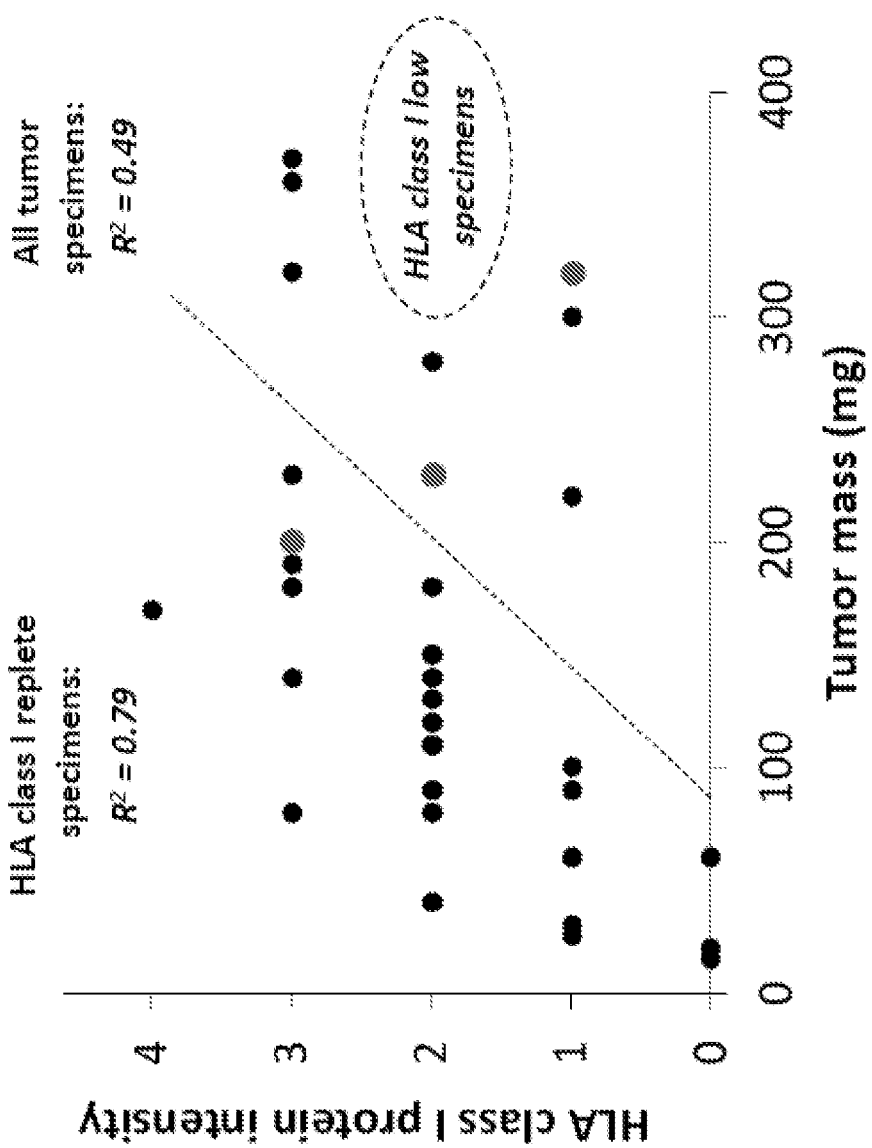
FIG. 7: Quantity of immunoprecipitated HLA class I correlates with PDAC tumor specimen weight. Surgical tumor resections from PDAC patients (n=34) or patient-derived xenografts (n=3) was weighed prior to tissue lysis and immunoprecipitation of total HLA class I using mAb W6/32. Recovered HLA class I was quantitated based on Western blot analysis by assessing the HLA class I band intensity (expected size 42-44 KD) on a scale of 0 (none detected) to 4 (highest level detected). Graph shows specimen weight plotted by Western blot band intensity; the dotted line delineates samples with lower than expected HLA class I recovery, indicating reduced tumor HLA expression.
Figure 8:
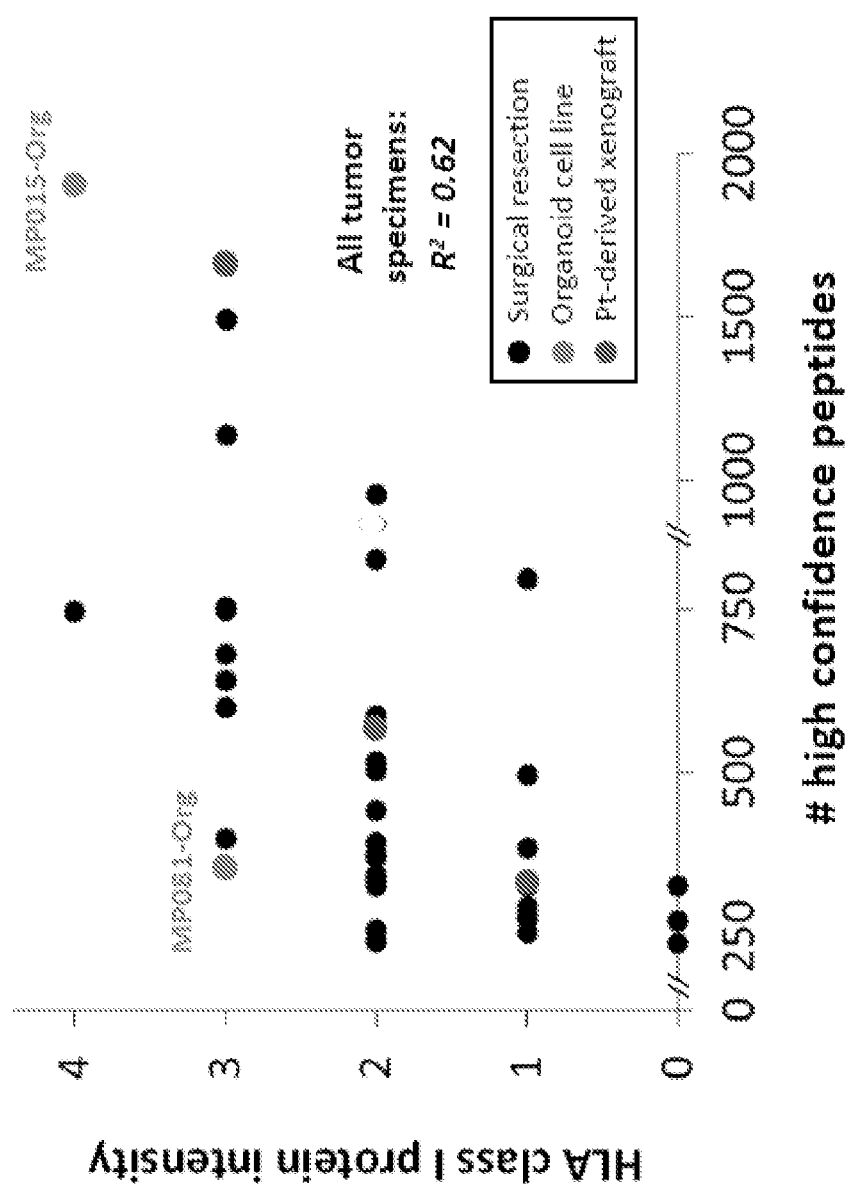
FIG. 8: Total number of detected PDAC-associated peptides correlates with quantity of recovered HLA class I. HLA class I recovered from PDAC patient-derived surgical resections (n=34), xenografts (n=3), or organoid cell lines (n=2) was quantitated by Western blot analysis by assessing the HLA class I band intensity (size 42-44 KD) on a scale of 0 (none detected) to 4 (highest level detected). Peptides eluted from immunoprecipitated HLA class I were analyzed by tandem MS and searched against the SwissProt human proteome database. Graph shows number of unique, high quality peptide matches plotted against HLA class I intensity as analyzed by Western blot.

The amount of immunoprecipitated HLA class I correlated with the size of the fresh tumor specimens analyzed ($R^2=0.79$), with the exception of 8 tumors (21.6%) that showed relatively low HLA class I expression as assessed by Western blot analysis (FIG. 7, Table 1). As expected, HLA class I protein levels correlated with the number of Swiss-Prot database matches to eluted peptides ($R^2=0.62$, FIG. 8). Overall, the 39 tumor specimens analyzed yielded a total of 23,245 unique, high confidence peptide identities, of which 7,966 peptides (34.3%) were 8- to 13-mer peptides predicted to bind to one or more patient HLA class I allotypes. Fresh tumor specimens yielded a highly variable number of peptides, ranging from 238 to 1657 (mean=542). For 3 patients, PDX derivation resulted in larger tumor specimens, yielding an increased number of eluted peptides in all 3 cases. One of the two patient-derived organoid cell lines (MP015) yielded the highest number of eluted peptides overall (n=1903), underscoring the quantitative advantage provided by expanding tumor specimens in vitro prior to MS analysis (Table 2, FIG. 8).

VGLL1 is expressed by multiple cancer types and is associated with poorer overall survival: VGLL1, also known as TONDU, was first identified as the human homolog of the

TABLE 2

VGLL1-derived peptide eluted from two HLA-A*0101 + PDAC patient tumor organoids.

| Patient Identifier | Eluted peptide | Source gene(s) | Match rank | Tumor RNA expression (RNAseq, TPM) | Predicted HLA binding affinity (nM) | | | | | |
|---|---|---|---|---|---|---|---|---|---|---|
| C(1203 | LSELETPGKY | VGLL1 | 1 | 77.53 | A*0101 51 | A*2601 12558 | B*3502 33903 | B*3801 29369 | C*0401 30164 | C*1203 6181 |
| MP081 | LSELETPGKY | VGLL1 | 1 | 56.39 | A*0101 51 | A*0101 51 | B*3502 33903 | B*5701 11936 | C*0401 30164 | C*0602 35852 |

Figure 1B:
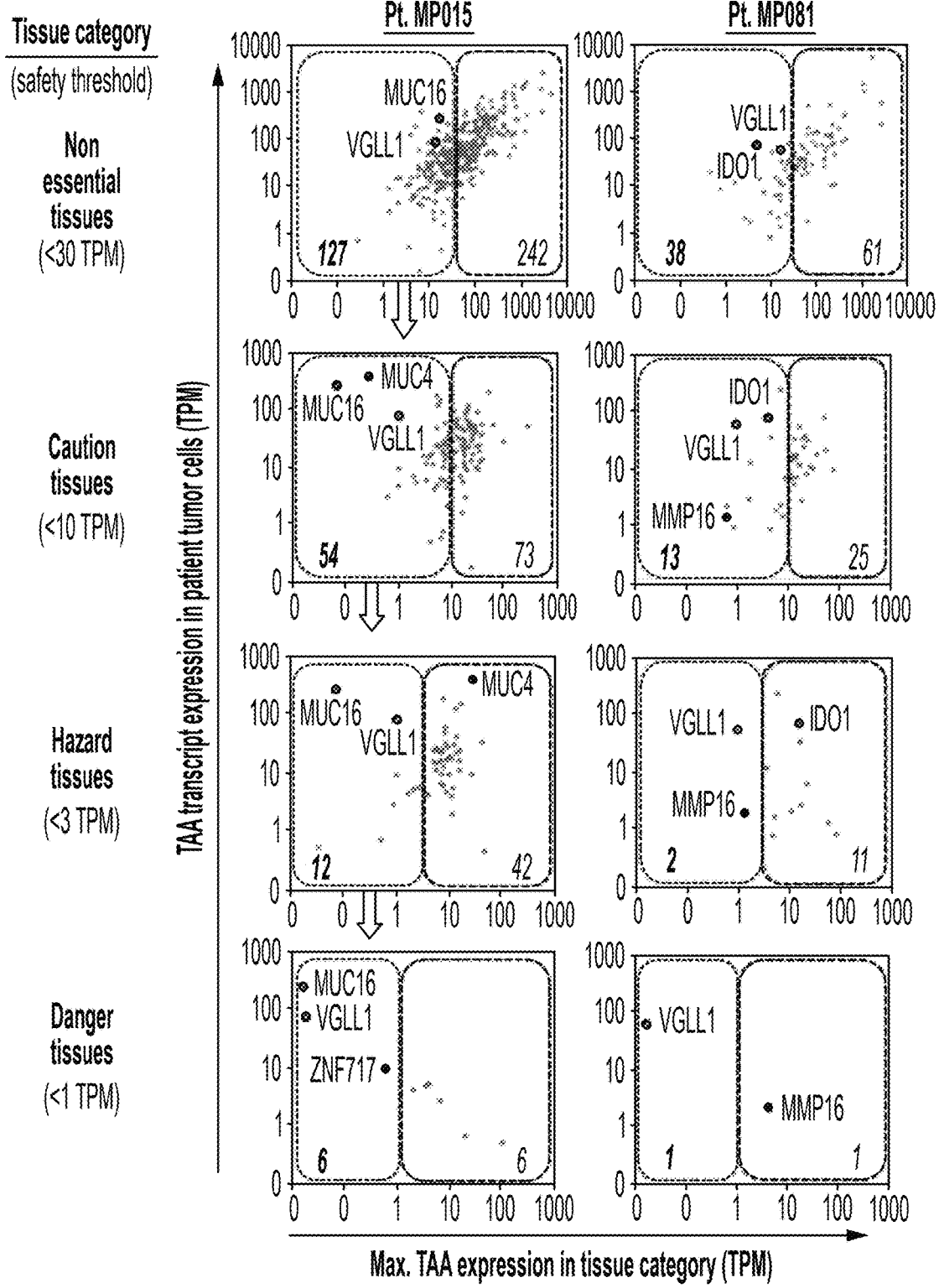

Expression profiling of peptide-encoding genes identified VGLL1 as a novel pancreatic cancer TAA: To evaluate if any of the eluted peptides constituted potential therapeutic CTL targets, peptide-encoding genes were individually assessed for normal tissue transcript expression with reference to the GTex Portal database containing RNAseq data derived from >50 different human tissues. Normal tissues (excluding testis) were categorized into 4 groups that reflected the potential toxicities expected from off-target killing activity by antigen-specific CTLs (Table 2). Peptide-encoding genes were then screened using four corresponding expression filters of increasing stringency in order to eliminate candidate TAAs most likely to elicit autoimmune toxicity in the context of CTL therapy (FIG. 1B). Thus, while TAA transcript expression up to 30 TPM maximum was allowed in non-essential tissues (such as prostate, breast, and adipose tissues), a maximum expression threshold of 1 TPM was imposed for highly essential tissues such as heart and brain, for which CTL recognition can be lethal. Using these stringent criteria, 12 TAA peptides were deemed safest to target, the genes encoding these peptides being MUC16 (encoding 5 unique peptides), MUC19, ZNF717, EIF5AL1, RGPD1, SLC30A8, MIA2, and VGLL1 (each encoding 1 unique peptide). Peptides encoded by TAAs MSLN and IDO1 were also detected, but were excluded in the screening due to elevated RNA transcript expression in normal lung tissue (88 TPM and 16 TPM, respectively, FIG. 1B). Amongst the TAAs deemed safest to target, only 2 peptides (derived fromMIA2 and VGLL1) were found to be presented by tumors of more than one PDAC patient (Table 2).

Figure 1C:
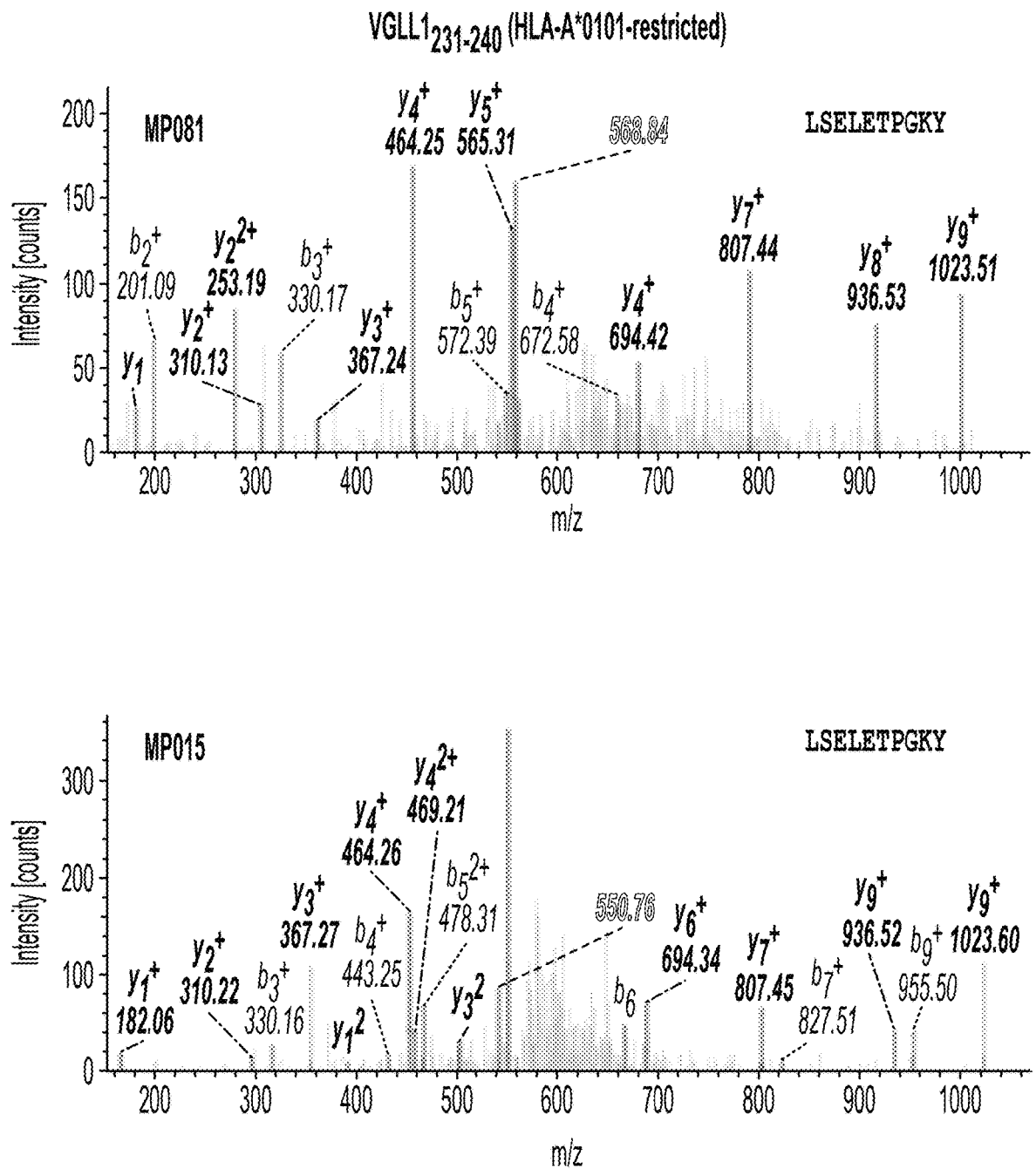
Figure 9:
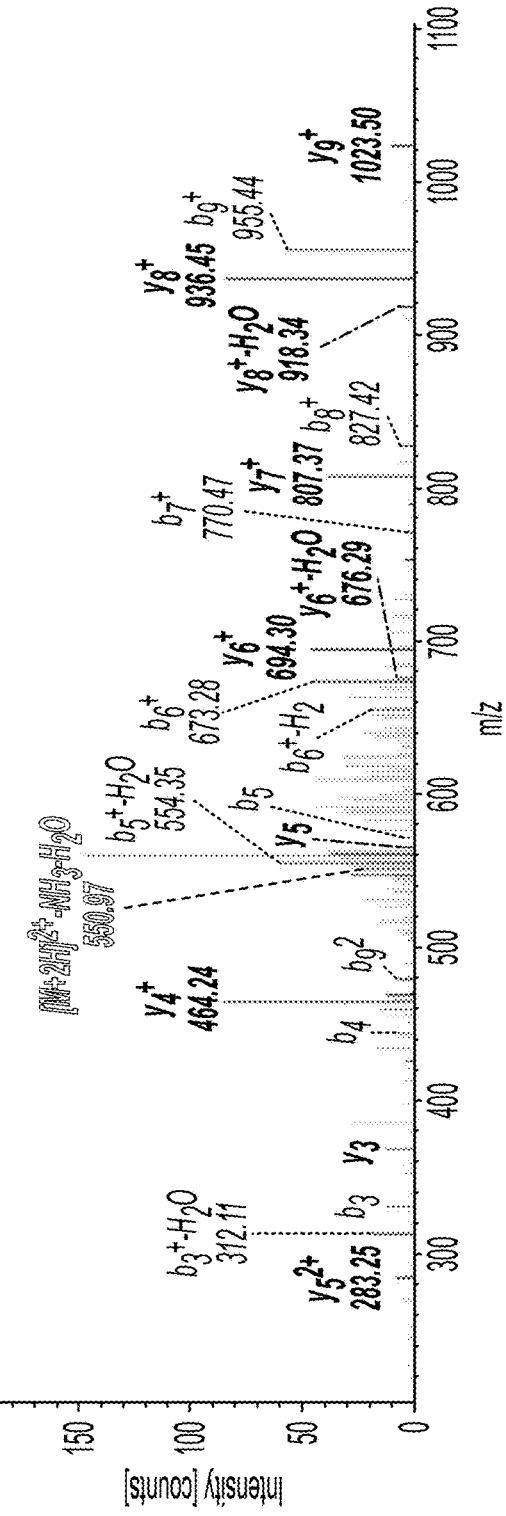
FIG. 9: VGLL1-derived peptide was eluted from the PANC-1005 cell line. Mass spectra of HLA-A*0101-restricted VGLL1-derived peptide isolated from PDAC cell line PANC10.05 (top panel). The native peptide co-eluted with and matched the MS fragmentation spectra of the synthetic isotope-labeled peptide LSELETPGKY (SEQ ID NO: 93) containing a $^{13}C/^{15}N$-labeled lysine residue (bottom panel).
Figure 9:
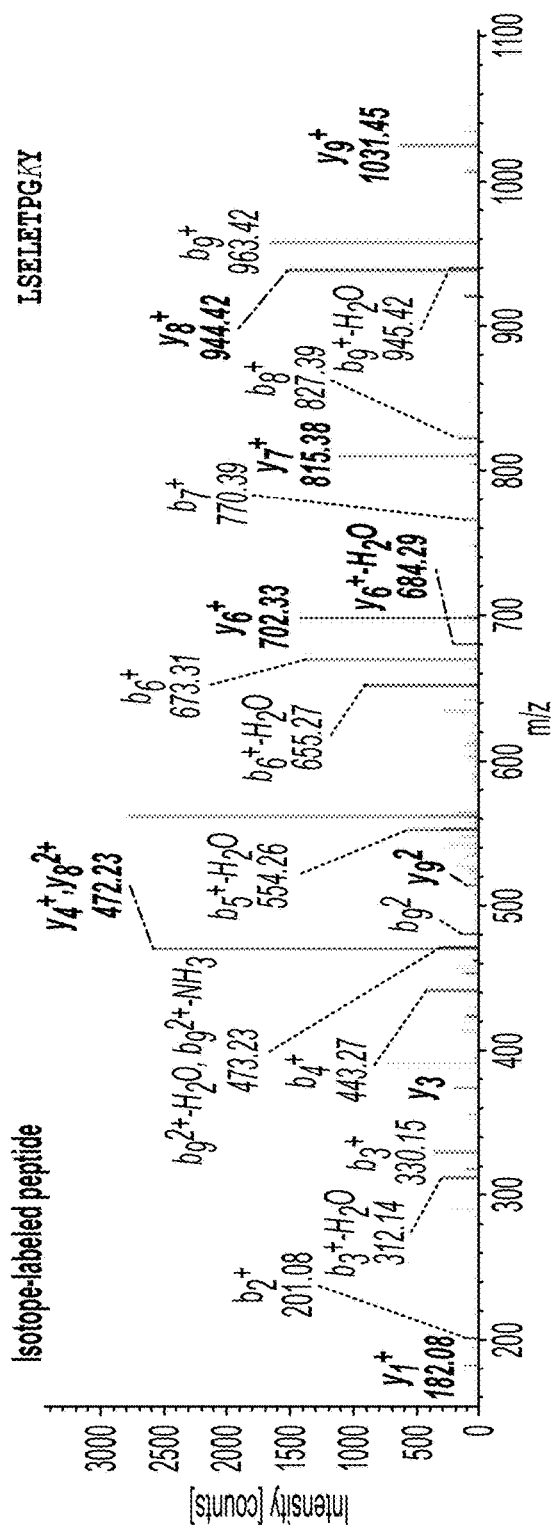

The 10-mer peptide LSELETPGKY (SEQ ID NO:93), uniquely encoded by VGLL1, was eluted from both PDAC patient-derived organoid cell lines MP015-Org and MP081-Org. This peptide was predicted to bind with high affinity to HLA-A*0101 (51 nM), and RNAseq analysis confirmed high VGLL1 transcript expression in both organoid lines (Table 2). Peptide identity was confirmed by targeted LC-MS, in which a synthetic peptide was analyzed as part of a mixture with organoid tumor-associated peptides. As shown in FIG. 1C, the synthetic isotope-labeled peptide LSELETPGKY (SEQ ID NO: 93) generated a highly similar fragmentation spectra to the native VGLL1 peptide detected from PDAC organoid lines MP015-Org and MP081-Org, and was also detected at nearly identical LC-MS retention times. Targeted MS analysis on 2 additional HLA-A*0101-expressing cell lines (PANC10.05 and BXPC3) demonstrated that the same peptide could also be detected on PANC10.05, suggesting that LSELETPGKY (SEQ ID NO: 93) might constitute a widely shared TAA (FIG. 9).

Figure 10:
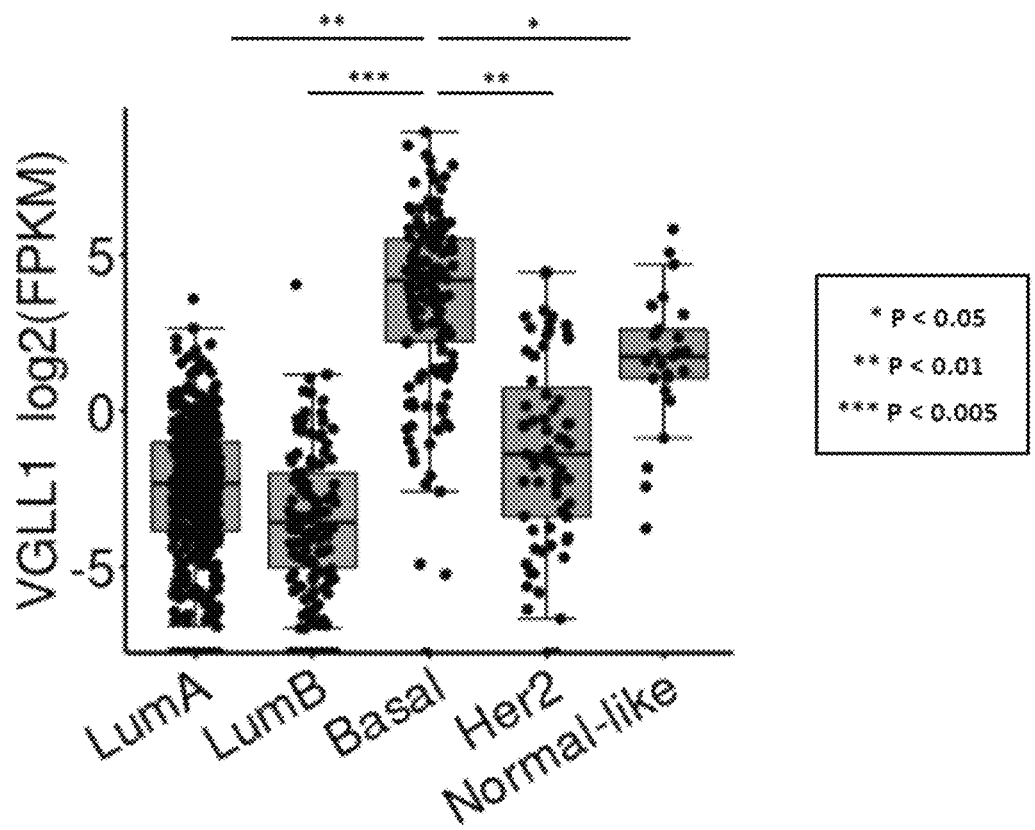
FIG. 10: VGLL1 is preferentially expressed in basal-like breast cancer compared to other breast cancer subtypes. TCGA breast cancer patients were subdivided into 5 major sub-types (LumA, LumB, Basal-like, HER2 overexpressing, and normal-like) and analyzed for tumor VGLL1 expression by RNAseq analysis. Each dot represents one TCGA patient sample, and VGLL1 transcript expression is expressed in fragments per kilobase of transcript per million mapped reads (FPKM).
Figure 11:
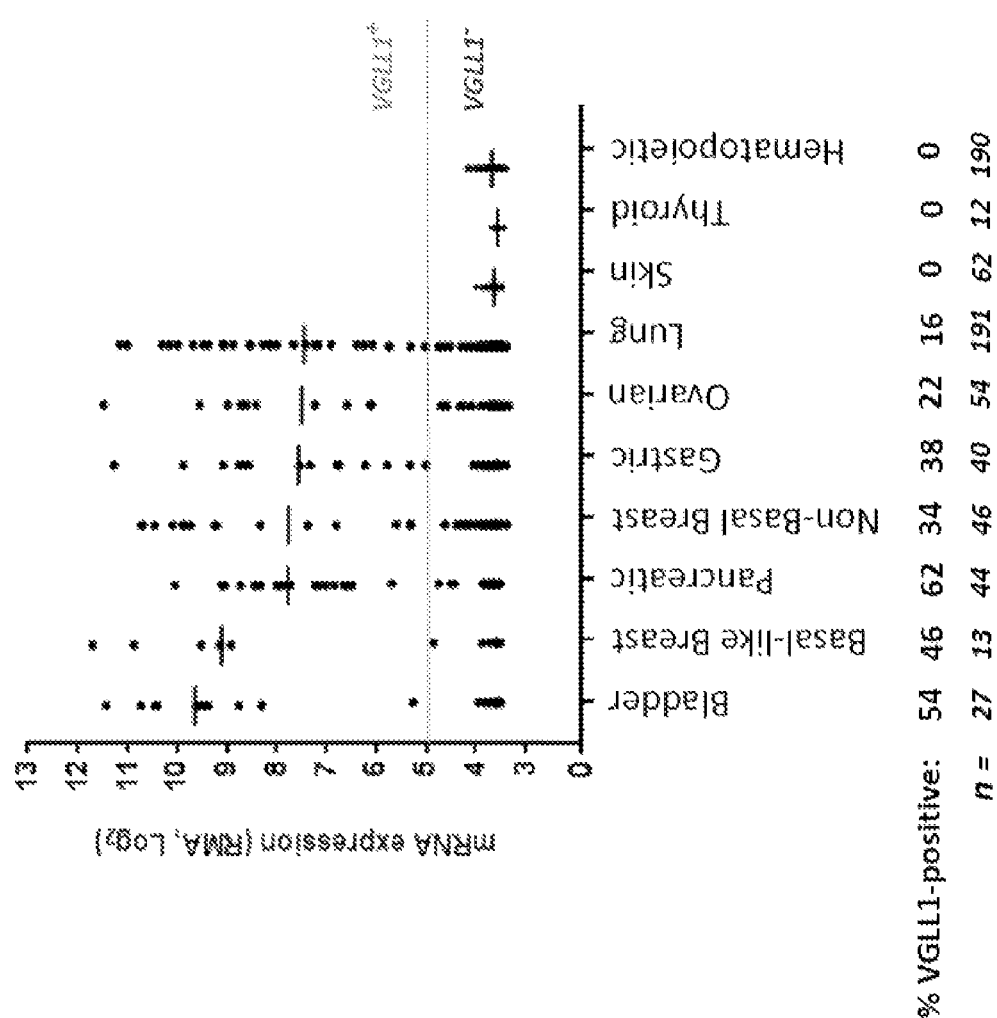
FIG. 11: VGLL1 gene expression in tumor cell lines derived from a variety of cancer types. Gene expression microarray analysis of a diverse array of tumor cell lines (n=679) from the Cancer Cell Line Encyclopedia (CCLE) showed that VGLL1 is expressed by a majority of PDAC and bladder cancer cell lines, in addition to a significant percentage of breast, gastric, ovarian, and lung cancer cell lines. No VGLL1 expression was found in cell lines derived from melanoma, thyroid, or hematopoietic cancers. Threshold for VGLL1 antigen positivity was 3-fold above background signal.
Figures 12A, 12B, 12C, 12D:
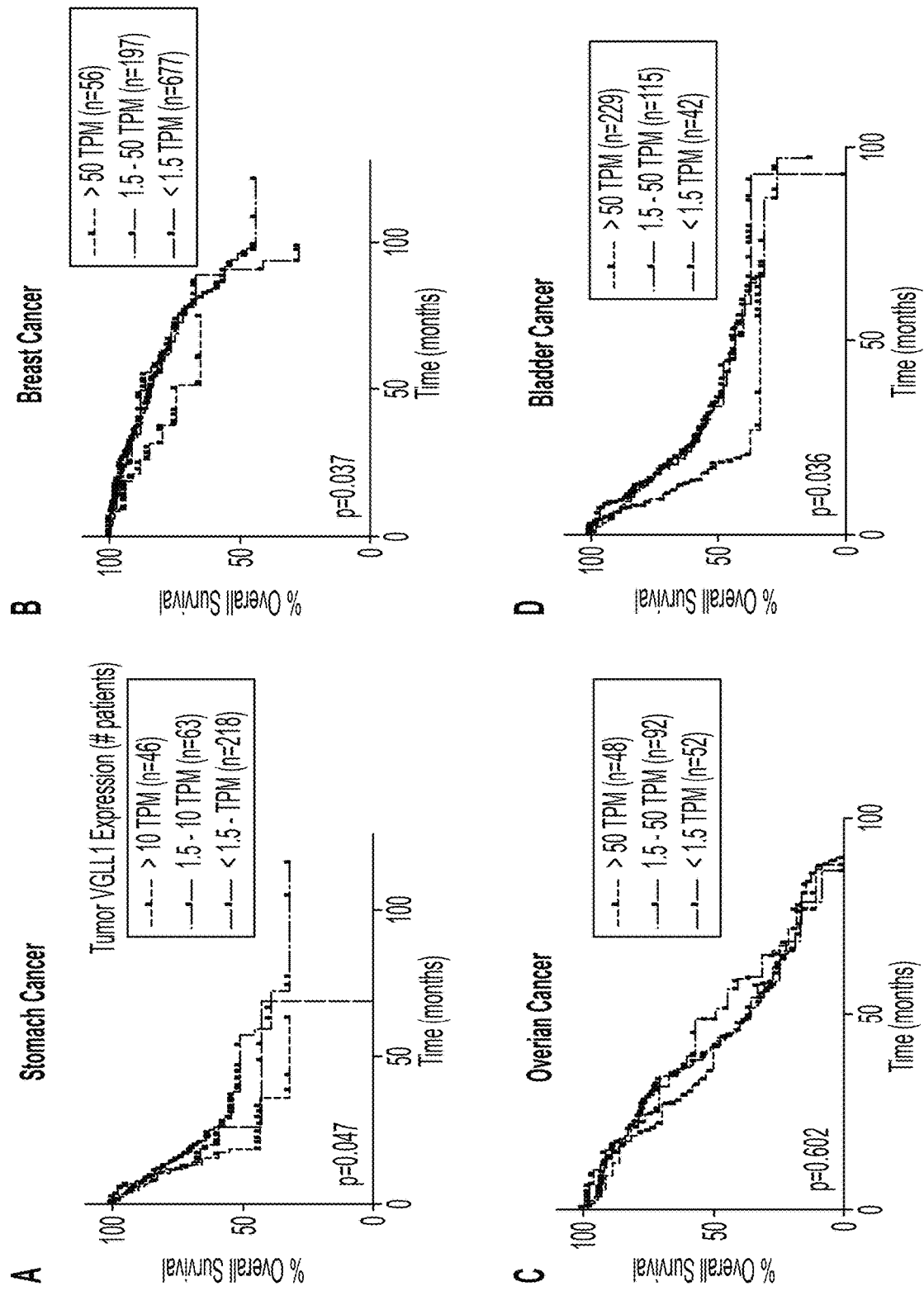
FIGS. 12A-12D: High tumor VGLL1 expression is associated with reduced survival in multiple cancer types. TCGA cancer patients were stratified into three groups according to tumor VGLL1 expression as determined by RNAseq analysis. Kaplan-Meier curves show overall survival (OS) of each group for (FIG. 12A) Stomach adenocarcinoma (>10 TPM showed lowest overall survival and <1.5 showed highest overall survival), (FIG. 12B) Breast carcinoma (>50 TPM showed lowest overall survival and <1.5 showed highest overall survival), (FIG. 12C) Ovarian serous adenocarcinoma, and (FIG. 12D) bladder urothelial carcinoma patients. P-values indicate log-rank significance test results comparing the OS of the groups with the lowest and highest VGLL1 expression.

Vestigial (Vg) protein in *Drosophila*, a key regulator of wing development. Since VGLL1 is a transcriptional co-activator that binds to the TEA domain family of transcription factors (TEFs) implicated in cancer development, VGLL1 transcript expression was further examined in the 31 cancer types listed in TCGA. As shown in FIG. 2A, in comparison to most normal tissues VGLL1 is overexpressed in a number of different cancers, including PDAC, bladder, ovarian, breast, lung, and stomach cancer. Interestingly, VGLL1 appears to be preferentially expressed in basal-like breast cancers while demonstrating a relatively low prevalence in other breast cancer subtypes (FIG. 10). A similar profile was confirmed by gene expression analysis of tumor cell lines listed in the Cancer Cell Line Encyclopedia (CCLE, FIG. 11). According to the GTex RNAseq database, the highest median VGLL1 transcript expression was found in 3 non-essential tissues: bladder (15.3 TPM), salivary gland (3.9 TPM), and breast (1.3 TPM). The highest level of VGLL1 transcript expression in essential tissues was in normal lung (1.0 TPM), esophagus (0.73 TPM), and kidney (0.34 TPM), while VGLL1 expression in heart and brain tissues was virtually undetectable (FIG. 2A). Collectively, this data suggested that VGLL1 may constitute a safe, targetable TAA for multiple cancer types.

Figure 13A:
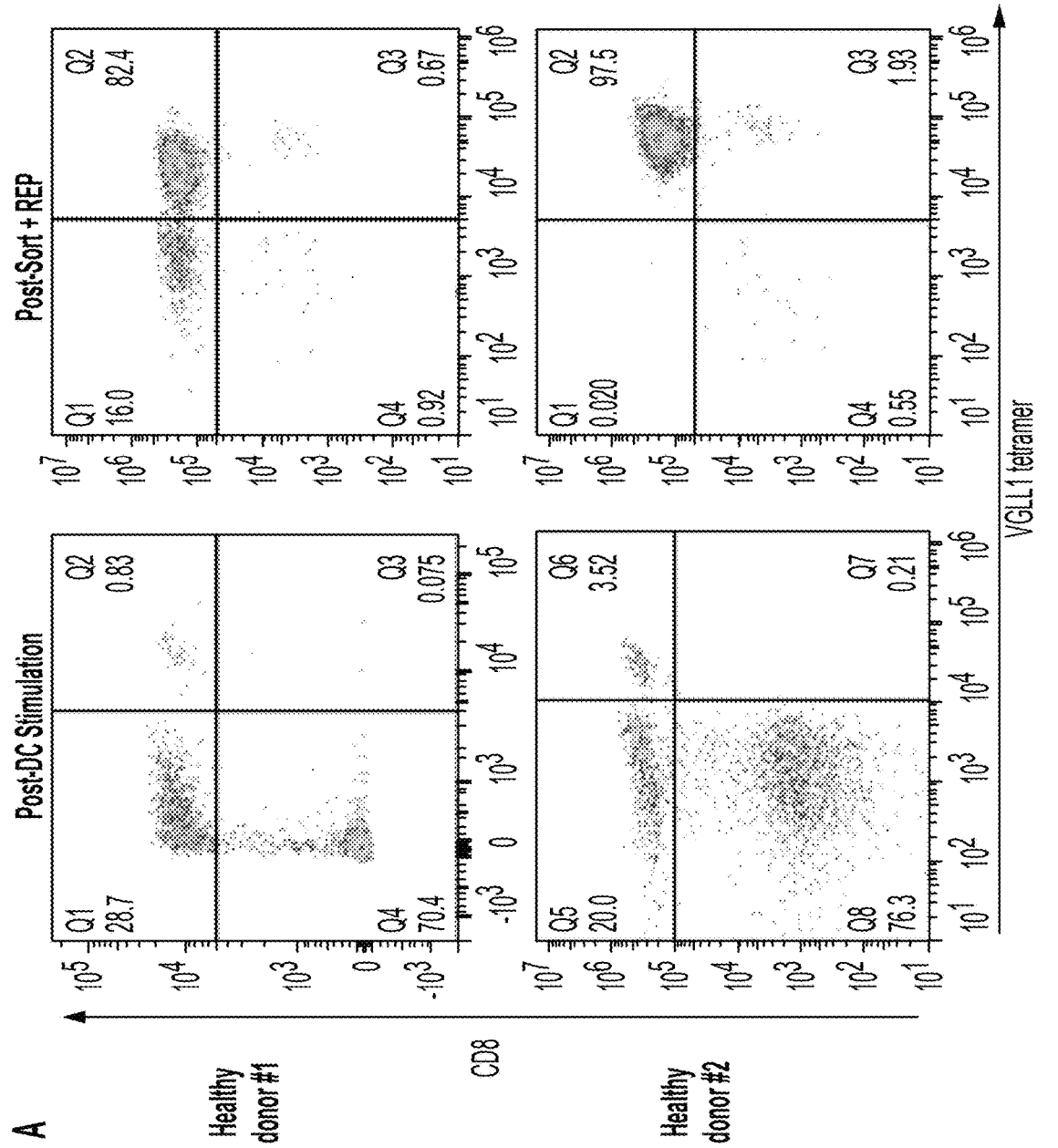
FIGS. 13A-13B: Generation of HLA-A*0101-restricted VGLL1 antigen-specific CTLs from multiple normal donor PBMC.
Figure 13B:
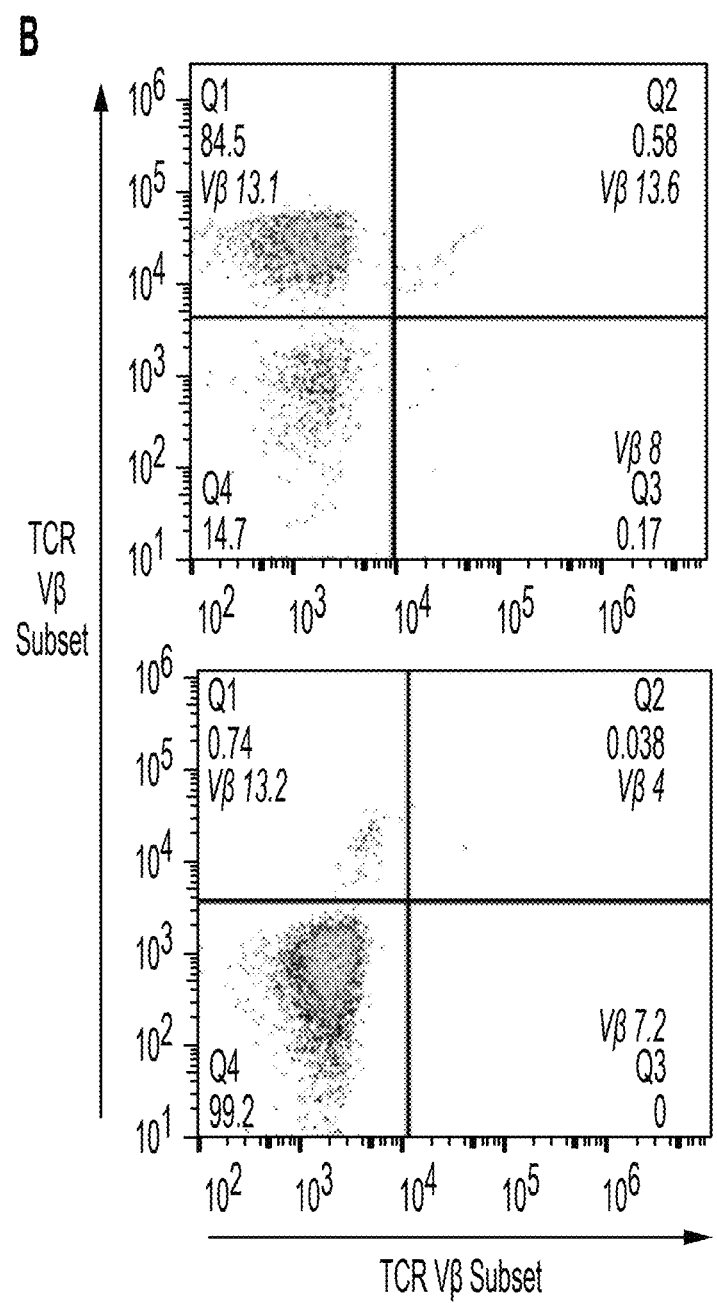

It was next assessed if tumor VGLL1 transcript expression was associated with cancer patient survival. As shown in FIG. 2B, TCGA PDAC patient survival (n=179) was found to be inversely correlated with VGLL1 expression: patients with high expression had a significantly shorter overall median survival compared to patients with low or absent expression (16 months vs. 37 months, p=0.001). This was confirmed in an independent cohort of 37 M.D. Anderson PDAC patients for whom PDX tissues could be derived: patients showing an overall survival of less 18 months demonstrated a significantly higher mean PDX VGLL1 expression compared to patients that survived longer than 36 months (57.3 TPM vs. 9.6 TPM, p=0.003, FIG. 2C). It is worth noting that VGLL1 transcript expression was found to be considerably higher in PDAC tumor cell lines and PDX tissues compared with surgically resected PDAC tumors, perhaps due to the high stromal content of many PDAC tumors in situ (FIGS. 2A, 2C, Table 2). Highly elevated VGLL1 expression was also associated with shorter overall survival time in breast cancer (p=0.037) and stomach cancer (p=0.047), but showed no association with survival in ovarian cancer (FIG. 13). Interestingly, low or absent VGLL1 expression was associated with shorter survival time in bladder cancer (p=0.036). One potential explanation is that loss a normal bladder tissue antigen like VGLL1 may indicate tumor dedifferentiation, which has been associated with poorer prognosis in bladder cancer and many other tumor types.

VGLL1 is part of a unique group of Cancer-Placenta Antigens (CPAs) with therapeutic potential: VGLL1 had been previously identified as having a regulatory role during early events in human placental development, and is a specific marker of proliferative cytotrophoblast. In accordance with this, RNAseggene expression data from 7 human placenta samples showed that VGLL1 demonstrated the highest expression in this tissue by a large margin (mean=302.7 TPM), nearly 20-fold higher than its expression normal bladder (FIG. 3A). This led to explore the notion that cancer-placenta antigens (CPA) may constitute a distinct category of targetable TAAs analogous to cancer-testis antigens (CTAs), which have been successfully targeted with CTL-based therapies. To identify other CPAs with similar expression profiles to VGLL1, the GTex, TCGA, and other RNAseq databases were searched for genes that demonstrated the following attributes: (1) highest normal tissue expression in placenta; (2) low to absent expression in other normal tissues; and (3) elevated expression in pancreatic, breast, bladder, and/or ovarian cancer. This search yielded 9 additional genes, including Placenta-specific 1 (PLAC1), previously identified as a target of humoral antitumor immunity in cancer patients.

Figure 3:
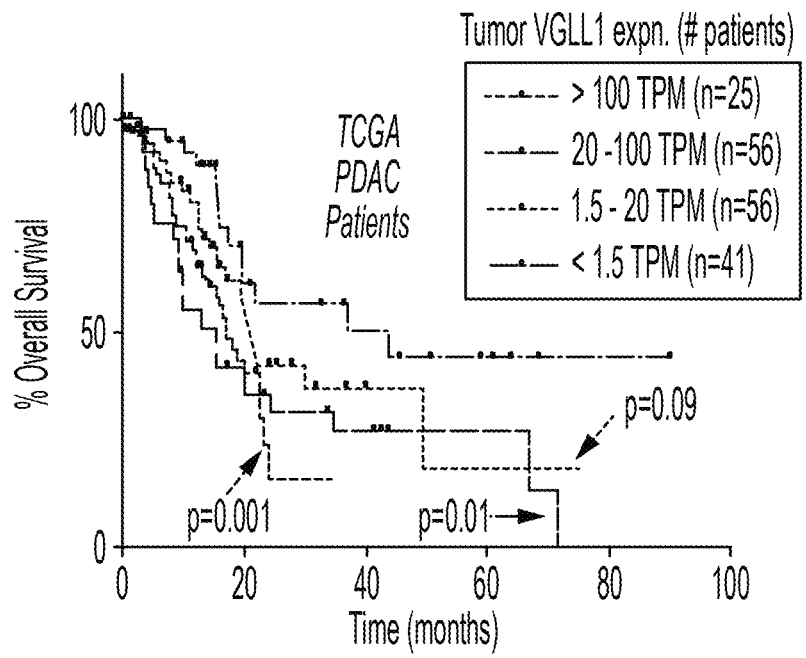
FIG. 3: VGLL1 is associated with poor pancreatic patient survival. Top: Kaplan-Meier curves showing TCGA PDAC patient overall survival (OS) stratified by tumor VGLL1 transcript expression (n=178). P-values indicate log-rank significance test results comparing the OS of 3 groups of VGLL1-expressing patients to those patients with low or absent VGLL1 expression. (>100 TPM showed lowest overall survival and <1.5 TPM showed highest overall survival). Bottom: Patient-derived xenografts (PDX) from an independent cohort of MD Anderson metastatic PDAC patient tumors (n=37) underwent RNAseq analysis after being grown in immunodeficient mice. Graph shows PDX specimens stratified into 3 groups corresponding to OS time and corresponding VGLL1 transcript expression.
Figure 3:
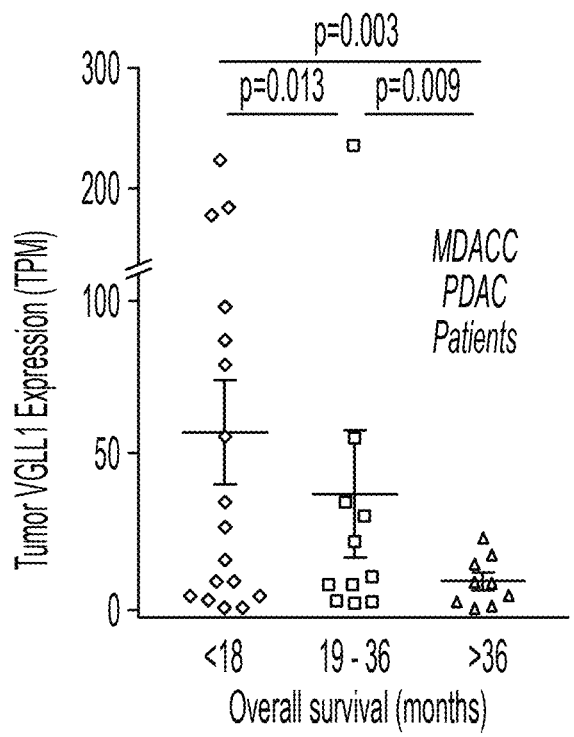

Interestingly, Chorionic Gonadotropin (CG) Beta subunits 3 and 5 (CGB3/CGB5), components of the CG hormone complex produced by placental trophoblasts during pregnancy, were also identified as potential CPAs due to their overexpression in a subset of pancreatic, testicular, uterine, and bladder cancers (FIG. 3B). The other 6 putative CPAs demonstrated diverse expression profiles, ranging from those found only in a restricted set of cancer types (IGF2BP3, ADAM12), to those overexpressed in most cancer types but also demonstrating elevated expression in normal female reproductive tissues (CAPN6, MiP11) (FIG. 3, 14 to 23).

Although peptides derived from these genes were detected in this set of PDAC specimens, epitopes from several of these putative CPAs have been identified in multiple tumor types and are listed in the Immune Epitope Database (IEDB).

VGLL1-specific cytotoxic T cells were expanded from the peripheral blood of PDAC patient MP015: Patient MP015 was a 50-year old male when first diagnosed with primary PDAC in December 2011. Two years following surgical removal of the primary pancreatic tumor, a thoracoscopic wedge resection of a left lung lesion was performed in November 2013 and used to derive organoid cell line MP015-Org. The patient's disease was kept in check for nearly 2 more years through a series of chemotherapeutic regimens, but following progression he was enrolled in an IRB-approved cell therapy protocol at M.D. Anderson to receive autologous, expanded tumor-antigen-specific CTLs. Immunopeptidome analysis performed on the expanded organoid cell line MP015-Org in May 2015 led to the identification of 6 HLA class I-bound peptides (4 derived from MUC16 and 1 each from ZNF717 and VGLL1) that met the criteria as safe, targetable TAAs (FIG. 1B and Table 2). Custom clinical-grade tetramers were available for 3 of the 6 potential targets: two HLA-1B*3502-restricted MUC16 peptides and the single HLA-A*0101-restricted VGLL1 peptide.

Figures 4A, 4B:
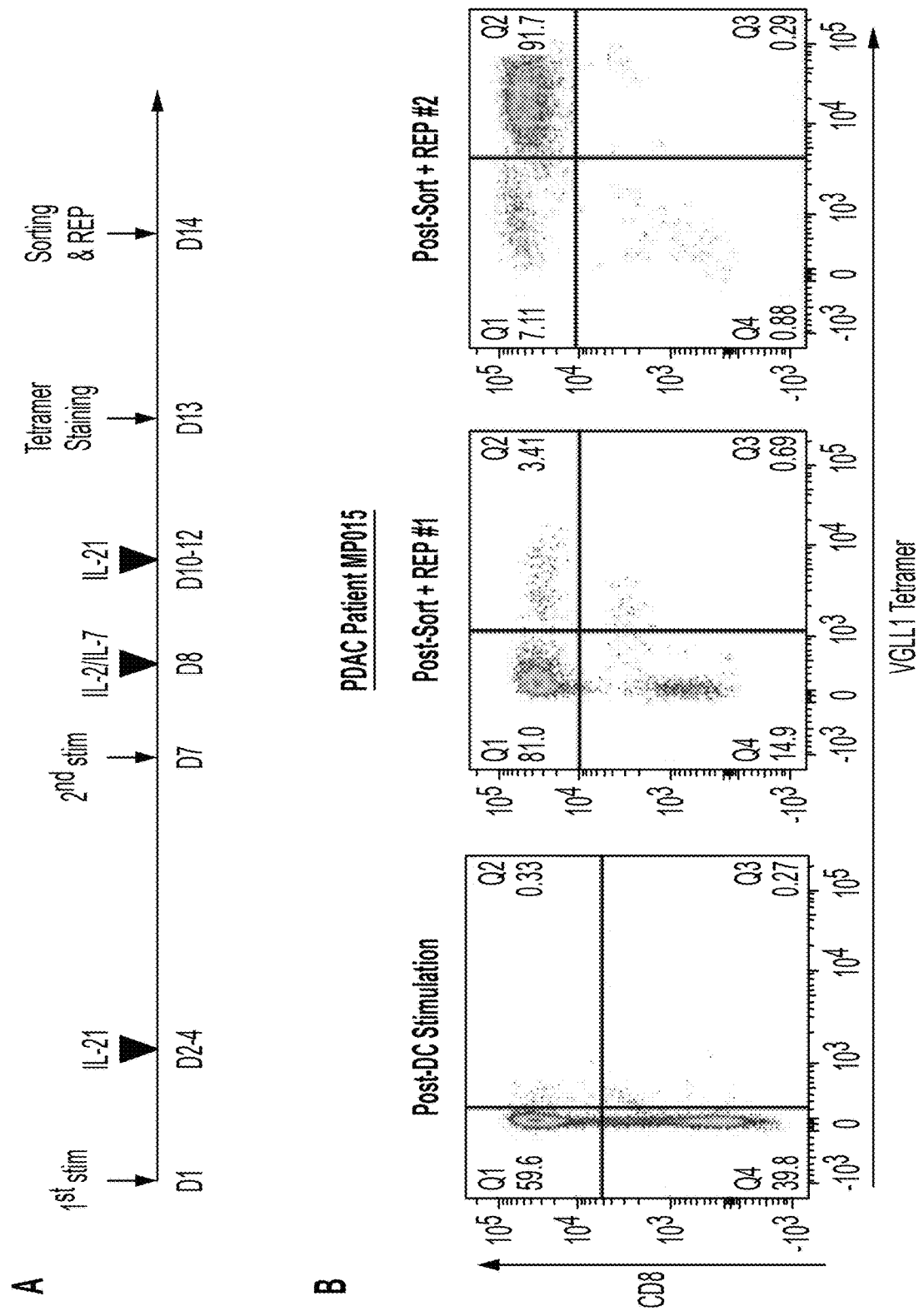
FIGS. 4A-4D: Generation of VGLL1 antigen-specific CTLs from peripheral blood of Patient MP015.
Figure 4C:
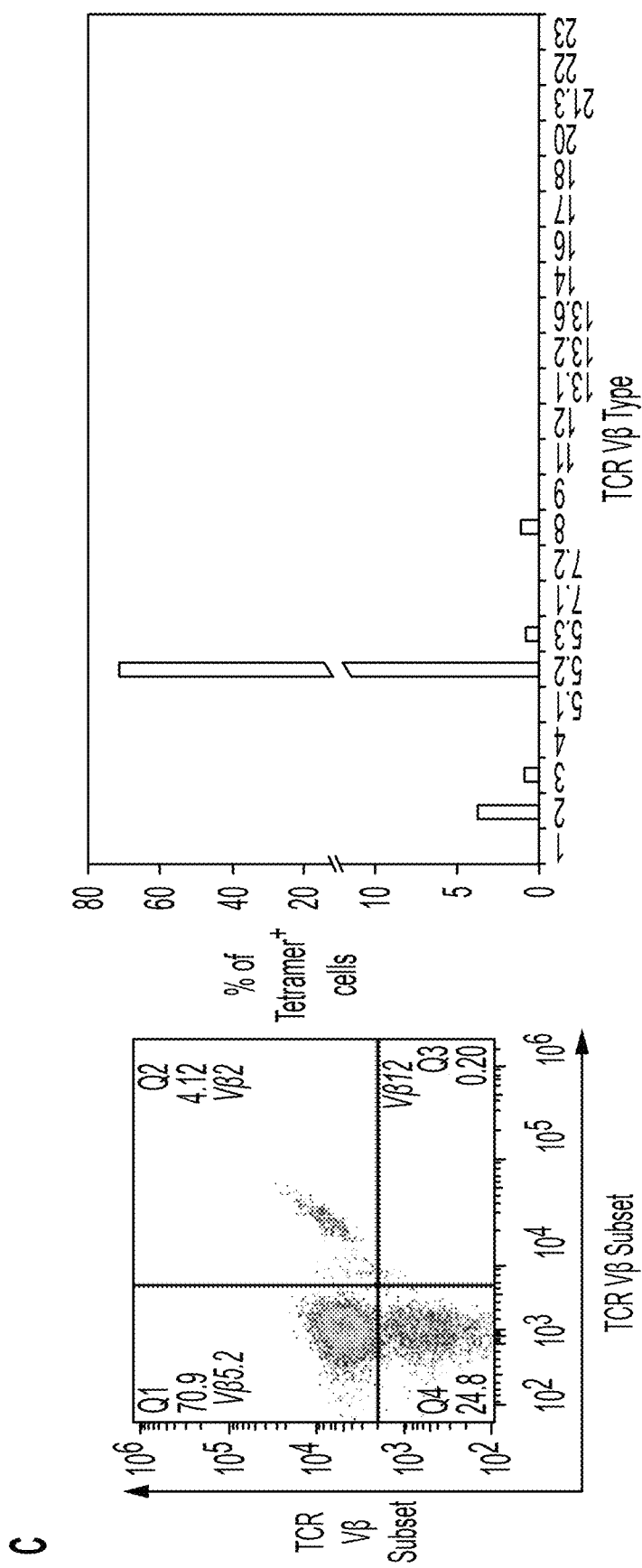
Figure 14:
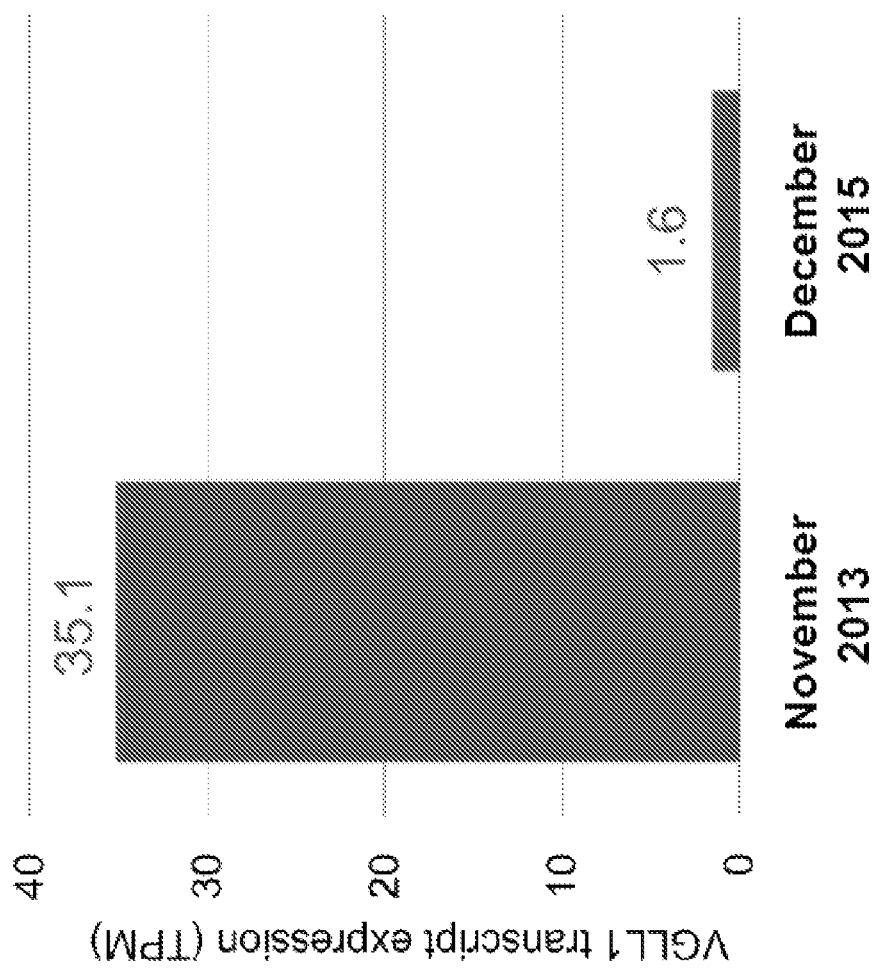
FIG. 14: PDAC patient MP015 showed loss of VGLL1 antigen expression prior to VGLL1-CTL therapy. RNAseq analyses from lung tumor metastases of PDAC patient MP015 revealed loss of VGLL1 transcript expression between November 2013 and December 2015.

Following leukapheresis, patient MP015 PBMCs were stimulated twice with individual peptide-pulsed DCs in the presence of IL-21, followed by tetramer-based sorting of antigen-specific CD8$^+$ T cells (FIG. 4A). Although MUC16-specific CTLs failed to expand from patient PBMC, VGLL1 CTLs expanded successfully, with VGLL1 tetramer-positive T cells comprising 3.4% of CD8$^+$ after 2 weeks of DC-peptide stimulation (FIG. 4B). Cell sorting followed by employment of the rapid expansion protocol (REP) was repeated twice, resulting in nearly 20 billion expanded CTLs, of which >90% were VGLL1 tetramer-positive and demonstrated restricted VP usage (FIGS. 4B and C). VGLL1-specific CTLs were also successfully expanded from 2 of 2 healthy HLA-A*0101-positive blood donors, demonstrating the general immunogenicity of the LSE-LETPGKY (SEQ ID NO: 93) peptide (FIG. 14).

Figure 4D:
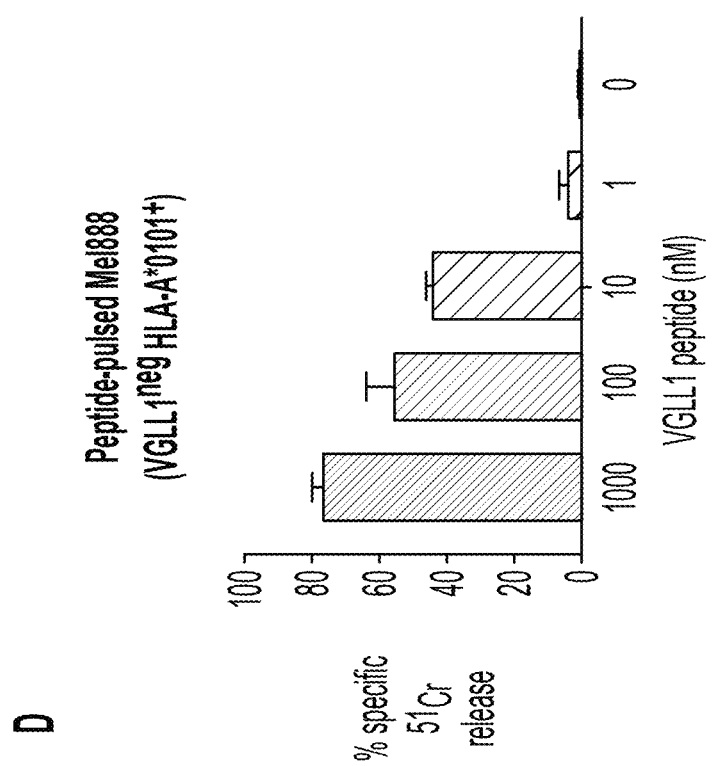
Figure 5A:
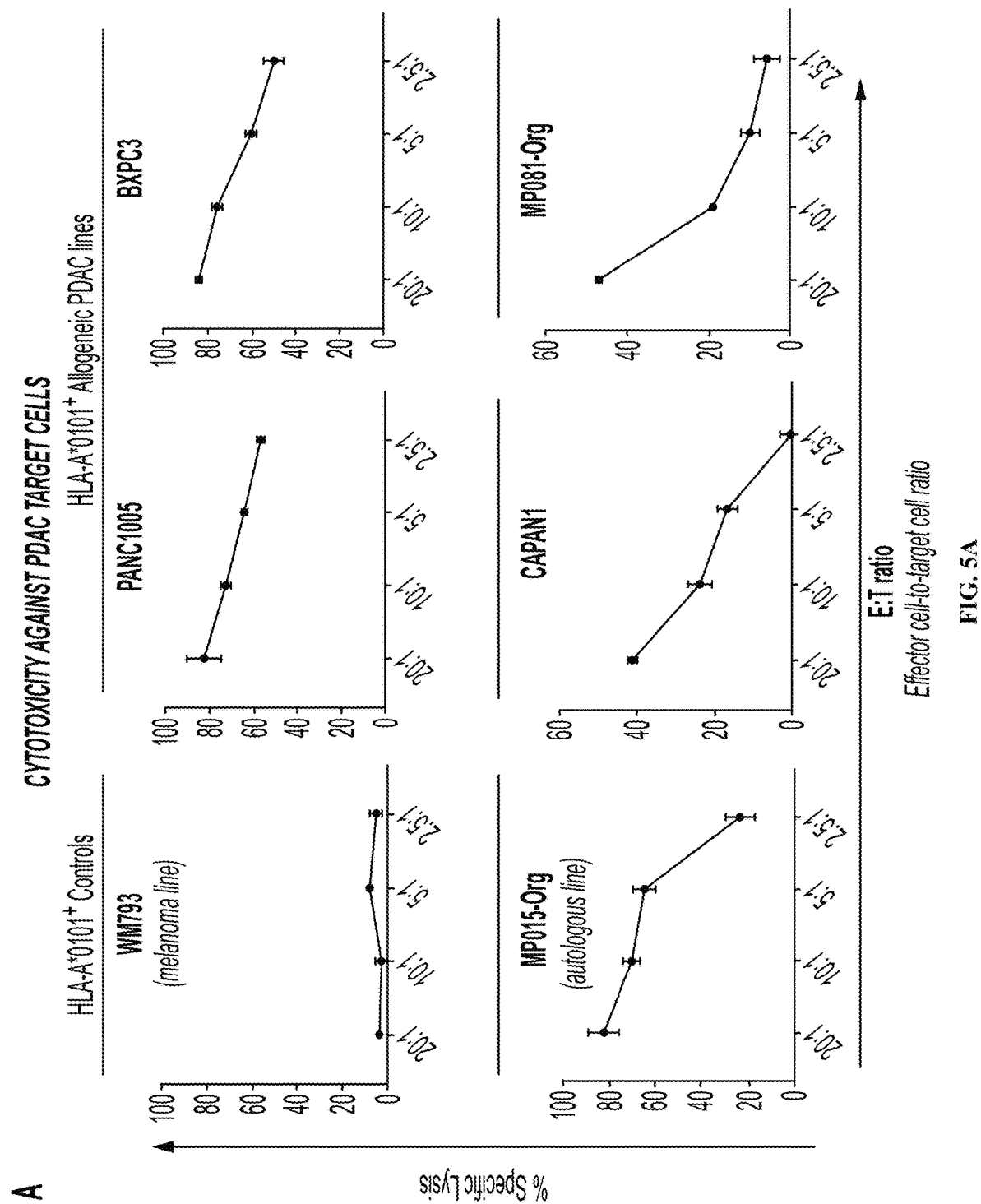
FIGS. 5A-5B: VGLL1-specific CTLs recognize and kill multiple allogeneic pancreatic cancer cell lines.

Expanded CTLs from patient MP015 were tested functionally using standard $^{51}$Cr release assays. Mel888 melanoma cells (VGLL1-negative, HLA-A*0101 positive) pulsed with titrated amounts of VGLL1 peptide elicited CTL recognition and killing at peptide concentrations as low as 10 nM, indicating relatively high affinity for cognate peptide (FIG. 4D). Importantly, expanded patient-derived CTLs also showed robust recognition of the autologous organoid cell line MP015-Org from which the VGLL1 peptide was originally detected by MS (FIG. 5A). In October 2015 following a pre-treatment regimen of Cytoxan, Patient MP015 was infused with 19.6 billion autologous, expanded VGLL1-specific CTL, subsequently receiving interleukin-2 and pembrolizumab. Although the patient experienced a transient fever (a frequent side effect of T-cell infusion-induced cytokine release), they experienced no adverse events indicating potential CTL-mediated toxicities.

Unfortunately, scans in late November 2015 showed rapid disease progression manifested as an interval increase in lung lesions and pleural-based metastatic disease. Surprisingly, a biopsy of a pleural-based nodule taken at this time revealed a poorly differentiated neuroendocrine tumor. DNA sequencing analysis of serial liquid biopsies collected over the previous 18 months provided evidence of an extremely rapid evolution of Patient MP015's cancer due to numerous progressive genetic amplifications, deletions, re-arrangements, and epigenetic changes. RNAseq analysis of lung metastases also demonstrated that a dramatic reduction in VGLL1 transcript expression (35.1 TPM to 1.6 TPM) had occurred between November 2013 and December 2015, providing a potential explanation for the lack of clinical response to ETC therapy (FIG. 14). Patient MP015 expired in January 2016 due to extensive complications deriving from progression of his lung metastases.

VGLL1-specific CTLs demonstrate cytotoxicity against multiple allogeneic PDAC tumor cell lines: Although Patient MP015 did not experience clinical benefit from adoptive transfer of his own VGLL1-specific CTLs, the robust antitumor activity demonstrated by these T-cells in vitro led to explore whether they may have therapeutic potential for other PDAC patients. HLA-A*0101 was expressed by ~30% of the PDAC patient cohort, and RNAseq analysis of TCGA and MDACC PDAC surgical specimens and PDXs showed that 43.2% to 62.5% of patients express VGLL1 transcript at a level >5 TPM. From these data, it is estimated that 12% to 15% of PDAC patients present the LSELETPGKY (SEQ ID NO: 93) peptide target in the context of HLA-A*0101 and therefore could potentially benefit from VGLL1-CTL therapy.

Figure 5B:
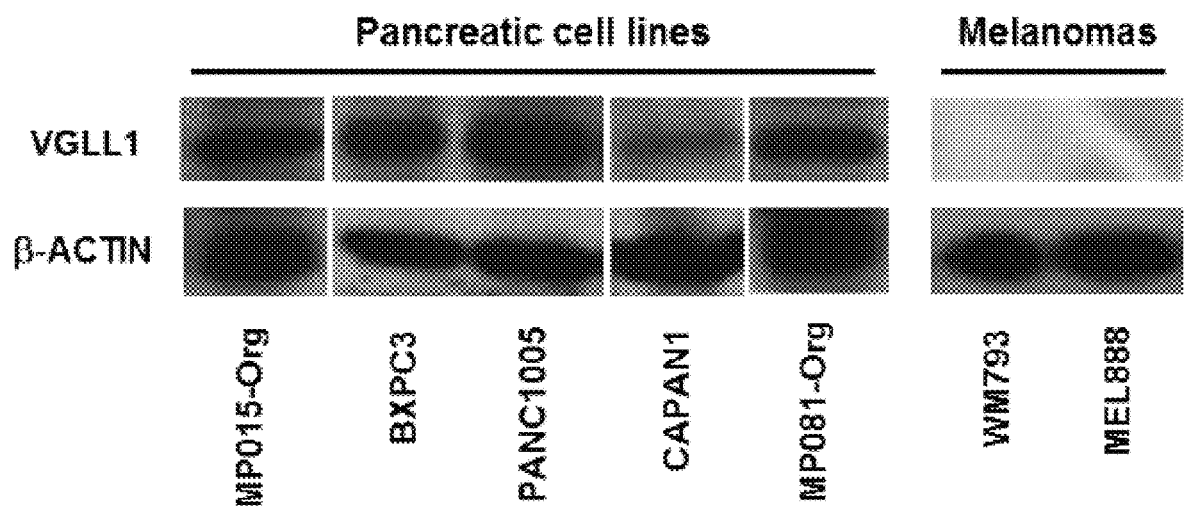
Figure 15:
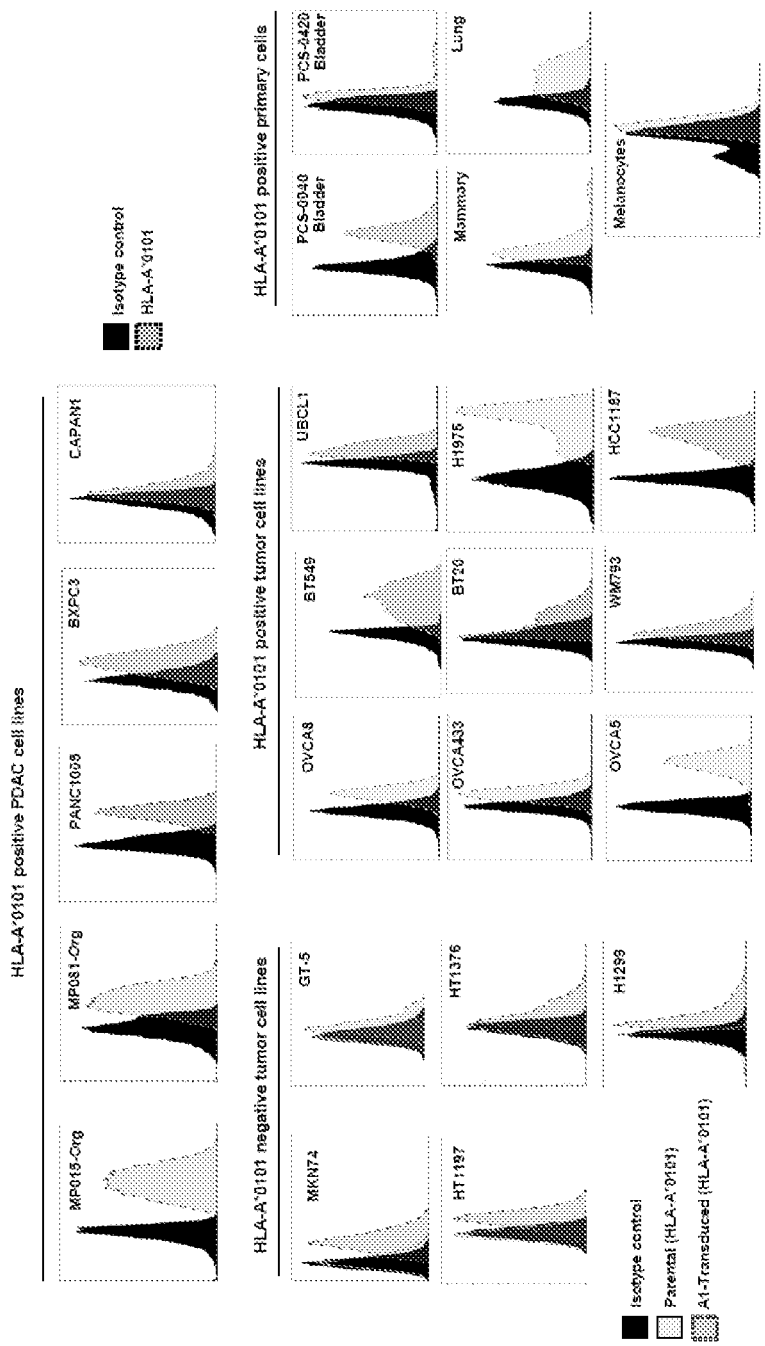
FIG. 15: HLA-A*0101 surface expression confirmed on target cell lines by flow cytometry. All tumor cell lines and normal primary cells used in this study were stained with fluorophore-labeled HLA-A*0101-specific mAb and analyzed by flow cytometry to confirm natural endogenous HLA-A*0101 surface expression (grey histograms) prior to use as targets in VGLL1-specific CTL assays. Five tumor cell lines were transduced to express HLA-A*0101 using a lentiviral expression vector.

To determine if VGLL1-CTLs derived from Patient MP015 could recognize allogeneic PDAC tumors, a panel of HLA-A*0101 expressing PDAC tumor cell lines were tested as targets for killing using a $^{51}$Cr release assay. Western blot analysis was used to confirm VGLL1 protein expression, and flow cytometry confirmed surface expression of HLA-A*0101 in cell lines (FIG. 15). While control cell line WM793 (VGLL1-negative, HLA-A*0101-positive) was not recognized, VGLL1-specific CTLs recognized autologous MP015-Org cells and 4 out of 4 allogenic PDAC lines tested, including inducing robust killing of PANC-1005, CAPAN-1, and BXPC3 (FIGS. 5A and 5B). The PDAC organoid cells derived from Patient MP081 were also lysed by VGLL1-CTLs but with reduced efficiency, likely due to an outgrowth of VGLL1-negative cells within the culture. VGLL1-CTL specificity was demonstrated by co-incubation with the pan-MHC class I antibody W6/32, which resulted in blockade of PANC10.05 recognition and lysis (FIG. 27). Collectively, these results provide evidence that the LSELETPGKY peptide constitutes a shared PDAC tumor antigen that can be effectively targeted with VGLL1-specific CTLs.

Figure 6A:
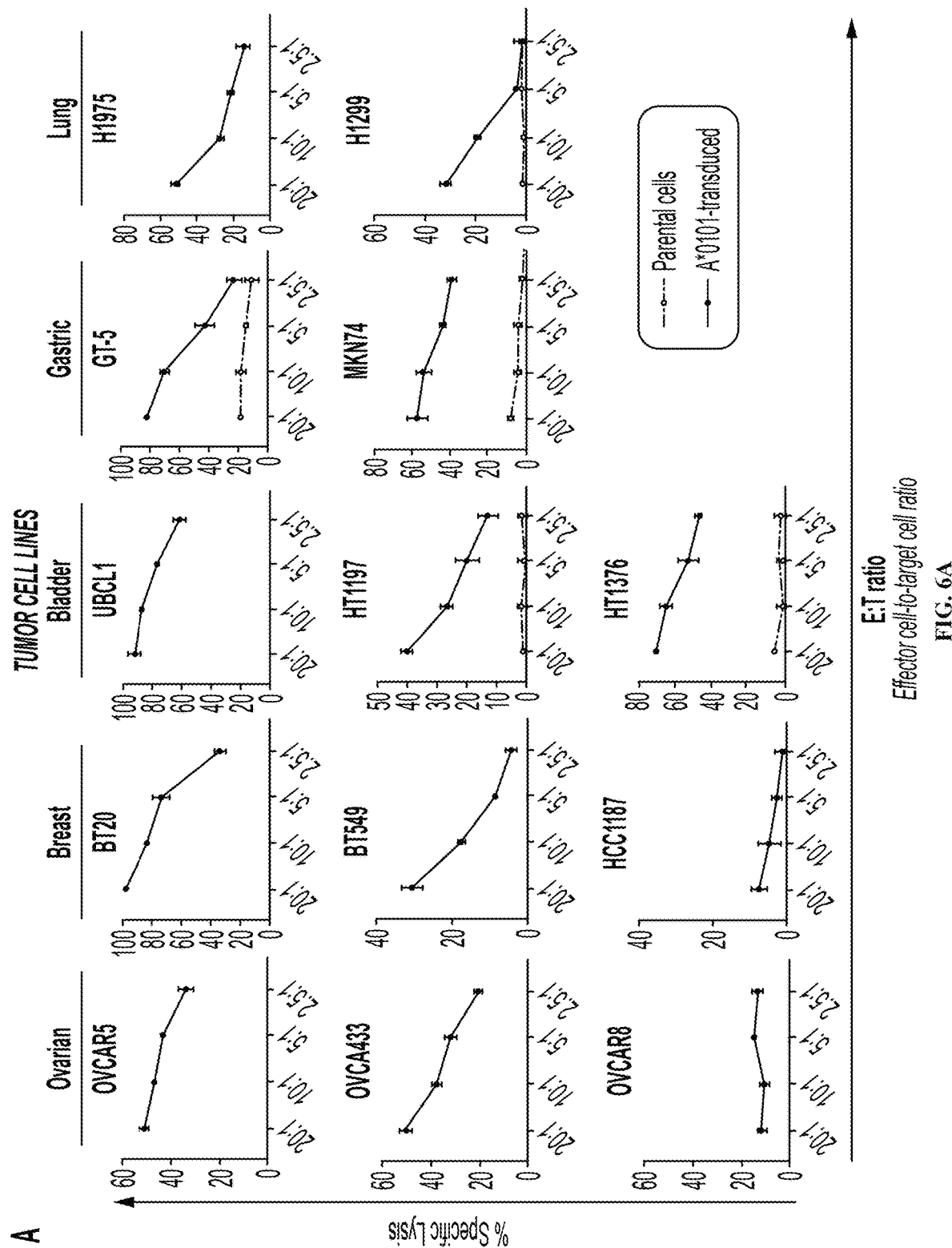
FIGS. 6A-6D: VGLL1-specific T cells recognize and kill multiple tumor types, but have reduced recognition of primary tissue cell lines.
Figure 6B:
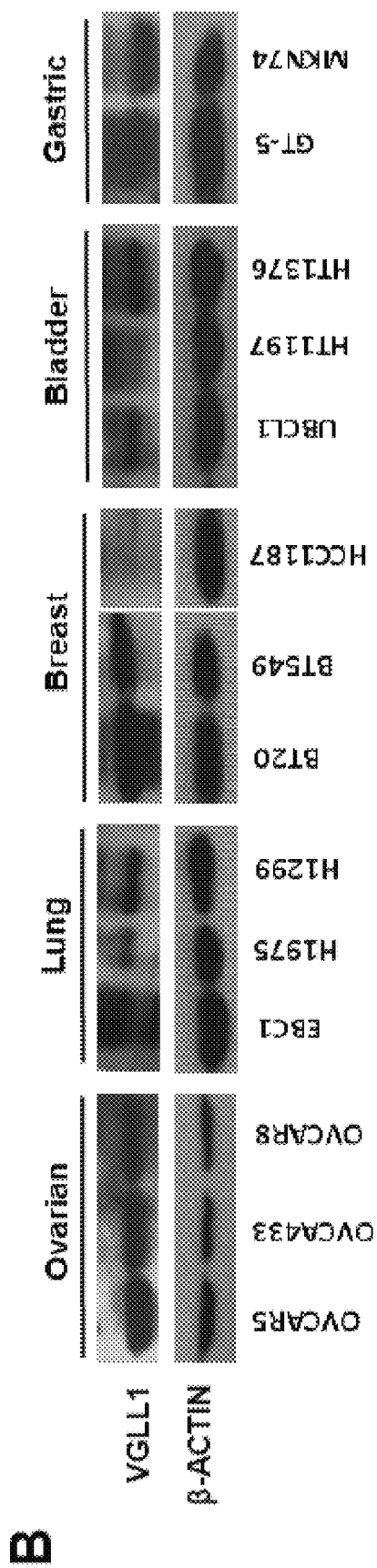

VGLL1-CTLs show activity against multiple tumor types and reduced recognition of primary cells: TCGA RNAseq data analysis indicated that VGLL1 is expressed by several cancer types (16 of 31), most notably in 75-80% of patients with bladder, ovarian, and basal-type breast cancers, and 15-20% of patients with lung and gastric cancers (FIG. 3B). It was therefore set out to determine whether cell lines derived from these cancer types could be targets for VGLL1-specific CTLs (FIG. 6A). Western blot analysis of a panel of ovarian, basal-type breast, bladder, gastric, and lung cancer cell lines showed high VGLL1 expression in 12 of 14 lines analyzed (FIG. 6B). Of the 8 cell lines that naturally expressed HLA-A*0101, VGLL1-CTLs killed 2 of 3 ovarian lines, 2 of 3 breast lines, and 2 of 2 bladder and lung cancer lines (FIG. 6A). Five additional HLA-A*0101-negative cell lines (2 gastric, 2 bladder, and 1 lung line) were transduced to express HLA-A*0101 prior to testing them as targets for VGLL1-CTLs. As shown in FIG. 6A, all five HLA-A*0101-transduced cell lines were rendered susceptible to killing by VGLL1-CTLs, indicating presentation of the LSELETPGKY (SEQ ID NO: 93) peptide from processed, endogenously-expressed VGLL1 protein. Taken together, these results suggest that VGLL1-CTLs have potential therapeutic value for at least five additional cancer types besides PDAC.

Figure 6C:
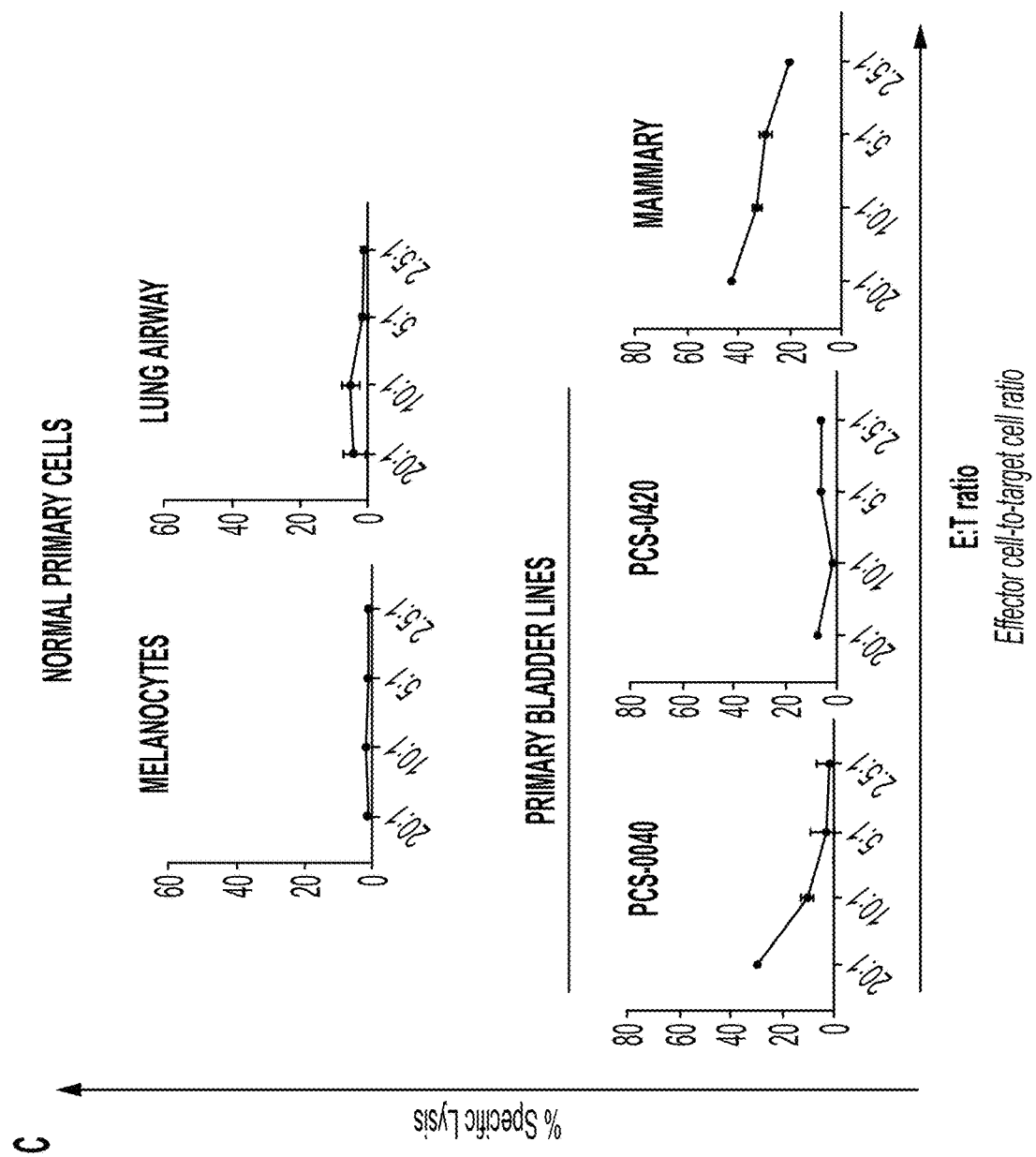
Figure 6D:
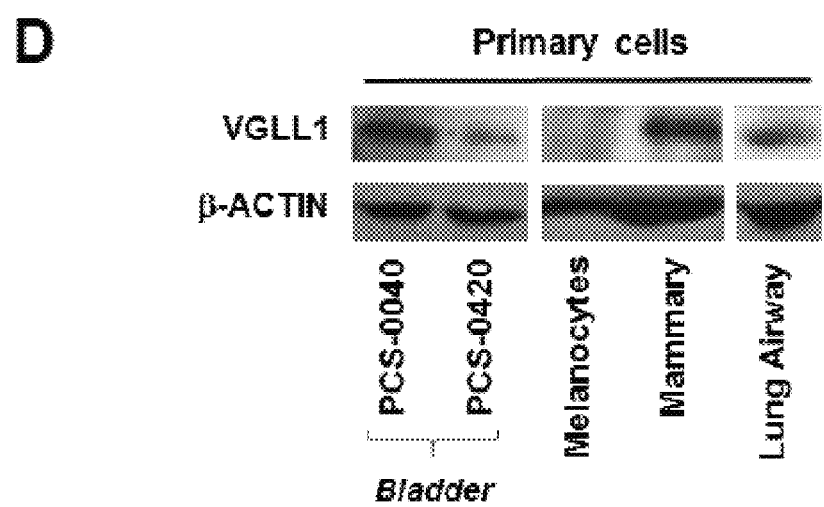

In order to assess the safety of VGLL1-CTLs for potential therapeutic use, they tested against a panel of normal primary cells most likely to elicit VGLL1-specific reactivity according to the GTex normal tissue expression profile (FIG. 2A). Since bladder demonstrated the highest normal tissue VGLL1 transcript expression, two different HLA-A*0101 positive primary bladder cell lines were tested as targets for VGLL1-CTL killing. As shown in FIG. 6C, specific lysis was low, detectable in one bladder line but only at the highest E:T ratio. Since the GTex database indicated that VGLL1 transcript is also expressed at low levels in normal breast and lung, VGLL1-CTL killing activity was tested against HLA-A*0101-expressing primary mammary and lung airway cells, along with primary melanocytes as a negative control. Of this panel, mammary cells elicited moderately high levels of killing by VGLL1-specific CTL, results that were consistent with VGLL1 protein levels as assessed by Western blot (FIG. 6D). By contrast, lung airway epithelial cells were not killed by VGLL1-CTLs, despite demonstrating ample HLA-A*0101 surface expression (FIG. 15). These results provide evidence that VGLL1-specific T cells are unlikely to recognize essential normal tissues; however, safety concerns may be warranted due to the potential for reactivity against some non-essential tissues.

Employing an unbiased immunopeptidome analysis of tumor specimens derived from 35 PDAC patients, VGLL1 was identified as a novel putative shared TAA, ranked second only to MUC16 in terms of tumor expression in comparison to essential normal tissues. However, in contrast to MUC16 epitopes, the HLA-A*0101 restricted VGLL1 peptide was considerably more immunogenic, capable of eliciting antigen-specific CTLs from multiple PBMC donors, including one PDAC patient. Such immunogenicity provides a significant advantage in the context of developing endogenous T-cell (ETC) therapies for cancer patients. HLA-A*0101 is expressed at a relatively high prevalence (25-30%) in Western European and North American countries, suggesting that these patient populations would be most likely to benefit from targeting this epitope [52]. Expanded VGLL1-specific CTLs not only recognized and killed a panel of allogenic PDAC tumor lines, but also demonstrated reactivity against A*0101-expressing tumor cells derived from five other cancer types. It is estimated that targeting this single VGLL1 epitope could potentially benefit a large number of Western cancer patients, including over 20% of patients with ovarian, bladder, or basal-like breast cancers, ~12% of patients with PDAC, and 5-10% of patients with lung, stomach, cervical, uterine, or head and neck cancers (FIG. 3).

Example 2—Materials and Methods

Cell Lines. Human cancer cell lines demonstrating VGLL1 mRNA expression were identified using the Cancer Cell Line Encyclopedia (CCLE) microarray-based gene expression analysis. HLA-A*0101-expressing cancer cell lines PANC10.05, CAPAN-1 OAW28, HT1197, HT1376, BXPC3, UBCL-1, and primary cell lines were obtained from commercial sources (ATCC and Sigma-Aldrich). The patient-derived organoid cell line MP015-Org (hMIA2D) was generated by the Tuveson lab at Cold Spring Harbor Labs as previously described [33]. The patient-derived organoid cell line MP081-Org was generated by the Maitra lab from tumor tissue derived from a wedge biopsy. The gastric cancer cell lines GT-5 and MKN74 were a kind gift from Dr. Lee Ellis. WM793, MKN74, PANC1005, GT-5, and OAW28 cells were cultured in RPMI 1640 medium (GIBCO), containing 10% fetal bovine serum, 1% penicillin-streptomycin (Pen-Strep) (Cellgrow), and 1% Insulin-Transferrin-Seleum-A (GIBCO). BT20 and bladder cell lines were cultured in equal parts DMEM F12K and MEM Alpha, with FBS, Pen-Strep, and 1% sodium pyruvate (GIBCO). All other cell lines were cultured in RPMI 1640, FBS, and Penn-strep, with the addition of HEPES (GIBCO) and Glutamax (GIBCO).

Lentiviral Transductions. Some HLA-A*0101-negative tumor cell lines that naturally expressed VGLL1 protein were transduced with a lentiviral gene transfer vector to express HLA-A*0101 driven by the human PGK promoter, as previously described (Bradley et al., 2015). Ectopic cell surface expression of A*0101 was assessed by staining with anti-human HLA-A1-biotin and streptavidin-FITC (US Biological) and measuring fluorescence using a FACScanto II flow cytometer (BD Biosciences). Tumor cells expressing physiological and comparable levels of surface HLA-A*0101 were isolated by cell sorting and used in subsequent experiments.

VGLL1 Protein Expression. VGLL1 protein expression was confirmed in all cell lines by Western blot analysis. Cell lysates from tumor and primary cell lines were prepared and protein content normalized using the BCA method (Thermo- Fisher). Using standard Western blot techniques, cell lysates were run by polyacrylamide gel electrophoresis, transferred, and membranes probed with VGLL1-specific rabbit polyclonal antibody (TA322329, OriGene). VGLL1 protein was visualized using an enzyme-linked anti-rabbit mAb with the Scientific Pierce Fast Western Blot Kit, according to the manufacturer's instructions.

Peptide Identification, Selection and Validation. Patient-derived laparoscopic wedge biopsies, xenografts (PDX), or cell lines were lysed using Triton X-100 and cell lysates incubated overnight at 4° C. with 1 µg of pan-HLA-ABC specific mAb W6/32 for every 10 mg of protein. Protein A/G Ultralink resin beads were used to immunoprecipate HLA class I molecules and HLA-bound peptides were then eluted with 0.1M acetic acid. HLA-A, B, C isolation was confirmed by Western blot analysis, then HLA-positive elutes were analyzed by tandem mass spectrometry (MS/MS). HLA class I protein recovery was semi-quantitatively assessed by rating Western blot band intensity on a scale from 0 (not detectable) to 4 (highest intensity). Tumor-associated HLA-bound peptides were injected onto HPLC system (Dionex 3000 RSLC), and separated by reverse-phase chromatography in 0.1% formic acid water-acetonitrile on 1.8 µm C18 (Agilent Technologies) in the MS/MS discovery phase. Peptides were analyzed on an Orbitrap Elite mass spectrometer (Thermo-Fisher) using data-dependent acquisition. To analyze the acquired MS/MS spectra, the Mascot algorithm was utilized to search the spectra against the SwissProt complete human protein database (updated 9/2018), which provided potential matches to conventionally annotated peptides.

Individual peptide matches underwent quality assessment by reference to multiple orthogonal parameters, including Mascot Ion score, MS1 measured differential to the calculated peptide mass (delta mass), and predicted binding to the patient's HLA allotypes as determined by high-resolution genetic sequencing and the NetMHC and NetMHCpan algorithms. High-confidence peptide matches were analyzed by BLAST searches to identify all potential source genes, which were then cross-referenced to RNAseq data derived from individual tumor samples to provide further validation of peptide identity (validation requiring a minimum source gene expression of 0.3 transcripts per million, TPM). Eluted TAA peptides were screened for safety as potential CTL targets by applying sequential RNA transcript expression filters to eliminate peptides most likely to elicit autoimmune toxicities due to normal tissue expression (GTex Portal RNAseq data). Excluding testis and placenta, source gene transcript expression of 30 TPM maximum was allowed in non-essential tissues, 10 TPM in "caution" tissues, 3 TPM in "hazard" tissues and 1 TPM in highly essential "danger" tissues (such as heart and brain). Putative TAA genes were also screened for expression and prevalence in different cancer types through analysis of TCGA RNAseq data. In selected cases, targeted-MS/MS analysis was performed to confirm TAA peptide identity. For these analyses, retention-time windows for $^{13}C/^{15}N$ isotope-labeled synthetic peptide standards were pre-determined by MS analysis of the synthetic peptides, then targeted methods for searching TAA peptides were constructed using mass windows of 3 Da around each m/z.

Gene Expression Analysis and Patient Survival. Whole transcriptome sequencing (RNAseq) analysis was performed on RNA derived from all PDAC tumor specimens, xenografts, and organoid cell lines using the Illumina TruSeq Stranded Total RNA kit with Ribo-Zero Gold with approximately 200 million paired-end reads for each tumor RNA sample (Avera Institute for Human Genetics). Gene expression profiles of VGLL1 and other cancer placenta antigens were determined by compiling RNAseq data derived from normal human primary tissues (GTex Portal) and tumor tissues (TCGA). Kaplan-Meier curves were generated from survival data of TCGA cancer patients when stratified by tumor VGLL1 transcript expression.

Isolation and expansion of VGLL1-specific CD8 T cells. Tumor antigen-specific CTLs were generated as previously described (Li et al., 2005). HLA-A*0101 positive patient- or healthy donor-derived PBMC were stimulated twice by autologous dendritic cells (DCs) pulsed with the $VGLL1_{231-240}$ peptide LSELETPGKY (SEQ ID NO: 93). Six days after the second DC stimulation, cultured cells were stained with $VGLL1_{231-240}$ peptide/HLA-A*0101-PE-conjugated custom tetramer (Fred Hutchinson Cancer Research Center), washed and then stained with APC-conjugated CD8 antibody. Cells were washed and analyzed by flow cytometry (LSRFortessa X-20 Analyzer). CD8 and tetramer double-positive cells were sorted by ARIA II and the VGLL1-specific CD8 T cells were expanded using the Rapid Expansion Protocol (REP) with PBMC and LCL feeder cells. The TCR $V_\beta$ repertoire of expanded CD8 T cells was assessed using the IOTest Beta Mark TCR-$V_\beta$ Repertoire kit.

Cytotoxic T cell assays. Antitumor killing by VGLL1-specific $CD8^+$ T cells was assessed using a standard chromium-51 ($^{51}Cr$) release assay. Target cells were labeled with 100 L of $^{51}Cr$ for 1 hour, then washed and plated at 2,000 target cells per well in triplicate. VGLL1-specific $CD8^+$ T cells were incubated with target cells at various effector-to-target (E:T) cell ratios for four hours. After the incubation period, supernatant was collected from the wells and $^{51}Cr$ was measured with a gamma radiation counter. The percentage of specific target cell lysis was calculated, correcting for background $^{51}Cr$ release and relative to a maximum $^{51}Cr$ release as measured by Triton X-100 lysed target cells.

Statistical analysis. Data analysis was performed using GraphPad Prism version 7.03. Normally distributed data were analyzed using parametric tests (ANOVA or unpaired t test). Kaplan-Meier survival curves were analyzed by log-rank tests. Test differences were considered statistically significant if P<0.05.

Example 3—Development and Characterization of T Cell Receptors

Figure 2:
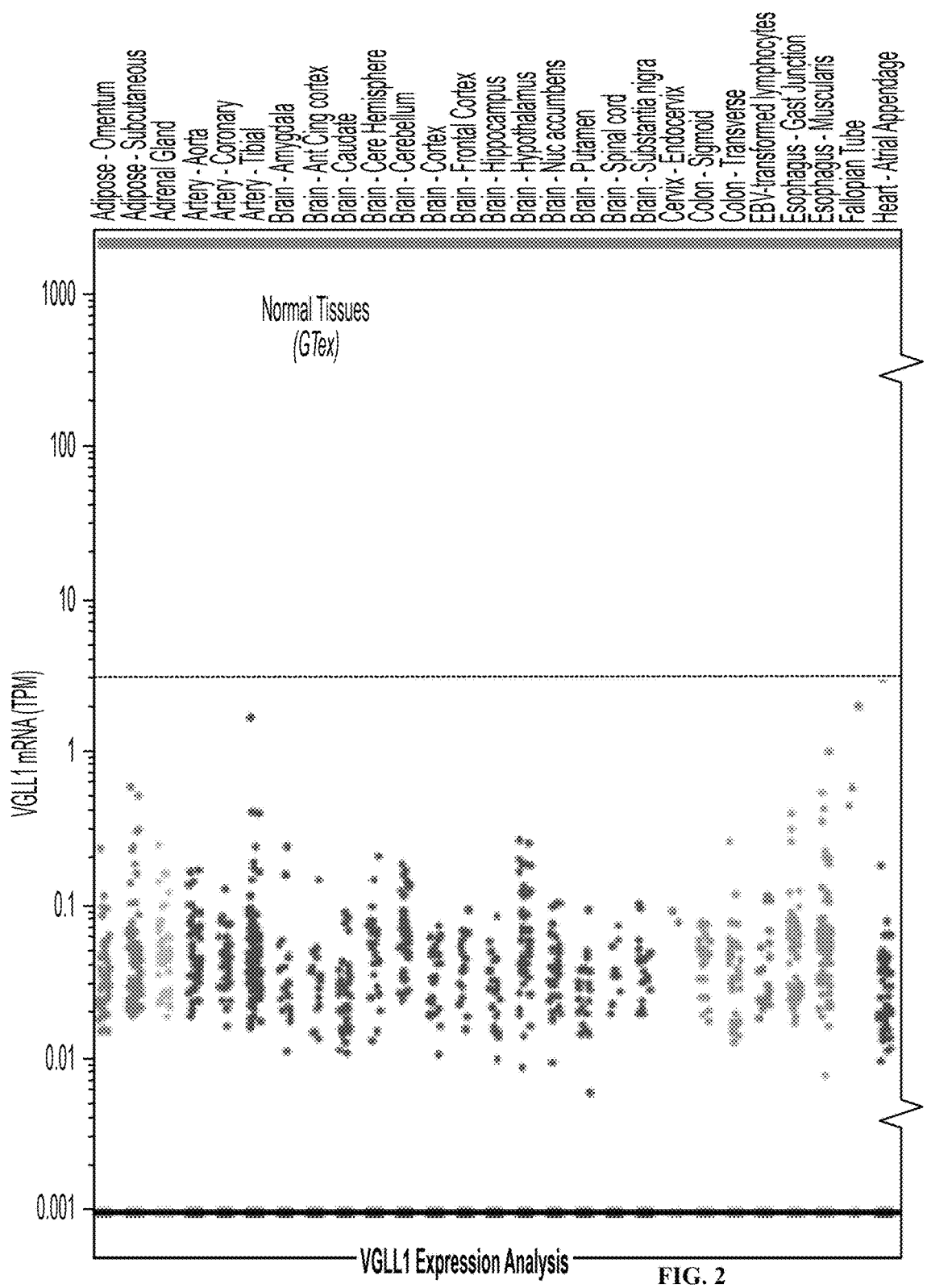
FIG. 2: VGLL1 is overexpressed in multiple tumor types. VGLL1 transcript expression in normal tissues (left, GTex Portal database) and human cancers (right, TCGA database), as determined by RNAseq analyses. Each dot represents one normal donor or patient tumor sample. Colors correspond to the 4 normal tissue categories defined in FIG. 1: Green, non-essential tissues (adipose, cervix, ebv, fallopian tube, muscle, ovary, transformed fibroblasts, uterus, skin, testis, vagina, prostate, breast, salivary gland); Yellow, caution tissues (adrenal gland, nerve, spleen, thyroid, whole blood, pancreas, pituitary, bladder); Orange, hazard tissues (colon, esophagus, liver, small intestine, stomach, kidney, lung); Red, danger tissues (artery, brain, heart). While >95% of normal GTex caution, hazard, and danger tissue samples fell below 3 transcripts per million (TPM, dotted line), significant numbers of TCGA cancer patients demonstrated VGLL1 transcript expression above this threshold (box).

VGLL1 TCRs were cloned and characterized for killing efficiency of target cells. PBMCs were transduced with VGLL1 TCRs to target Mel888HLAA1 cells pulsed with peptide. It was found that TCR expressing T cells can efficiently kill Mel888HLAA1 cells pulsed with peptide (FIG. 1). In addition, the cloned VGLL1 TCRs were shown to recognize endogenous expressed antigen (FIG. 2).

To clone T cell receptors, total RNA was isolated from VGLL1 specific T cells by RNeasy kit (QIAGEN, 74104), and cDNA was synthesized using 5'-RACE technique (rapid amplification of cDNA ends, Takara, 634859). TCRα and TCRβ chains were then separately amplified by PCR using 3'-end primer that specifically bind to either TCRα or TCRβ constant region. The 5'-end primer complement to the common sequence was added during cDNA synthesis. PCR product was then cloned into TOPO cloning vector (Invitrogen, 450641) and 30 DNA clones were sequenced to determine each of the α or β chains. One TCRβ (TRBVC1 5-6*01 J1-1) and 4 major TCRα clones (TRAV19*01 J56*01, TRAV13-1*02 J10, TRAV13-1*02 J1301, TRAV23 J12) were identified after gene alignment using IMGT database. For the functional test, 4 TCRα/β clones were designed by paring the TCRβ with different TCRα and each of the α and β chains was connected by a linker containing Furin and P2A cleavage sites. The full-length genes were synthesized by Twist company and then cloned into pMSGV1 vector which has been used in several clinical trials by inserting the TCR DNA fragment into the SalI and NotI sites.

Generation of retroviral particles for TCR transduction: The pMSGV1-based on retroviral vectors encoding 4 different VGLL1-specific TCRs were used for generating retroviral particles using the packaging cell line 293GP with RT114 as envelop protein to enhance T cell transduction efficiency. Normal PBMCs obtained from MD Anderson blood bank were transduced and continually cultured for 5 days. VGLL1 peptide tetramer and CD8 double positive T cells were then sorted out by flow cytometry. These T cells were either directly used in cytotoxicity assay or subjected to T cell replication depending on the cell number after sorting.

Figure 16:
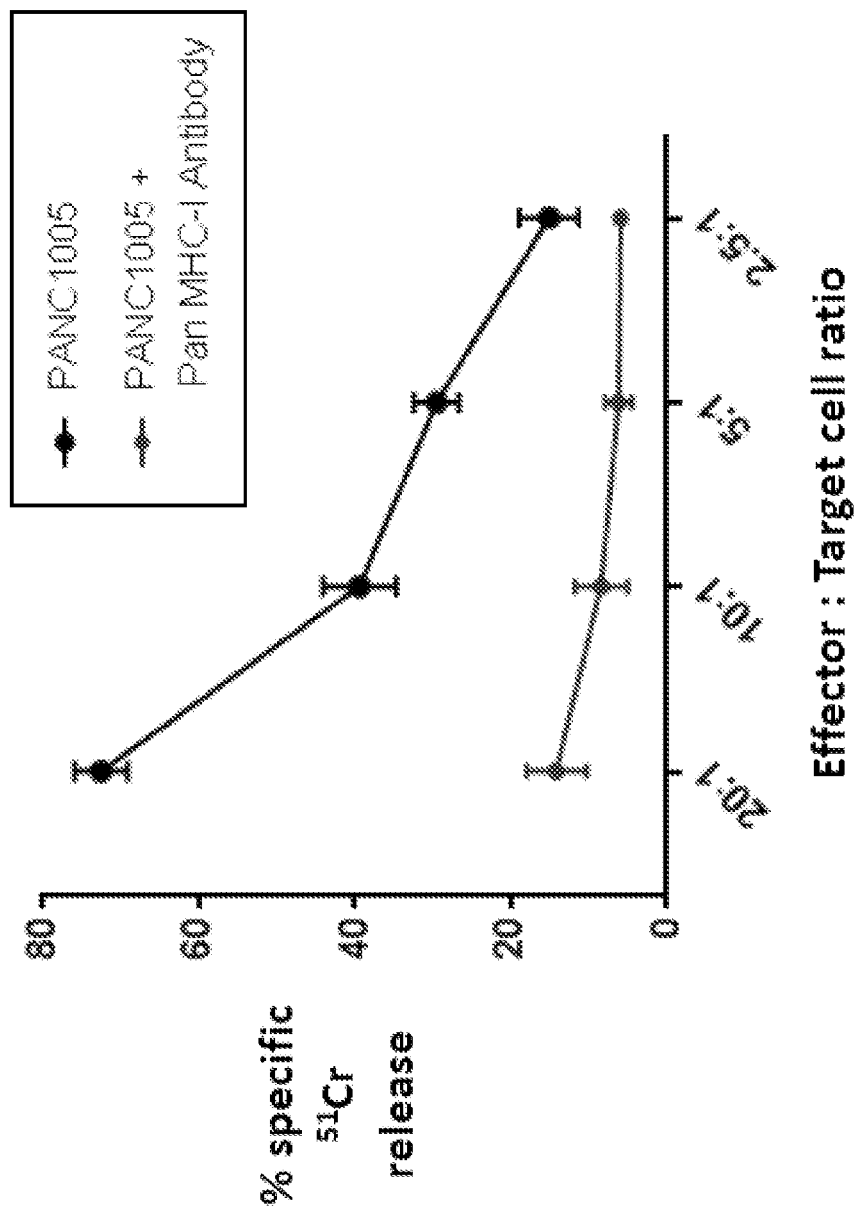
FIG. 16: VGLL1-CTL killing is blocked with an HLA-class I-specific antibody. Expanded VGLL1-specific CD8+ T cells were co-cultured with HLA-A*0101-positive PDAC tumor cell line PANC10.05 in a standard $^{51}Cr$ release assay to measure cytotoxic activity at different effector-to-target (E:T) cell ratios. Addition of the HLA class I blocking antibody W6/32 largely abrogated VGLL1-CTL killing, demonstrating that antitumor CTL activity is HLA class I-restricted

VGLL1-TCR expression mediates CTL cytotoxicity: Melanoma cell line mel888 express endogenous HLAA1, but do not express detectable level of VGLL1 protein. Mel888 were pulsed with 10 microgram of peptides, and co-cultured with TCR-transduced effector T cells at different ratios. T cell-mediated target cell death was measured based on chromium-51 release. Effector T cells expressing TCR clones number 1 and 3 could lyse 20-30% target tumor cells at as low as 1.25:1 of effector: target ratio and 70-80% target cells at 40:1 ratio within 4 hours of incubation. VGLL1 TCR clones number 2 and 4 appeared to be slightly weaker, but the difference is not dramatic among all four TCR clones (FIG. 16).

Figure 17:
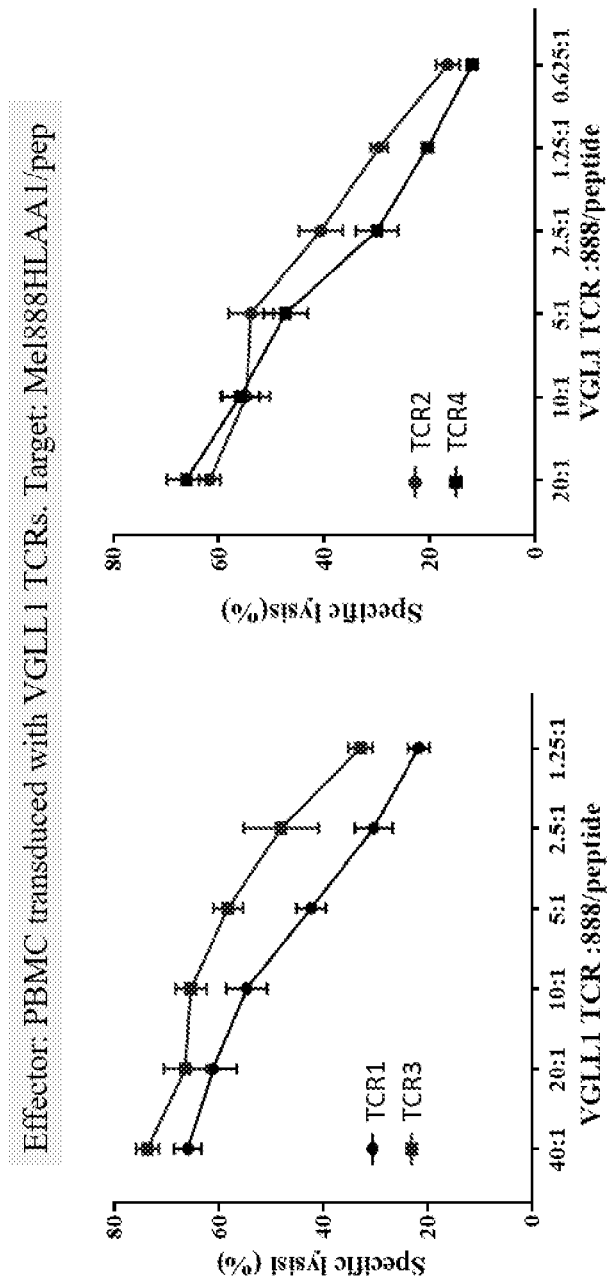
FIG. 17: TCR expressing T cells can efficiently kill Mel888HLAA1 cells pulsed with peptide. PBMCs were transduced with VGLL1 TCRs to target Mel888HLAA1 cells pulsed with peptide.
Figure 18:
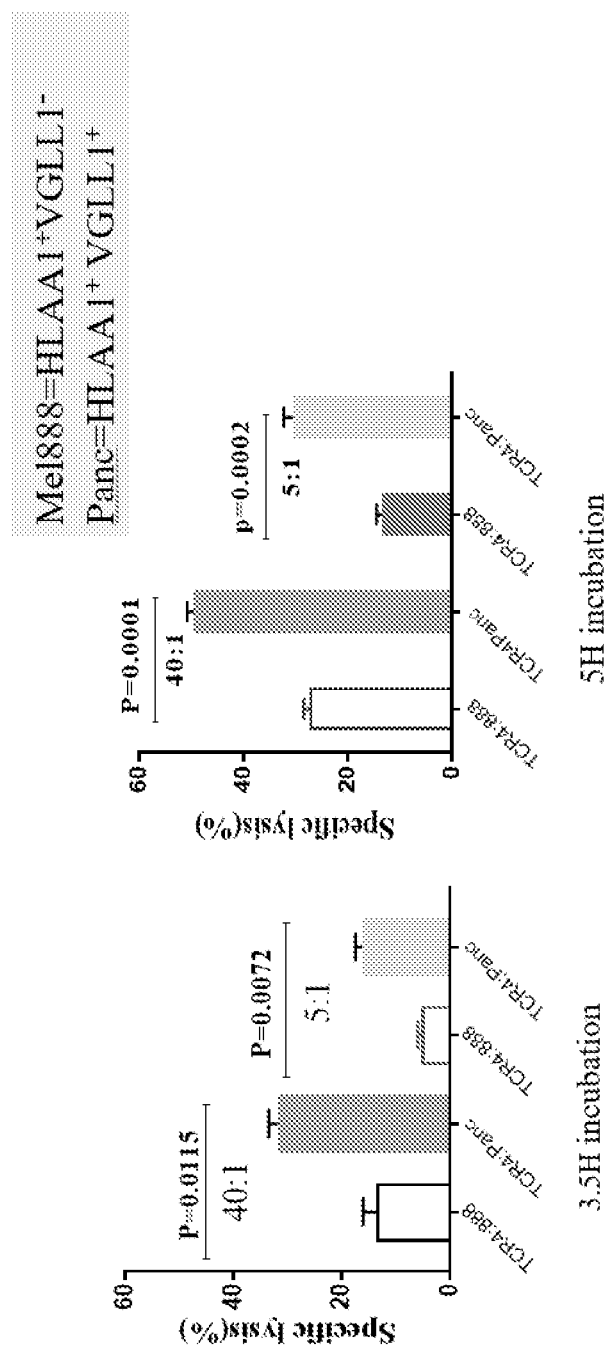
FIG. 18: Cloned VGLL1 TCRs can recognize endogenous expressed antigen. The Mel888A1 cells are HLA+VGLL1− and the Panc cells are HLAAIVGLL1+.

The efficiency of VGLL1-TCR to recognize and lyse tumor cells expressing endogenous VGLL1 was further determined. In this assay, mel888 cell line and a pancreatic cell line expressing both HLAA1 and VGLL1 were co-cultured with TCR-4-transduced T cells at 40:1 and 5:1 ratios for different time points. 30% of pancreatic cells was lysed after 3.5 hours of incubation and 50% was killed after 5 hours (FIG. 17). Thus, VGLL1-TCR expression mediates cytotoxic activity of transduced T cell.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Austin-Ward and Villaseca, Revista Medica de Chile, 126 (7):838-845, 1998.
Ausubel et al., Current Protocols in Molecular Biology, Wiley & Sons, N Y, 1994.
Bradley et al., Cancer Immunol Res 3, 602-609, doi: 10.1158/2326-6066.CIR-15-0030, 2015.
Bukowski et al., Clinical Cancer Res., 4(10):2337-2347, 1998.
Camacho et al. (2004) J Clin Oncology 22(145): Abstract No. 2505, 2004.
Chothia et al., EMBO J. 7:3745, 1988.
Christodoulides et al., Microbiology, 144 (Pt 11):3027-3037, 1998.
Cohen et al. J Immunol. 175:5799-5808, 2005.
Davidson et al., J. Immunother., 21(5):389-398, 1998.
Davila et al. PLoS ONE 8(4): e61338, 2013.
European Patent Application No. EP2537416
Fedorov et al., Sci. Transl. Medicine, 5(215), 2013.
Janeway et al, Immunobiology: The Immune System in Health and Disease, 3$^{rd}$ Ed., Current
Hanibuchi et al., Int. J Cancer, 78(4):480-485, 1998.
Heemskerk et al. Hum Gene Ther. 19:496-510, 2008.
Hellstrand et al., Acta Oncologica, 37(4):347-353, 1998.
Hollander, Front. Immun., 3:3, 2012.
Hui and Hashimoto, Infection Immun., 66(11):5329-5336, 1998.
Hurwitz et al., Proc Natl Acad Sci USA 95(17): 10067-10071, 1998.
International Patent Publication No. WO 00/37504
International Patent Publication No. WO1995001994
International Patent Publication No. WO1998042752
International Patent Publication No. WO2000037504
International Patent Publication No. WO200014257
International Patent Publication No. WO2001014424
International Patent Publication No. WO2010/027827
International Patent Publication No. WO2011/066342
International Patent Publication No. WO2012/129514
International Patent Publication No. WO2013/071154
International Patent Publication No. WO2013/123061
International Patent Publication No. WO2013/166321
International Patent Publication No. WO2013126726
International Patent Publication No. WO2014/055668
International Patent Publication No. WO2014031687
International Patent Publication No. WO2015016718
International Patent Publication No. WO2018/067869
Johnson et al. Blood 114:535-46, 2009.
Jores et al., PNAS U.S.A. 87:9138, 1990.
Lefranc et al., Dev. Comp. Immunol. 27:55, 2003.
Li et al., J Immunol 175, 2261-2269, 2005.
Mokyr et al. Cancer Res 58:5301-5304, 1998.
Pardoll, Nature Rev Cancer 12:252-264, 2012.
Parkhurst et al. Clin Cancer Res. 15: 169-180, 2009.
Qin et al., Proc. Natl. Acad. Sci. USA, 95(24):14411-14416, 1998.
Rizvi et al., Science 348, 124-128, doi:10.1126/science.aaa1348, 2015.
Sadelain et al., Cancer Discov. 3(4): 388-398, 2013.
Sambrook et al., Molecular Cloning: A Laboratory Manual, 3$^{rd}$ ed., Cold Spring Harbor Press,
Strobel et al., Nat Rev Clin Oncol 16, 11-26, doi:10.1038/s41571-018-0112-1, 2019.
Terakura et al. Blood. 1:72-82, 2012.
Turtle et al., Curr. Opin. Immunol., 24(5): 633-39, 2012.
U.S. Pat. No. 4,870,287
U.S. Pat. No. 5,739,169
U.S. Pat. No. 5,760,395
U.S. Pat. No. 5,801,005
U.S. Pat. No. 5,824,311
U.S. Pat. No. 5,830,880

U.S. Pat. No. 5,844,905
U.S. Pat. No. 5,846,945
U.S. Pat. No. 5,885,796
U.S. Pat. No. 6,207,156
U.S. Pat. No. 6,410,319
U.S. Pat. No. 6,451,995
U.S. Pat. No. 7,070,995
U.S. Pat. No. 7,265,209
U.S. Pat. No. 7,354,762
U.S. Pat. No. 7,446,179
U.S. Pat. No. 7,446,190
U.S. Pat. No. 7,446,191
U.S. Pat. No. 8,008,449
U.S. Pat. No. 8,017,114
U.S. Pat. No. 8,119,129
U.S. Pat. No. 8,252,592
U.S. Pat. No. 8,324,353
U.S. Pat. No. 8,329,867
U.S. Pat. No. 8,339,645
U.S. Pat. No. 8,354,509
U.S. Pat. No. 8,398,282
U.S. Pat. No. 8,479,118
U.S. Pat. No. 8,735,553
U.S. Patent Publication No. 2002/131960
U.S. Patent Publication No. 2011/0008369
U.S. Patent Publication No. 2013/0149337
U.S. Patent Publication No. 2013/287748
U.S. Patent Publication No. 2014/022021
U.S. Patent Publication No. 2014/0294898
Varela-Rohena et al. *Nat Med.* 14: 1390-1395, 2008.
Wang et al. *J Immunother.* 35(9):689-701, 2012.
Wu et al., *Cancer,* 18(2): 160-75, 2012.
Yarchoan et al., *N Engl J Med* 377, 2500-2501, doi:10.1056/NEJMc1713444, 2017.
Young et al., *Ther Adv Med Oncol* 10, 1758835918816281, doi:10.1177/1758835918816281, 2018.

What is claimed is:

1. An engineered T cell receptor (TCR), wherein the TCR specifically binds Vestigial-like 1 (VGLL1) and comprises:
   (a) alpha chain CDR1 (SEQ ID NO: 16), CDR2 (SEQ ID NO: 17), and CDR3 (SEQ ID NO: 18) and beta chain CDR1 (SEQ ID NO:21), CDR2 (SEQ ID NO:22), and CDR3 (SEQ ID NO:23);
   (b) alpha chain CDR1 (SEQ ID NO: 39), CDR2 (SEQ ID NO: 40), and CDR3 (SEQ ID NO: 41) and beta chain CDR1 (SEQ ID NO:44), CDR2 (SEQ ID NO:45), and CDR3 (SEQ ID NO:46);
   (c) alpha chain CDR1 (SEQ ID NO: 62), CDR2 (SEQ ID NO: 63), and CDR3 (SEQ ID NO: 64) and beta chain CDR1 (SEQ ID NO:67), CDR2 (SEQ ID NO:68), and CDR3 (SEQ ID NO:69); or
   (d) alpha chain CDR1 (SEQ ID NO: 85), CDR2 (SEQ ID NO: 86), and CDR3 (SEQ ID NO: 87) and beta chain CDR1 (SEQ ID NO:90), CDR2 (SEQ ID NO:91), and CDR3 (SEQ ID NO:92).

2. The TCR of claim 1, wherein the TCR comprises alpha chain CDR1 (SEQ ID NO: 16), CDR2 (SEQ ID NO: 17), and CDR3 (SEQ ID NO: 18) and beta chain CDR1 (SEQ ID NO:21), CDR2 (SEQ ID NO:22), and CDR3 (SEQ ID NO: 23).

3. The TCR of claim 2, wherein the TCR comprises an alpha chain variable region other than the CDRs having at least 90% identity to the amino acid sequence of SEQ ID NO: 15 and a beta chain variable region other than the CDRs having at least 90% identity to the amino acid sequence of SEQ ID NO:20.

4. The TCR of claim 1, wherein the TCR comprises an alpha chain variable region other than the CDRs having at least 90% identity to the nucleotide sequence of SEQ ID NO:3 and a beta chain variable region other than the CDRs having at least 90% identity to the nucleotide sequence of SEQ ID NO:9.

5. The TCR of claim 1, wherein the TCR other than the CDRs has at least 90% identity to SEQ ID NO:13.

6. The TCR of claim 1, wherein the TCR comprises alpha chain CDR1 (SEQ ID NO: 39), CDR2 (SEQ ID NO: 40), and CDR3 (SEQ ID NO: 41) and beta chain CDR1 (SEQ ID NO:44), CDR2 (SEQ ID NO:45), and CDR3 (SEQ ID NO: 46).

7. The TCR of claim 6, wherein the TCR comprises an alpha chain variable region other than the CDRs having at least 90% identity to the amino acid sequence of SEQ ID NO: 38 and a beta chain variable region other than the CDRs having at least 90% identity to the amino acid sequence of SEQ ID NO:43.

8. The TCR of claim 6, wherein the TCR comprises an alpha chain variable region other than the CDRs having at least 90% identity to the nucleotide sequence of SEQ ID NO:26 and a beta chain variable region other than the CDRs having at least 90% identity to the nucleotide sequence of SEQ ID NO:32.

9. The TCR of claim 6, wherein the TCR other than the CDRs has at least 90% identity to SEQ ID NO:36.

10. The TCR of claim 1, wherein the TCR comprises alpha chain CDR1 (SEQ ID NO: 62), CDR2 (SEQ ID NO: 63), and CDR3 (SEQ ID NO: 64) and beta chain CDR1 (SEQ ID NO:67), CDR2 (SEQ ID NO:68), and CDR3 (SEQ ID NO: 69).

11. The TCR of claim 10, wherein the TCR comprises an alpha chain variable region other than the CDRs having at least 90% identity to the amino acid sequence of SEQ ID NO: 61 and a beta chain variable region other than the CDRs having at least 90% identity to the amino acid sequence of SEQ ID NO:66.

12. The TCR of claim 10, wherein the TCR comprises an alpha chain variable region other than the CDRs having at least 90% identity to the nucleotide sequence of SEQ ID NO:49 and a beta chain variable region other than the CDRs having at least 90% identity to the nucleotide sequence of SEQ ID NO:55.

13. The TCR of claim 10, wherein the TCR other than the CDRs has at least 90% identity to SEQ ID NO:59.

14. The TCR of claim 1, wherein the TCR comprises alpha chain CDR1 (SEQ ID NO: 85), CDR2 (SEQ ID NO: 86), and CDR3 (SEQ ID NO: 87) and beta chain CDR1 (SEQ ID NO:90), CDR2 (SEQ ID NO:91), and CDR3 (SEQ ID NO: 92).

15. The TCR of claim 14, wherein the TCR comprises an alpha chain variable region other than the CDRs having at least 90% identity to the amino acid sequence of SEQ ID NO: 84 and a beta chain variable region other than the CDRs having at least 90% identity to the amino acid sequence of SEQ ID NO:89.

16. The TCR of claim 14, wherein the TCR comprises an alpha chain variable region other than the CDRs having at least 90% identity to the nucleotide sequence of SEQ ID NO:72 and a beta chain variable region other than the CDRs having at least 90% identity to the nucleotide sequence of SEQ ID NO:78.

17. The TCR of claim 14, wherein the TCR other than the CDRs has at least 90% identity to SEQ ID NO:82.

18. The TCR of claim 1, wherein the engineered TCR binds HLA-A*0101.

19. The TCR of claim 1, wherein the TCR is further defined as a soluble TCR, wherein the soluble TCR does not comprise a transmembrane domain.

20. The TCR of claim 1, wherein the TCR is covalently bound to a therapeutic agent.

21. A host cell engineered to express the TCR of claim 1.

22. A method of treating cancer in a subject comprising administering an effective amount of a population of TCR-engineered cells of claim 21 to the subject.

\* \* \* \* \*

SEQUENCE LISTING

<160> NUMBER OF SEQ ID NOS: 93

<210> SEQ ID NO 1
<211> LENGTH: 858
<212> TYPE: DNA
<213> ORGANISM: Artificial sequence
<220> FEATURE:
<223> OTHER INFORMATION: Synthetic T cell receptor

<400> SEQUENCE: 1

```
tctagaccgc catgggtcga cgccaccatg aacatgctga ctgccagcct gttgagggca      60
gtcatagcct ccatctgtgt tgtatccagc atggctcaga aggtaactca agcgcagact     120
gaaatttctg tggtggagaa ggaggatgtg accttggact gtgtgtatga acccgtgat     180 actacttatt acttattctg gtacaagcaa ccaccaagtg agaattggt tttccttatt     240 cgtcggaact cttttgatga gcaaaatgaa ataagtggtc ggtattcttg gaacttccag     300
aaatccacca gttccttcaa cttcaccatc acagcctcac aagtcgtgga ctcagcagta     360
tacttctgtg ctctgagtcc tggagccaat agtaagctga catttggaaa aggaataact     420
ctgagtgtta gaccagatat ccagaaccct gaccctgccg tgtaccagct gagagactct     480
aaatccagtg acaagtctgt ctgcctattc accgattttg attctcaaac aaatgtgtca     540
caaagtaagg attctgatgt gtatatcaca gacaaaactg tgctagacat gaggtctatg     600
gacttcaaga gcaacagtgc tgtggcctgg agcaacaaat ctgactttgc atgtgcaaac     660
gccttcaaca acagcattat tccagaagac accttcttcc ccagcccaga aagttcctgt     720
gatgtcaagc tggtcgagaa aagctttgaa acagatacga acctaaactt tcaaaacctg     780
tcagtgattg ggttccgaat cctcctcctg aaagtggccg ggtttaatct gctcatgacg     840
ctgcggctgt ggtccagc                                                   858
```

<210> SEQ ID NO 2
<211> LENGTH: 69
<212> TYPE: DNA
<213> ORGANISM: Artificial sequence
<220> FEATURE:
<223> OTHER INFORMATION: Synthetic T cell receptor

<400> SEQUENCE: 2

```
atgaacatgc tgactgccag cctgttgagg gcagtcatag cctccatctg tgttgtatcc      60
agcatggct                                                              69
```

```
<210> SEQ ID NO 3
<211> LENGTH: 340
<212> TYPE: DNA
<213> ORGANISM: Artificial sequence
<220> FEATURE:
<223> OTHER INFORMATION: Synthetic T cell receptor

<400> SEQUENCE: 3
cagaaggtaa ctcaagcgca gactgaaatt tctgtggtgg agaaggagga tgtgaccttg    60
gactgtgtgt atgaaacccg tgatactact tattacttat tctggtacaa gcaaccacca   120
agtggagaat tggttttcct tattcgtcgg aactcttttg atgagcaaaa tgaaataagt   180
ggtcggtatt cttggaactt ccagaaatcc accagttcct tcaacttcac catcacagcc   240
tcacaagtcg tggactcagc agtatacttc tgtgctctga gtcctggagc caatagtaag   300
ctgacatttg gaaaaggaat aactctgagt gttagaccag                         340

<210> SEQ ID NO 4
<211> LENGTH: 21
<212> TYPE: DNA
<213> ORGANISM: Artificial sequence
<220> FEATURE:
<223> OTHER INFORMATION: Synthetic T cell receptor

<400> SEQUENCE: 4
acccgtgata ctacttatta c                                              21

<210> SEQ ID NO 5
<211> LENGTH: 24
<212> TYPE: DNA
<213> ORGANISM: Artificial sequence
<220> FEATURE:
<223> OTHER INFORMATION: Synthetic T cell receptor

<400> SEQUENCE: 5
cggaactctt ttgatgagca aaat                                           24

<210> SEQ ID NO 6
<211> LENGTH: 39
<212> TYPE: DNA
<213> ORGANISM: Artificial sequence
<220> FEATURE:
<223> OTHER INFORMATION: Synthetic T cell receptor

<400> SEQUENCE: 6
tgtgctctga gtcctggagc caatagtaag ctgacattt                           39

<210> SEQ ID NO 7
<211> LENGTH: 966
<212> TYPE: DNA
<213> ORGANISM: Artificial sequence
<220> FEATURE:
<223> OTHER INFORMATION: Synthetic T cell receptor

<400> SEQUENCE: 7
atgggccccg ggctcctctg ctgggcactg ctttgtctcc tgggagcagg cttagtggac    60
gctggagtca cccaaagtcc cacacacctg atcaaaacga gaggacagca agtgactctg   120
agatgctctc ctaagtctgg gcatgacact gtgtcctggt accaacaggc cctgggtcag   180
gggccccagt ttatctttca gtattatgag gaggaagaga cagagagg caacttccct   240 gatcgattct caggtcacca gttccctaac tatagctctg agctgaatgt gaacgccttg   300
ttgctggggg actcggccct ctatctctgt gccagcagcg tcggacagg tatcactgaa   360
```

```
gctttctttg dacaaggcac cagactcaca gttgtagagg acctgaacaa ggtgttccca    420
cccgaggtcg ctgtgtttga gccatcagaa gcagagatct cccacaccca aaaggccaca    480
ctggtgtgcc tggccacagg cttcttccct gaccacgtgg agctgagctg gtgggtgaat    540
gggaaggagg tgcacagtgg ggtcagcacg gacccgcagc ccctcaagga gcagcccgcc    600
ctcaatgact ccagatactg cctgagcagc cgcctgaggg tctcggccac cttctggcag    660 aaccccgca accacttccg ctgtcaagtc cagttctacg ggctctcgga gaatgacgag    720
tggacccagg atagggccaa acccgtcacc cagatcgtca gcgccgaggc tggggtaga    780 gcagactgtg gctttacctc ggtgtcctac cagcaagggg tcctgtctgc caccatcctc    840
tatgagatcc tgctagggaa ggccaccctg tatgctgtgc tggtcagcgc ccttgtgttg    900
atggccatgg tcaagagaaa ggatttctga ctcgagaagc ttgcggccgc ggatccgata    960
aaataa                                                               966
```

```
<210> SEQ ID NO 8
<211> LENGTH: 63
<212> TYPE: DNA
<213> ORGANISM: Artificial sequence
<220> FEATURE:
<223> OTHER INFORMATION: Synthetic T cell receptor

<400> SEQUENCE: 8
atgggccccg ggctcctctg ctgggcactg ctttgtctcc tgggagcagg cttagtggac    60
gct                                                                  63
```

```
<210> SEQ ID NO 9
<211> LENGTH: 334
<212> TYPE: DNA
<213> ORGANISM: Artificial sequence
<220> FEATURE:
<223> OTHER INFORMATION: Synthetic T cell receptor

<400> SEQUENCE: 9
ggagtcaccc aaagtcccac acacctgatc aaaacgagag acagcaagt gactctgaga    60 tgctctccta agtctgggca tgacactgtg tcctggtacc aacaggccct gggtcagggg   120
ccccagttta tctttcagta ttatgaggag gaagagagac agagaggcaa cttccctgat   180
cgattctcag gtcaccagtt ccctaactat agctctgagc tgaatgtgaa cgccttgttg   240
ctgggggact cggccctcta tctctgtgcc agcagcgtcg ggacaggtat cactgaagct   300
ttctttggac aaggcaccag actcacagtt gtag                               334
```

```
<210> SEQ ID NO 10
<211> LENGTH: 15
<212> TYPE: DNA
<213> ORGANISM: Artificial sequence
<220> FEATURE:
<223> OTHER INFORMATION: Synthetic T cell receptor

<400> SEQUENCE: 10
tctgggcatg acact                                                     15
```

```
<210> SEQ ID NO 11
<211> LENGTH: 18
<212> TYPE: DNA
<213> ORGANISM: Artificial sequence
<220> FEATURE:
<223> OTHER INFORMATION: Synthetic T cell receptor
```

```
<400> SEQUENCE: 11
tattatgagg aggaagag                                                   18

<210> SEQ ID NO 12
<211> LENGTH: 42
<212> TYPE: DNA
<213> ORGANISM: Artificial sequence
<220> FEATURE:
<223> OTHER INFORMATION: Synthetic T cell receptor

<400> SEQUENCE: 12
tgtgccagca gcgtcgggac aggtatcact gaagctttct tt                       42

<210> SEQ ID NO 13
<211> LENGTH: 613
<212> TYPE: PRT
<213> ORGANISM: Artificial sequence
<220> FEATURE:
<223> OTHER INFORMATION: Synthetic T cell receptor

<400> SEQUENCE: 13
```

Met Asn Met Leu Thr Ala Ser Leu Leu Arg Ala Val Ile Ala Ser Ile
1               5                   10                  15

Cys Val Val Ser Ser Met Ala Gln Lys Val Thr Gln Ala Gln Thr Glu
            20                  25                  30

Ile Ser Val Val Glu Lys Glu Asp Val Thr Leu Asp Cys Val Tyr Glu
        35                  40                  45

Thr Arg Asp Thr Thr Tyr Tyr Leu Phe Trp Tyr Lys Gln Pro Pro Ser
    50                  55                  60

Gly Glu Leu Val Phe Leu Ile Arg Arg Asn Ser Phe Asp Glu Gln Asn
65                  70                  75                  80

Glu Ile Ser Gly Arg Tyr Ser Trp Asn Phe Gln Lys Ser Thr Ser Ser
                85                  90                  95

Phe Asn Phe Thr Ile Thr Ala Ser Gln Val Val Asp Ser Ala Val Tyr
            100                 105                 110

Phe Cys Ala Leu Ser Pro Gly Ala Asn Ser Lys Leu Thr Phe Gly Lys
        115                 120                 125

Gly Ile Thr Leu Ser Val Arg Pro Asp Ile Gln Asn Pro Asp Pro Ala
    130                 135                 140

Val Tyr Gln Leu Arg Asp Ser Lys Ser Ser Asp Lys Ser Val Cys Leu
145                 150                 155                 160

Phe Thr Asp Phe Asp Ser Gln Thr Asn Val Ser Gln Ser Lys Asp Ser
                165                 170                 175

Asp Val Tyr Ile Thr Asp Lys Thr Val Leu Asp Met Arg Ser Met Asp
            180                 185                 190

Phe Lys Ser Asn Ser Ala Val Ala Trp Ser Asn Lys Ser Asp Phe Ala
        195                 200                 205

Cys Ala Asn Ala Phe Asn Asn Ser Ile Ile Pro Glu Asp Thr Phe Phe
    210                 215                 220

Pro Ser Pro Glu Ser Ser Cys Asp Val Lys Leu Val Glu Lys Ser Phe
225                 230                 235                 240

Glu Thr Asp Thr Asn Leu Asn Phe Gln Asn Leu Ser Val Ile Gly Phe
                245                 250                 255

Arg Ile Leu Leu Leu Lys Val Ala Gly Phe Asn Leu Leu Met Thr Leu
            260                 265                 270

Arg Leu Trp Ser Ser Arg Ala Lys Arg Ser Gly Ser Gly Ala Thr Asn
        275                 280                 285

-continued

```
Phe Ser Leu Leu Lys Gln Ala Gly Asp Val Glu Glu Asn Pro Gly Pro
    290                 295                 300
Met Gly Pro Gly Leu Leu Cys Trp Ala Leu Leu Cys Leu Leu Gly Ala
305                 310                 315                 320
Gly Leu Val Asp Ala Gly Val Thr Gln Ser Pro Thr His Leu Ile Lys
                325                 330                 335
Thr Arg Gly Gln Gln Val Thr Leu Arg Cys Ser Pro Lys Ser Gly His
            340                 345                 350
Asp Thr Val Ser Trp Tyr Gln Gln Ala Leu Gly Gln Gly Pro Gln Phe
        355                 360                 365
Ile Phe Gln Tyr Tyr Glu Glu Glu Arg Gln Arg Gly Asn Phe Pro
    370                 375                 380
Asp Arg Phe Ser Gly His Gln Phe Pro Asn Tyr Ser Ser Glu Leu Asn
385                 390                 395                 400
Val Asn Ala Leu Leu Leu Gly Asp Ser Ala Leu Tyr Leu Cys Ala Ser
                405                 410                 415
Ser Val Gly Thr Gly Ile Thr Glu Ala Phe Phe Gly Gln Gly Thr Arg
            420                 425                 430
Leu Thr Val Val Glu Asp Leu Asn Lys Val Phe Pro Pro Glu Val Ala
        435                 440                 445
Val Phe Glu Pro Ser Glu Ala Glu Ile Ser His Thr Gln Lys Ala Thr
    450                 455                 460
Leu Val Cys Leu Ala Thr Gly Phe Phe Pro Asp His Val Glu Leu Ser
465                 470                 475                 480
Trp Trp Val Asn Gly Lys Glu Val His Ser Gly Val Ser Thr Asp Pro
                485                 490                 495
Gln Pro Leu Lys Glu Gln Pro Ala Leu Asn Asp Ser Arg Tyr Cys Leu
            500                 505                 510
Ser Ser Arg Leu Arg Val Ser Ala Thr Phe Trp Gln Asn Pro Arg Asn
        515                 520                 525
His Phe Arg Cys Gln Val Gln Phe Tyr Gly Leu Ser Glu Asn Asp Glu
    530                 535                 540
Trp Thr Gln Asp Arg Ala Lys Pro Val Thr Gln Ile Val Ser Ala Glu
545                 550                 555                 560
Ala Trp Gly Arg Ala Asp Cys Gly Phe Thr Ser Val Ser Tyr Gln Gln
                565                 570                 575
Gly Val Leu Ser Ala Thr Ile Leu Tyr Glu Ile Leu Leu Gly Lys Ala
            580                 585                 590
Thr Leu Tyr Ala Val Leu Val Ser Ala Leu Val Leu Met Ala Met Val
        595                 600                 605
Lys Arg Lys Asp Phe
    610

<210> SEQ ID NO 14
<211> LENGTH: 22
<212> TYPE: PRT
<213> ORGANISM: Artificial sequence
<220> FEATURE:
<223> OTHER INFORMATION: Synthetic T cell receptor

<400> SEQUENCE: 14

Met Asn Met Leu Thr Ala Ser Leu Leu Arg Ala Val Ile Ala Ser Ile
1               5                   10                  15

Cys Val Val Ser Ser Met
            20
```

<210> SEQ ID NO 15
<211> LENGTH: 117
<212> TYPE: PRT
<213> ORGANISM: Artificial sequence
<220> FEATURE:
<223> OTHER INFORMATION: Synthetic T cell receptor

<400> SEQUENCE: 15

```
Ala Gln Lys Val Thr Gln Ala Gln Thr Glu Ile Ser Val Val Glu Lys
1               5                   10                  15

Glu Asp Val Thr Leu Asp Cys Val Tyr Glu Thr Arg Asp Thr Thr Tyr
            20                  25                  30

Tyr Leu Phe Trp Tyr Lys Gln Pro Pro Ser Gly Glu Leu Val Phe Leu
        35                  40                  45

Ile Arg Arg Asn Ser Phe Asp Glu Gln Asn Glu Ile Ser Gly Arg Tyr
    50                  55                  60

Ser Trp Asn Phe Gln Lys Ser Thr Ser Ser Phe Asn Phe Thr Ile Thr
65                  70                  75                  80

Ala Ser Gln Val Val Asp Ser Ala Val Tyr Phe Cys Ala Leu Ser Pro
                85                  90                  95

Gly Ala Asn Ser Lys Leu Thr Phe Gly Lys Gly Ile Thr Leu Ser Val
            100                 105                 110

Arg Pro Asp Ile Gln
        115
```

<210> SEQ ID NO 16
<211> LENGTH: 7
<212> TYPE: PRT
<213> ORGANISM: Artificial sequence
<220> FEATURE:
<223> OTHER INFORMATION: Synthetic T cell receptor

<400> SEQUENCE: 16

```
Thr Arg Asp Thr Thr Tyr Tyr
1               5
```

<210> SEQ ID NO 17
<211> LENGTH: 8
<212> TYPE: PRT
<213> ORGANISM: Artificial sequence
<220> FEATURE:
<223> OTHER INFORMATION: Synthetic T cell receptor

<400> SEQUENCE: 17

```
Arg Asn Ser Phe Asp Glu Gln Asn
1               5
```

<210> SEQ ID NO 18
<211> LENGTH: 13
<212> TYPE: PRT
<213> ORGANISM: Artificial sequence
<220> FEATURE:
<223> OTHER INFORMATION: Synthetic T cell receptor

<400> SEQUENCE: 18

```
Cys Ala Leu Ser Pro Gly Ala Asn Ser Lys Leu Thr Phe
1               5                   10
```

<210> SEQ ID NO 19
<211> LENGTH: 15
<212> TYPE: PRT
<213> ORGANISM: Artificial sequence

```
<220> FEATURE:
<223> OTHER INFORMATION: Synthetic T cell receptor

<400> SEQUENCE: 19

Met Gly Pro Gly Leu Leu Cys Trp Ala Leu Leu Cys Leu Leu Gly
1               5                   10                  15

<210> SEQ ID NO 20
<211> LENGTH: 118
<212> TYPE: PRT
<213> ORGANISM: Artificial sequence
<220> FEATURE:
<223> OTHER INFORMATION: Synthetic T cell receptor

<400> SEQUENCE: 20

Ala Gly Leu Val Asp Ala Gly Val Thr Gln Ser Pro Thr His Leu Ile
1               5                   10                  15

Lys Thr Arg Gly Gln Gln Val Thr Leu Arg Cys Ser Pro Lys Ser Gly
            20                  25                  30

His Asp Thr Val Ser Trp Tyr Gln Gln Ala Leu Gly Gln Gly Pro Gln
        35                  40                  45

Phe Ile Phe Gln Tyr Tyr Glu Glu Glu Arg Gln Arg Gly Asn Phe
    50                  55                  60

Pro Asp Arg Phe Ser Gly His Gln Phe Pro Asn Tyr Ser Ser Glu Leu
65                  70                  75                  80

Asn Val Asn Ala Leu Leu Leu Gly Asp Ser Ala Leu Tyr Leu Cys Ala
                85                  90                  95

Ser Ser Val Gly Thr Gly Ile Thr Glu Ala Phe Phe Gly Gln Gly Thr
            100                 105                 110

Arg Leu Thr Val Val Glu
        115

<210> SEQ ID NO 21
<211> LENGTH: 5
<212> TYPE: PRT
<213> ORGANISM: Artificial sequence
<220> FEATURE:
<223> OTHER INFORMATION: Synthetic T cell receptor

<400> SEQUENCE: 21

Ser Gly His Asp Thr
1               5

<210> SEQ ID NO 22
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 22

Tyr Tyr Glu Glu Glu Glu
1               5

<210> SEQ ID NO 23
<211> LENGTH: 14
<212> TYPE: PRT
<213> ORGANISM: Artificial sequence
<220> FEATURE:
<223> OTHER INFORMATION: Synthetic T cell receptor

<400> SEQUENCE: 23

Cys Ala Ser Ser Val Gly Thr Gly Ile Thr Glu Ala Phe Phe
```

<210> SEQ ID NO 24
<211> LENGTH: 849
<212> TYPE: DNA
<213> ORGANISM: Artificial sequence
<220> FEATURE:
<223> OTHER INFORMATION: Synthetic T cell receptor

<400> SEQUENCE: 24

```
tctagaccgc catgggtcga cgccaccatg acatccattc gagctgtatt tatattcctg      60
tggctgcagc tggacttggt gaatggagag aatgtggagc agcatccttc aaccctgagt     120
gtccaggagg gagacagcgc tgttatcaag tgtacttatt cagacagtgc ctcaaactac     180
ttcccttggt ataagcaaga acttggaaaa agacctcagc ttattataga cattcgttca     240
aatgtgggcg aaaagaaaga ccaacgaatt gctgttacat tgaacaagac agccaaacat     300
ttctccctgc acatcacaga cccaacctt gaagactcgg ctgtctactt ctgtgcagca     360
aggggactca cggaggagg aaacaaactc acctttggga caggcactca gctaaaagtg     420
gaactcaata tccagaaccc tgaccctgcc gtgtaccagc tgagagactc taaatccagt     480
gacaagtctg tctgcctatt caccgatttt gattctcaaa caaatgtgtc acaaagtaag     540
gattctgatg tgtatatcac ggacaaaact gtgctagaca tgaggtctat ggacttcaag     600
agcaacagtg ctgtggcctg gagcaacaaa tctgactttg catgtgcaaa cgccttcaac     660
aacagcatta ttccagaaga caccttcttc ccagcccag aaagttcctg tgatgtcaag     720
ctggtcgaga aaagctttga acagatacg aacctaaact ttcaaaacct gtcagtgatt     780
gggttccgaa tcctcctcct gaaagtggcc gggtttaatc tgctcatgac gctgcggctg     840
tggtccagc                                                            849
```

<210> SEQ ID NO 25
<211> LENGTH: 57
<212> TYPE: DNA
<213> ORGANISM: Artificial sequence
<220> FEATURE:
<223> OTHER INFORMATION: Synthetic T cell receptor

<400> SEQUENCE: 25

```
atgacatcca ttcgagctgt atttatattc ctgtggctgc agctggactt ggtgaat        57
```

<210> SEQ ID NO 26
<211> LENGTH: 343
<212> TYPE: DNA
<213> ORGANISM: Artificial sequence
<220> FEATURE:
<223> OTHER INFORMATION: Synthetic T cell receptor

<400> SEQUENCE: 26

```
ggagagaatg tggagcagca tccttcaacc ctgagtgtcc aggagggaga cagcgctgtt      60
atcaagtgta cttattcaga cagtgcctca aactacttcc cttggtataa gcaagaactt     120
ggaaaaagac tcagcttat tatagacatt cgttcaaatg tgggcgaaaa gaaagaccaa     180
cgaattgctg ttacattgaa caagacagcc aaacatttct ccctgcacat cacagagacc     240
caacctgaag actcggctgt ctacttctgt gcagcaaggg gactcacggg aggagaaac     300
aaactcaccet ttgggacagg cactcagcta aaagtggaac tca                     343
```

<210> SEQ ID NO 27
<211> LENGTH: 18

```
<212> TYPE: DNA
<213> ORGANISM: Artificial sequence
<220> FEATURE:
<223> OTHER INFORMATION: Synthetic T cell receptor

<400> SEQUENCE: 27
gacagtgcct caaactac                                                        18

<210> SEQ ID NO 28
<211> LENGTH: 21
<212> TYPE: DNA
<213> ORGANISM: Artificial sequence
<220> FEATURE:
<223> OTHER INFORMATION: Synthetic T cell receptor

<400> SEQUENCE: 28
attcgttcaa atgtgggcga a                                                    21

<210> SEQ ID NO 29
<211> LENGTH: 45
<212> TYPE: DNA
<213> ORGANISM: Artificial sequence
<220> FEATURE:
<223> OTHER INFORMATION: Synthetic T cell receptor

<400> SEQUENCE: 29
tgtgcagcaa ggggactcac gggaggagga aacaaactca ccttt                          45

<210> SEQ ID NO 30
<211> LENGTH: 961
<212> TYPE: DNA
<213> ORGANISM: Artificial sequence
<220> FEATURE:
<223> OTHER INFORMATION: Synthetic T cell receptor

<400> SEQUENCE: 30
atgggccccg ggctcctctg ctgggcactg ctttgtctcc tgggagcagg cttagtggac          60
gctggagtca cccaaagtcc cacacacctg atcaaaacga ggacagcag agtgactctg          120 agatgctctc ctaagtctgg gcatgacact gtgtcctggt accaacaggc cctgggtcag         180
ggcccccagt ttatctttca gtattatgag aggaagagag acagagagg caacttccct          240 gatcgattct caggtcacca gttccctaac tatagctctg agctgaatgt gaacgccttg         300
ttgctggggg actcggccct ctatctctgt gccagcagcg tcgggacagg tatcactgaa         360
gctttctttg gacaaggcac cagactcaca gttgtagagg acctgaacaa ggtgttccca         420
cccgaggtcg ctgtgtttga gccatcagaa gcagagatct cccacaccca aaaggccaca         480
ctggtgtgcc tggccacagg cttcttccct gaccacgtgg agctgagctg gtgggtgaat         540
gggaaggagt gcacagtgg ggtcagcacg gacccgcagc ccctcaagga gcagcccgcc           600
ctcaatgact ccagatactg cctgagcagc cgcctgaggg tctcggccac cttctggcag         660
aacccccgca accacttccg ctgtcaagtc cagttctacg gctctcgga gaatgacgag          720 tggacccagg atagggccaa acccgtcacc cagatcgtca gcgccgaggc ctggggtaga         780
gcagactgtg gctttacctc ggtgtcctac cagcaagggg tcctgtctgc caccatcctc         840
tatgagatcc tgctagggaa ggccaccctg tatgctgtgc tggtcagcgc ccttgtgttg         900
atggccatgg tcaagagaaa ggatttctga ctcgagaagc ttgcggccgc ggatccgata         960
a                                                                          961

<210> SEQ ID NO 31
```

```
<211> LENGTH: 63
<212> TYPE: DNA
<213> ORGANISM: Artificial sequence
<220> FEATURE:
<223> OTHER INFORMATION: Synthetic T cell receptor

<400> SEQUENCE: 31 atgggcoccg ggctcctctg ctgggcactg ctttgtctcc tgggagcagg cttagtggac      60
gct                                                                    63

<210> SEQ ID NO 32
<211> LENGTH: 334
<212> TYPE: DNA
<213> ORGANISM: Artificial sequence
<220> FEATURE:
<223> OTHER INFORMATION: Synthetic T cell receptor

<400> SEQUENCE: 32
ggagtcaccc aaagtcccac acacctgatc aaaacgagag gacagcaagt gactctgaga      60
tgctctccta agtctgggca tgacactgtg tcctggtacc aacaggccct gggtcagggg     120
ccccagttta tctttcagta ttatgaggag gaagagagac agagaggcaa cttccctgat     180
cgattctcag gtcaccagtt ccctaactat agctctgagc tgaatgtgaa cgccttgttg     240
ctgggggact cggccctcta tctctgtgcc agcagcgtcg ggacaggtat cactgaagct     300
ttctttggac aaggcaccag actcacagtt gtag                                 334

<210> SEQ ID NO 33
<211> LENGTH: 15
<212> TYPE: DNA
<213> ORGANISM: Artificial sequence
<220> FEATURE:
<223> OTHER INFORMATION: Synthetic T cell receptor

<400> SEQUENCE: 33
tctgggcatg acact                                                       15

<210> SEQ ID NO 34
<211> LENGTH: 18
<212> TYPE: DNA
<213> ORGANISM: Artificial sequence
<220> FEATURE:
<223> OTHER INFORMATION: Synthetic T cell receptor

<400> SEQUENCE: 34
tattatgagg aggaagag                                                    18

<210> SEQ ID NO 35
<211> LENGTH: 42
<212> TYPE: DNA
<213> ORGANISM: Artificial sequence
<220> FEATURE:
<223> OTHER INFORMATION: Synthetic T cell receptor

<400> SEQUENCE: 35
tgtgccagca gcgtcgggac aggtatcact gaagctttct tt                         42

<210> SEQ ID NO 36
<211> LENGTH: 610
<212> TYPE: PRT
<213> ORGANISM: Artificial sequence
<220> FEATURE:
<223> OTHER INFORMATION: Synthetic T cell receptor

<400> SEQUENCE: 36
```

-continued

```
Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
            35                  40                  45

Ser Asn Tyr Phe Pro Trp Tyr Lys Gln Glu Leu Gly Lys Arg Pro Gln
50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys Phe Ser Leu His Ile
                85                  90                  95

Thr Glu Thr Gln Pro Glu Asp Ser Ala Val Tyr Phe Cys Ala Ala Arg
                100                 105                 110

Gly Leu Thr Gly Gly Asn Lys Leu Thr Phe Gly Thr Gly Thr Gln
                115                 120                 125

Leu Lys Val Glu Leu Asn Ile Gln Asn Pro Asp Pro Ala Val Tyr Gln
130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
                180                 185                 190

Asn Ser Ala Val Ala Trp Ser Asn Lys Ser Asp Phe Ala Cys Ala Asn
                195                 200                 205

Ala Phe Asn Asn Ser Ile Ile Pro Glu Asp Thr Phe Phe Pro Ser Pro
                210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
                260                 265                 270

Ser Ser Arg Ala Lys Arg Ser Gly Ser Gly Ala Thr Asn Phe Ser Leu
                275                 280                 285

Leu Lys Gln Ala Gly Asp Val Glu Glu Asn Pro Gly Pro Met Gly Pro
                290                 295                 300

Gly Leu Leu Cys Trp Ala Leu Leu Cys Leu Leu Gly Ala Gly Leu Val
305                 310                 315                 320

Asp Ala Gly Val Thr Gln Ser Pro Thr His Leu Ile Lys Thr Arg Gly
                325                 330                 335

Gln Gln Val Thr Leu Arg Cys Ser Pro Lys Ser Gly His Asp Thr Val
                340                 345                 350

Ser Trp Tyr Gln Gln Ala Leu Gly Gln Gly Pro Gln Phe Ile Phe Gln
                355                 360                 365

Tyr Tyr Glu Glu Glu Glu Arg Gln Arg Gly Asn Phe Pro Asp Arg Phe
                370                 375                 380

Ser Gly His Gln Phe Pro Asn Tyr Ser Ser Glu Leu Asn Val Asn Ala
385                 390                 395                 400

Leu Leu Leu Gly Asp Ser Ala Tyr Leu Cys Ala Ser Ser Val Gly
                405                 410                 415
```

```
Thr Gly Ile Thr Glu Ala Phe Phe Gly Gln Gly Thr Arg Leu Thr Val
                420                 425                 430

Val Glu Asp Leu Asn Lys Val Phe Pro Pro Glu Val Ala Val Phe Glu
            435                 440                 445

Pro Ser Glu Ala Glu Ile Ser His Thr Gln Lys Ala Thr Leu Val Cys
        450                 455                 460

Leu Ala Thr Gly Phe Phe Pro Asp His Val Glu Leu Ser Trp Trp Val
465                 470                 475                 480

Asn Gly Lys Glu Val His Ser Gly Val Ser Thr Asp Pro Gln Pro Leu
                485                 490                 495

Lys Glu Gln Pro Ala Leu Asn Asp Ser Arg Tyr Cys Leu Ser Ser Arg
            500                 505                 510

Leu Arg Val Ser Ala Thr Phe Trp Gln Asn Pro Arg Asn His Phe Arg
        515                 520                 525

Cys Gln Val Gln Phe Tyr Gly Leu Ser Glu Asn Asp Glu Trp Thr Gln
530                 535                 540

Asp Arg Ala Lys Pro Val Thr Gln Ile Val Ser Ala Glu Ala Trp Gly
545                 550                 555                 560

Arg Ala Asp Cys Gly Phe Thr Ser Val Ser Tyr Gln Gln Gly Val Leu
                565                 570                 575

Ser Ala Thr Ile Leu Tyr Glu Ile Leu Leu Gly Lys Ala Thr Leu Tyr
            580                 585                 590

Ala Val Leu Val Ser Ala Leu Val Leu Met Ala Met Val Lys Arg Lys
        595                 600                 605

Asp Phe
    610

<210> SEQ ID NO 37
<211> LENGTH: 20
<212> TYPE: PRT
<213> ORGANISM: Artificial sequence
<220> FEATURE:
<223> OTHER INFORMATION: Synthetic T cell receptor

<400> SEQUENCE: 37

Met Thr Ser Ile Arg Ala Val Phe Ile Phe Leu Trp Leu Gln Leu Asp
1               5                   10                  15

Leu Val Asn Gly
            20

<210> SEQ ID NO 38
<211> LENGTH: 116
<212> TYPE: PRT
<213> ORGANISM: Artificial sequence
<220> FEATURE:
<223> OTHER INFORMATION: Synthetic T cell receptor

<400> SEQUENCE: 38

Glu Asn Val Glu Gln His Pro Ser Thr Leu Ser Val Gln Glu Gly Asp
1               5                   10                  15

Ser Ala Val Ile Lys Cys Thr Tyr Ser Asp Ser Ala Ser Asn Tyr Phe
                20                  25                  30

Pro Trp Tyr Lys Gln Glu Leu Gly Lys Arg Pro Gln Leu Ile Ile Asp
            35                  40                  45

Ile Arg Ser Asn Val Gly Glu Lys Lys Asp Gln Arg Ile Ala Val Thr
        50                  55                  60

Leu Asn Lys Thr Ala Lys His Phe Ser Leu His Ile Thr Glu Thr Gln
65                  70                  75                  80
```

Pro Glu Asp Ser Ala Val Tyr Phe Cys Ala Ala Arg Gly Leu Thr Gly
                85                  90                  95

Gly Gly Asn Lys Leu Thr Phe Gly Thr Gly Thr Gln Leu Lys Val Glu
            100                 105                 110

Leu Asn Ile Gln
        115

<210> SEQ ID NO 39
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 39

Asp Ser Ala Ser Asn Tyr
1               5

<210> SEQ ID NO 40
<211> LENGTH: 7
<212> TYPE: PRT
<213> ORGANISM: Artificial sequence
<220> FEATURE:
<223> OTHER INFORMATION: Synthetic T cell receptor

<400> SEQUENCE: 40

Ile Arg Ser Asn Val Gly Glu
1               5

<210> SEQ ID NO 41
<211> LENGTH: 15
<212> TYPE: PRT
<213> ORGANISM: Artificial sequence
<220> FEATURE:
<223> OTHER INFORMATION: Synthetic T cell receptor

<400> SEQUENCE: 41

Cys Ala Ala Arg Gly Leu Thr Gly Gly Gly Asn Lys Leu Thr Phe
1               5                   10                  15

<210> SEQ ID NO 42
<211> LENGTH: 21
<212> TYPE: PRT
<213> ORGANISM: Artificial sequence
<220> FEATURE:
<223> OTHER INFORMATION: Synthetic T cell receptor

<400> SEQUENCE: 42

Met Gly Pro Gly Leu Leu Cys Trp Ala Leu Leu Cys Leu Leu Gly Ala
1               5                   10                  15

Gly Leu Val Asp Ala
            20

<210> SEQ ID NO 43
<211> LENGTH: 112
<212> TYPE: PRT
<213> ORGANISM: Artificial sequence
<220> FEATURE:
<223> OTHER INFORMATION: Synthetic T cell receptor

<400> SEQUENCE: 43

Gly Val Thr Gln Ser Pro Thr His Leu Ile Lys Thr Arg Gly Gln Gln
1               5                   10                  15

Val Thr Leu Arg Cys Ser Pro Lys Ser Gly His Asp Thr Val Ser Trp

```
                   20                  25                  30
Tyr Gln Gln Ala Leu Gly Gln Gly Pro Gln Phe Ile Phe Gln Tyr Tyr
            35                  40                  45

Glu Glu Glu Glu Arg Gln Arg Gly Asn Phe Pro Asp Arg Phe Ser Gly
    50                  55                  60

His Gln Phe Pro Asn Tyr Ser Ser Glu Leu Asn Val Asn Ala Leu Leu
65                  70                  75                  80

Leu Gly Asp Ser Ala Leu Tyr Leu Cys Ala Ser Ser Val Gly Thr Gly
                85                  90                  95

Ile Thr Glu Ala Phe Phe Gly Gln Gly Thr Arg Leu Thr Val Val Glu
            100                 105                 110

<210> SEQ ID NO 44
<211> LENGTH: 5
<212> TYPE: PRT
<213> ORGANISM: Artificial sequence
<220> FEATURE:
<223> OTHER INFORMATION: Synthetic T cell receptor

<400> SEQUENCE: 44

Ser Gly His Asp Thr
1               5

<210> SEQ ID NO 45
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 45

Tyr Tyr Glu Glu Glu Glu
1               5

<210> SEQ ID NO 46
<211> LENGTH: 14
<212> TYPE: PRT
<213> ORGANISM: Artificial sequence
<220> FEATURE:
<223> OTHER INFORMATION: Synthetic T cell receptor

<400> SEQUENCE: 46

Cys Ala Ser Ser Val Gly Thr Gly Ile Thr Glu Ala Phe Phe
1               5                   10

<210> SEQ ID NO 47
<211> LENGTH: 849
<212> TYPE: DNA
<213> ORGANISM: Artificial sequence
<220> FEATURE:
<223> OTHER INFORMATION: Synthetic T cell receptor

<400> SEQUENCE: 47
tctagaccgc catgggtcga cgccaccatg acatccattc agctgtatt  tatattcctg      60 tggctgcagc tggacttggt gaatggagag aatgtggagc agcatccttc aaccctgagt     120
gtccaggagg agacagcgc  tgttatcaag tgtacttatt cagacagtgc ctcaaactac     180
ttcccttggt ataagcaaga acttggaaaa agacctcagc ttattataga cattcgttca    240
aatgtgggcg aaaagaaaga ccaacgaatt gctgttacat gaacaagac  agccaaacat    300 ttctccctgc acatcacaga gacccaacct gaagactcgg ctgtctactt ctgtgcagca    360
attcctaatt ctgggggtta ccagaaagtt acctttggaa ttggaacaaa gctccaagtc    420
```

| | |
|---|---|
| atcccaaata tccagaaccc tgaccctgcc gtgtaccagc tgagagactc taaatccagt | 480 |
| gacaagtctg tctgcctatt caccgatttt gattctcaaa caaatgtgtc acaaagtaag | 540 |
| gattctgatg tgtatatcac agacaaaact gtgctagaca tgaggtctat ggacttcaag | 600 |
| agcaacagtg ctgtggcctg agcaacaaa tctgactttg catgtgcaaa cgccttcaac | 660 |
| aacagcatta ttccagaaga caccttcttc cccagcccag aaagttcctg tgatgtcaag | 720 |
| ctggtcgaga aaagctttga aacagatacg aacctaaact ttcaaaacct gtcagtgatt | 780 |
| gggttccgaa tcctcctcct gaaagtggcc gggtttaatc tgctcatgac gctgcggctg | 840 |
| tggtccagc | 849 |

<210> SEQ ID NO 48
<211> LENGTH: 57
<212> TYPE: DNA
<213> ORGANISM: Artificial sequence
<220> FEATURE:
<223> OTHER INFORMATION: Synthetic T cell receptor

<400> SEQUENCE: 48

| | |
|---|---|
| atgacatcca ttcgagctgt atttatattc ctgtggctgc agctggactt ggtgaat | 57 |

<210> SEQ ID NO 49
<211> LENGTH: 344
<212> TYPE: DNA
<213> ORGANISM: Artificial sequence
<220> FEATURE:
<223> OTHER INFORMATION: Synthetic T cell receptor

<400> SEQUENCE: 49

| | |
|---|---|
| ggagagaatg tggagcagca tccttcaacc ctgagtgtcc aggagggaga cagcgctgtt | 60 |
| atcaagtgta cttattcaga cagtgcctca aactacttcc cttggtataa gcaagaactt | 120 |
| ggaaaaagac ctcagcttat tatagacatt cgttcaaatg tgggcgaaaa gaaagaccaa | 180 |
| cgaattgctg ttacattgaa caagacagcc aaacatttct ccctgcacat cacagagacc | 240 |
| caacctgaag actcggctgt ctacttctgt gcagcaattc ctaattctgg gggttaccag | 300 |
| aaagttacct ttggaattgg aacaaagctc caagtcatcc caaa | 344 |

<210> SEQ ID NO 50
<211> LENGTH: 18
<212> TYPE: DNA
<213> ORGANISM: Artificial sequence
<220> FEATURE:
<223> OTHER INFORMATION: Synthetic T cell receptor

<400> SEQUENCE: 50

| | |
|---|---|
| gacagtgcct caaactac | 18 |

<210> SEQ ID NO 51
<211> LENGTH: 21
<212> TYPE: DNA
<213> ORGANISM: Artificial sequence
<220> FEATURE:
<223> OTHER INFORMATION: Synthetic T cell receptor

<400> SEQUENCE: 51

| | |
|---|---|
| attcgttcaa atgtgggcga a | 21 |

<210> SEQ ID NO 52
<211> LENGTH: 45
<212> TYPE: DNA

<213> ORGANISM: Artificial sequence
<220> FEATURE:
<223> OTHER INFORMATION: Synthetic T cell receptor

<400> SEQUENCE: 52

```
tgtgcagcaa ttcctaattc tgggggttac cagaaagtta ccttt            45
```

<210> SEQ ID NO 53
<211> LENGTH: 962
<212> TYPE: DNA
<213> ORGANISM: Artificial sequence
<220> FEATURE:
<223> OTHER INFORMATION: Synthetic T cell receptor

<400> SEQUENCE: 53

```
atgggccccg ggctcctctg ctgggcactg ctttgtctcc tgggagcagg cttagtggac    60
gctggagtca cccaaagtcc cacacacctg atcaaaacga gaggacagca agtgactctg   120
agatgctctc ctaagtctgg gcatgacact gtgtcctggt accaacaggc cctgggtcag   180
gggccccagt ttatctttca gtattatgag aggaagagag acagagagg caacttccct   240
gatcgattct caggtcacca gttccctaac tatagctctg agctgaatgt gaacgccttg   300
ttgctggggg actcggccct ctatctctgt gccagcagcg tcgggacagg tatcactgaa   360
gctttctttg gacaaggcac cagactcaca gttgtagagg acctgaacaa ggtgttccca   420
cccgaggtcg ctgtgtttga gccatcagaa gcagagatct cccacaccca aaaggccaca   480
ctggtgtgcc tggccacagg cttcttccct gaccacgtgg agctgagctg gtgggtgaat   540
gggaaggagg tgcacagtgg ggtcagcacg gacccgcagc ccctcaagga gcagcccgcc   600
ctcaatgact ccagatactg cctgagcagc cgcctgaggg tctcggccac cttctggcag   660
aacccccgca accacttccg ctgtcaagtc cagttctacg gctctcgga gaatgacgag   720
tggacccagg atagggccaa accgtcacc cagatcgtca gcgccgaggc ctggggtaga   780
gcagactgtg ctttacctc ggtgtcctac cagcaagggg tcctgtctgc caccatcctc   840
tatgagatcc tgctagggaa ggccaccctg tatgctgtgc tggtcagcgc ccttgtgttg   900
atggccatgg tcaagagaaa ggatttctga ctcgagaagc ttgcggccgc ggatccgata   960
aa                                                                  962
```

<210> SEQ ID NO 54
<211> LENGTH: 63
<212> TYPE: DNA
<213> ORGANISM: Artificial sequence
<220> FEATURE:
<223> OTHER INFORMATION: Synthetic T cell receptor

<400> SEQUENCE: 54

```
atgggccccg ggctcctctg ctgggcactg ctttgtctcc tgggagcagg cttagtggac    60
gct                                                                  63
```

<210> SEQ ID NO 55
<211> LENGTH: 334
<212> TYPE: DNA
<213> ORGANISM: Artificial sequence
<220> FEATURE:
<223> OTHER INFORMATION: Synthetic T cell receptor

<400> SEQUENCE: 55

```
ggagtcaccc aaagtcccac acacctgatc aaaacgagag acagcaagt gactctgaga    60
tgctctccta agtctgggca tgacactgtg tcctggtacc aacaggccct gggtcagggg   120
```

```
ccccagttta tctttcagta ttatgaggag gaagagagac agagaggcaa cttccctgat    180
cgattctcag gtcaccagtt ccctaactat agctctgagc tgaatgtgaa cgccttgttg    240
ctgggggact cggccctcta tctctgtgcc agcagcgtcg ggacaggtat cactgaagct    300
ttctttggac aaggcaccag actcacagtt gtag                                334
```

```
<210> SEQ ID NO 56
<211> LENGTH: 15
<212> TYPE: DNA
<213> ORGANISM: Artificial sequence
<220> FEATURE:
<223> OTHER INFORMATION: Synthetic T cell receptor

<400> SEQUENCE: 56
tctgggcatg acact                                                     15

<210> SEQ ID NO 57
<211> LENGTH: 18
<212> TYPE: DNA
<213> ORGANISM: Artificial sequence
<220> FEATURE:
<223> OTHER INFORMATION: Synthetic T cell receptor

<400> SEQUENCE: 57
tattatgagg aggaagag                                                  18

<210> SEQ ID NO 58
<211> LENGTH: 42
<212> TYPE: DNA
<213> ORGANISM: Artificial sequence
<220> FEATURE:
<223> OTHER INFORMATION: Synthetic T cell receptor

<400> SEQUENCE: 58
tgtgccagca gcgtcgggac aggtatcact gaagctttct tt                       42

<210> SEQ ID NO 59
<211> LENGTH: 610
<212> TYPE: PRT
<213> ORGANISM: Artificial sequence
<220> FEATURE:
<223> OTHER INFORMATION: Synthetic T cell receptor

<400> SEQUENCE: 59
```

| Met | Thr | Ser | Ile | Arg | Ala | Val | Phe | Ile | Phe | Leu | Trp | Leu | Gln | Leu | Asp |
|---|---|---|---|---|---|---|---|---|---|---|---|---|---|---|---|
| 1 | | | | 5 | | | | | 10 | | | | | 15 | |

| Leu | Val | Asn | Gly | Glu | Asn | Val | Glu | Gln | His | Pro | Ser | Thr | Leu | Ser | Val |
|---|---|---|---|---|---|---|---|---|---|---|---|---|---|---|---|
| | | | 20 | | | | | 25 | | | | | 30 | | |

| Gln | Glu | Gly | Asp | Ser | Ala | Val | Ile | Lys | Cys | Thr | Tyr | Ser | Asp | Ser | Ala |
|---|---|---|---|---|---|---|---|---|---|---|---|---|---|---|---|
| | | 35 | | | | | 40 | | | | | 45 | | | |

| Ser | Asn | Tyr | Phe | Pro | Trp | Tyr | Lys | Gln | Glu | Leu | Gly | Lys | Arg | Pro | Gln |
|---|---|---|---|---|---|---|---|---|---|---|---|---|---|---|---|
| | 50 | | | | | 55 | | | | | 60 | | | | |

| Leu | Ile | Ile | Asp | Ile | Arg | Ser | Asn | Val | Gly | Glu | Lys | Lys | Asp | Gln | Arg |
|---|---|---|---|---|---|---|---|---|---|---|---|---|---|---|---|
| 65 | | | | | 70 | | | | | 75 | | | | | 80 |

| Ile | Ala | Val | Thr | Leu | Asn | Lys | Thr | Ala | Lys | His | Phe | Ser | Leu | His | Ile |
|---|---|---|---|---|---|---|---|---|---|---|---|---|---|---|---|
| | | | 85 | | | | | 90 | | | | | 95 | | |

| Thr | Glu | Thr | Gln | Pro | Glu | Asp | Ser | Ala | Val | Tyr | Phe | Cys | Ala | Ala | Ile |
|---|---|---|---|---|---|---|---|---|---|---|---|---|---|---|---|
| | | | 100 | | | | | 105 | | | | | 110 | | |

| Pro | Asn | Ser | Gly | Gly | Tyr | Gln | Lys | Val | Thr | Phe | Gly | Ile | Gly | Thr | Lys |
|---|---|---|---|---|---|---|---|---|---|---|---|---|---|---|---|
| | | 115 | | | | | 120 | | | | | 125 | | | |

```
Leu Gln Val Ile Pro Asn Ile Gln Asn Pro Asp Pro Ala Val Tyr Gln
    130                 135                 140

Leu Arg Asp Ser Lys Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                    165                 170                 175

Ile Thr Asp Lys Thr Val Leu Asp Met Arg Ser Met Asp Phe Lys Ser
                180                 185                 190

Asn Ser Ala Val Ala Trp Ser Asn Lys Ser Asp Phe Ala Cys Ala Asn
                195                 200                 205

Ala Phe Asn Asn Ser Ile Ile Pro Glu Asp Thr Phe Phe Pro Ser Pro
210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
                260                 265                 270

Ser Ser Arg Ala Lys Arg Ser Gly Ser Gly Ala Thr Asn Phe Ser Leu
            275                 280                 285

Leu Lys Gln Ala Gly Asp Val Glu Glu Asn Pro Gly Pro Met Gly Pro
    290                 295                 300

Gly Leu Leu Cys Trp Ala Leu Leu Cys Leu Leu Gly Ala Gly Leu Val
305                 310                 315                 320

Asp Ala Gly Val Thr Gln Ser Pro Thr His Leu Ile Lys Thr Arg Gly
                325                 330                 335

Gln Gln Val Thr Leu Arg Cys Ser Pro Lys Ser Gly His Asp Thr Val
                340                 345                 350

Ser Trp Tyr Gln Gln Ala Leu Gly Gln Gly Pro Gln Phe Ile Phe Gln
        355                 360                 365

Tyr Tyr Glu Glu Glu Arg Gln Arg Gly Asn Phe Pro Asp Arg Phe
    370                 375                 380

Ser Gly His Gln Phe Pro Asn Tyr Ser Ser Glu Leu Asn Val Asn Ala
385                 390                 395                 400

Leu Leu Leu Gly Asp Ser Ala Leu Tyr Leu Cys Ala Ser Ser Val Gly
                405                 410                 415

Thr Gly Ile Thr Glu Ala Phe Phe Gly Gln Gly Thr Arg Leu Thr Val
                420                 425                 430

Val Glu Asp Leu Asn Lys Val Phe Pro Pro Glu Val Ala Val Phe Glu
        435                 440                 445

Pro Ser Glu Ala Glu Ile Ser His Thr Gln Lys Ala Thr Leu Val Cys
    450                 455                 460

Leu Ala Thr Gly Phe Phe Pro Asp His Val Glu Leu Ser Trp Trp Val
465                 470                 475                 480

Asn Gly Lys Glu Val His Ser Gly Val Ser Thr Asp Pro Gln Pro Leu
                485                 490                 495

Lys Glu Gln Pro Ala Leu Asn Asp Ser Arg Tyr Cys Leu Ser Ser Arg
                500                 505                 510

Leu Arg Val Ser Ala Thr Phe Trp Gln Asn Pro Arg Asn His Phe Arg
            515                 520                 525

Cys Gln Val Gln Phe Tyr Gly Leu Ser Glu Asn Asp Glu Trp Thr Gln
    530                 535                 540

Asp Arg Ala Lys Pro Val Thr Gln Ile Val Ser Ala Glu Ala Trp Gly
```

```
            545                 550                 555                 560
Arg Ala Asp Cys Gly Phe Thr Ser Val Ser Tyr Gln Gln Gly Val Leu
                565                 570                 575

Ser Ala Thr Ile Leu Tyr Glu Ile Leu Leu Gly Lys Ala Thr Leu Tyr
                580                 585                 590

Ala Val Leu Val Ser Ala Leu Val Leu Met Ala Met Val Lys Arg Lys
                595                 600                 605

Asp Phe
    610

<210> SEQ ID NO 60
<211> LENGTH: 20
<212> TYPE: PRT
<213> ORGANISM: Artificial sequence
<220> FEATURE:
<223> OTHER INFORMATION: Synthetic T cell receptor

<400> SEQUENCE: 60

Met Thr Ser Ile Arg Ala Val Phe Ile Phe Leu Trp Leu Gln Leu Asp
1               5                   10                  15

Leu Val Asn Gly
            20

<210> SEQ ID NO 61
<211> LENGTH: 115
<212> TYPE: PRT
<213> ORGANISM: Artificial sequence
<220> FEATURE:
<223> OTHER INFORMATION: Synthetic T cell receptor

<400> SEQUENCE: 61

Glu Asn Val Glu Gln His Pro Ser Thr Leu Ser Val Gln Glu Gly Asp
1               5                   10                  15

Ser Ala Val Ile Lys Cys Thr Tyr Ser Asp Ser Ala Ser Asn Tyr Phe
                20                  25                  30

Pro Trp Tyr Lys Gln Glu Leu Gly Lys Arg Pro Gln Leu Ile Ile Asp
                35                  40                  45

Ile Arg Ser Asn Val Gly Glu Lys Lys Asp Gln Arg Ile Ala Val Thr
        50                  55                  60

Leu Asn Lys Thr Ala Lys His Phe Ser Leu His Ile Thr Glu Thr Gln
65                  70                  75                  80

Pro Glu Asp Ser Ala Val Tyr Phe Cys Ala Ala Ile Pro Asn Ser Gly
                85                  90                  95

Gly Tyr Gln Lys Val Thr Phe Gly Ile Gly Thr Lys Leu Gln Val Ile
                100                 105                 110

Pro Asn Ile
        115

<210> SEQ ID NO 62
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 62

Asp Ser Ala Ser Asn Tyr
1               5

<210> SEQ ID NO 63
```

```
<211> LENGTH: 7
<212> TYPE: PRT
<213> ORGANISM: Artificial sequence
<220> FEATURE:
<223> OTHER INFORMATION: Synthetic T cell receptor

<400> SEQUENCE: 63

Ile Arg Ser Asn Val Gly Glu
1               5

<210> SEQ ID NO 64
<211> LENGTH: 15
<212> TYPE: PRT
<213> ORGANISM: Artificial sequence
<220> FEATURE:
<223> OTHER INFORMATION: Synthetic T cell receptor

<400> SEQUENCE: 64

Cys Ala Ala Ile Pro Asn Ser Gly Gly Tyr Gln Lys Val Thr Phe
1               5                   10                  15

<210> SEQ ID NO 65
<211> LENGTH: 21
<212> TYPE: PRT
<213> ORGANISM: Artificial sequence
<220> FEATURE:
<223> OTHER INFORMATION: Synthetic T cell receptor

<400> SEQUENCE: 65

Met Gly Pro Gly Leu Leu Cys Trp Ala Leu Leu Cys Leu Leu Gly Ala
1               5                   10                  15

Gly Leu Val Asp Ala
            20

<210> SEQ ID NO 66
<211> LENGTH: 111
<212> TYPE: PRT
<213> ORGANISM: Artificial sequence
<220> FEATURE:
<223> OTHER INFORMATION: Synthetic T cell receptor

<400> SEQUENCE: 66

Gly Val Thr Gln Ser Pro Thr His Leu Ile Lys Thr Arg Gly Gln Gln
1               5                   10                  15

Val Thr Leu Arg Cys Ser Pro Lys Ser Gly His Asp Thr Val Ser Trp
                20                  25                  30

Tyr Gln Gln Ala Leu Gly Gln Gly Pro Gln Phe Ile Phe Gln Tyr Tyr
            35                  40                  45

Glu Glu Glu Glu Arg Gln Arg Gly Asn Phe Pro Asp Arg Phe Ser Gly
        50                  55                  60

His Gln Phe Pro Asn Tyr Ser Ser Glu Leu Asn Val Asn Ala Leu Leu
65                  70                  75                  80

Leu Gly Asp Ser Ala Leu Tyr Leu Cys Ala Ser Ser Val Gly Thr Gly
                85                  90                  95

Ile Thr Glu Ala Phe Phe Gly Gln Gly Thr Arg Leu Thr Val Val
            100                 105                 110

<210> SEQ ID NO 67
<211> LENGTH: 5
<212> TYPE: PRT
<213> ORGANISM: Artificial sequence
<220> FEATURE:
<223> OTHER INFORMATION: Synthetic T cell receptor
```

<400> SEQUENCE: 67

Ser Gly His Asp Thr
1               5

<210> SEQ ID NO 68
<211> LENGTH: 5
<212> TYPE: PRT
<213> ORGANISM: Artificial sequence
<220> FEATURE:
<223> OTHER INFORMATION: Synthetic T cell receptor

<400> SEQUENCE: 68

Tyr Tyr Glu Glu Glu
1               5

<210> SEQ ID NO 69
<211> LENGTH: 14
<212> TYPE: PRT
<213> ORGANISM: Artificial sequence
<220> FEATURE:
<223> OTHER INFORMATION: Synthetic T cell receptor

<400> SEQUENCE: 69

Cys Ala Ser Ser Val Gly Thr Gly Ile Thr Glu Ala Phe Phe
1               5                   10

<210> SEQ ID NO 70
<211> LENGTH: 870
<212> TYPE: DNA
<213> ORGANISM: Artificial sequence
<220> FEATURE:
<223> OTHER INFORMATION: Synthetic T cell receptor

<400> SEQUENCE: 70

| | | | | | |
|---|---|---|---|---|---|
| tctagaccgc | catgggtcga | cgccaccatg | gacaagatct | taggagcatc | attttttagtt | 60 |
| ctgtggcttc | aactatgctg | ggtgagtggc | aacagaagg | agaaaagtga | ccagcagcag | 120 |
| gtgaaacaaa | gtcctcaatc | tttgatagtc | cagaaaggag | ggatttcaat | tataaactgt | 180 |
| gcttatgaga | cactgcgtt | tgactacttt | ccatggtacc | aacaattccc | tgggaaaggc | 240 |
| cctgcattat | tgatagccat | acgtccagat | gtgagtgaaa | agaaagaagg | aagattcaca | 300 |
| atctccttca | ataaaagtgc | caagcagttc | tcattgcata | tcatggattc | ccagcctgga | 360 |
| gactcagcca | cctacttctg | tgcagccgta | agatacaact | tcaacaaatt | ttactttgga | 420 |
| tctgggacca | aactcaatgt | aaaaccaaat | atccagaacc | ctgaccctgc | cgtgtaccag | 480 |
| ctgagagact | ctaaatccag | tgacaagtct | gtctgcctat | tcaccgattt | tgattctcaa | 540 |
| acaaatgtgt | cacaaagtaa | ggattctgat | gtgtatatca | cagacaaaac | tgtgctagac | 600 |
| atgaggtcta | tggacttcaa | gagcaacagt | gctgtggcct | ggagcaacaa | atctgacttt | 660 |
| gcatgtgcaa | acgccttcaa | caacagcatt | attccagaag | acaccttctt | ccccagccca | 720 |
| gaaagttcct | gtgatgtcaa | gctggtcgag | aaaagctttg | aaacagatac | gaacctaaac | 780 |
| tttcaaaacc | tgtcagtgat | tgggttccga | atcctcctcc | tgaaagtggc | cgggtttaat | 840 |
| ctgctcatga | cgctgcggct | gtggtccagc | | | | 870 |

<210> SEQ ID NO 71
<211> LENGTH: 63
<212> TYPE: DNA
<213> ORGANISM: Artificial sequence
<220> FEATURE:
<223> OTHER INFORMATION: Synthetic T cell receptor

<400> SEQUENCE: 71
atggacaaga tcttaggagc atcatttta gttctgtggc ttcaactatg ctgggtgagt    60
ggc    63

<210> SEQ ID NO 72
<211> LENGTH: 358
<212> TYPE: DNA
<213> ORGANISM: Artificial sequence
<220> FEATURE:
<223> OTHER INFORMATION: Synthetic T cell receptor

<400> SEQUENCE: 72
caacagaagg agaaaagtga ccagcagcag gtgaaacaaa gtcctcaatc tttgatagtc    60
cagaaaggag ggatttcaat tataaactgt gcttatgaga acactgcgtt tgactacttt   120
ccatggtacc aacaattccc tgggaaaggc cctgcattat tgatagccat acgtccagat   180
gtgagtgaaa agaagaagg aagattcaca atctccttca ataaaagtgc aagcagttc    240 tcattgcata tcatggattc ccagcctgga gactcagcca cctacttctg tgcagccgta   300
agatacaact tcaacaaatt ttactttgga tctgggacca aactcaatgt aaaaccaa    358

<210> SEQ ID NO 73
<211> LENGTH: 18
<212> TYPE: DNA
<213> ORGANISM: Artificial sequence
<220> FEATURE:
<223> OTHER INFORMATION: Synthetic T cell receptor

<400> SEQUENCE: 73
aacactgcgt ttgactac    18

<210> SEQ ID NO 74
<211> LENGTH: 21
<212> TYPE: DNA
<213> ORGANISM: Artificial sequence
<220> FEATURE:
<223> OTHER INFORMATION: Synthetic T cell receptor

<400> SEQUENCE: 74
atacgtccag atgtgagtga a    21

<210> SEQ ID NO 75
<211> LENGTH: 39
<212> TYPE: DNA
<213> ORGANISM: Artificial sequence
<220> FEATURE:
<223> OTHER INFORMATION: Synthetic T cell receptor

<400> SEQUENCE: 75
tgtgcagccg taagatacaa cttcaacaaa ttttacttt    39

<210> SEQ ID NO 76
<211> LENGTH: 962
<212> TYPE: DNA
<213> ORGANISM: Artificial sequence
<220> FEATURE:
<223> OTHER INFORMATION: Synthetic T cell receptor

<400> SEQUENCE: 76 atgggcccg ggctcctctg ctgggcactg ctttgtctcc tgggagcagg cttagtggac    60
gctggagtca cccaaagtcc cacacacctg atcaaaacga gaggacagca agtgactctg   120
agatgctctc ctaagtctgg gcatgacact gtgtcctggt accaacaggc cctgggtcag   180

```
gggccccagt ttatctttca gtattatgag gaggaagaga gacagagagg caacttccct        240
gatcgattct caggtcacca gttccctaac tatagctctg agctgaatgt gaacgccttg        300
ttgctggggg actcggccct ctatctctgt gccagcagcg tcgggacagg tatcactgaa        360
gctttctttg dacaaggcac cagactcaca gttgtagagg acctgaacaa ggtgttccca        420
cccgaggtcg ctgtgtttga gccatcagaa gcagagatct cccacaccca aaaggccaca        480
ctggtgtgcc tggccacagg cttcttccct gaccacgtgg agctgagctg gtgggtgaat        540
gggaaggagg tgcacagtgg ggtcagcacg gacccgcagc ccctcaagga gcagcccgcc        600
ctcaatgact ccagatactg cctgagcagc cgcctgaggg tctcggccac cttctggcag        660 aaccccgca accacttccg ctgtcaagtc cagttctacg gctctcgga gaatgacgag          720 tggacccagg atagggccaa acccgtcacc cagatcgtca gcgccgaggc ctggggtaga        780
gcagactgtg ctttacctc ggtgtcctac cagcaagggg tcctgtctgc caccatcctc         840
tatgagatcc tgctagggaa ggccaccctg tatgctgtgc tggtcagcgc ccttgtgttg        900
atggccatgg tcaagagaaa ggatttctga ctcgagaagc ttgcggccgc ggatccgata        960
aa                                                                       962

<210> SEQ ID NO 77
<211> LENGTH: 63
<212> TYPE: DNA
<213> ORGANISM: Artificial sequence
<220> FEATURE:
<223> OTHER INFORMATION: Synthetic T cell receptor

<400> SEQUENCE: 77 atgggcccg ggctcctctg ctgggcactg ctttgtctcc tgggagcagg cttagtggac          60
gct                                                                      63

<210> SEQ ID NO 78
<211> LENGTH: 334
<212> TYPE: DNA
<213> ORGANISM: Artificial sequence
<220> FEATURE:
<223> OTHER INFORMATION: Synthetic T cell receptor

<400> SEQUENCE: 78
ggagtcaccc aaagtcccac acacctgatc aaaacgagag dacagcaagt gactctgaga         60
tgctctccta agtctgggca tgacactgtg tcctggtacc aacaggccct gggtcagggg        120
ccccagttta tctttcagta ttatgaggag aagagagac agagaggcaa cttccctgat         180
cgattctcag gtcaccagtt ccctaactat agctctgagc tgaatgtgaa cgccttgttg        240 ctggggact cggccctcta tctctgtgcc agcagcgtcg ggacaggtat cactgaagct         300
ttctttggac aaggcaccag actcacagtt gtag                                    334

<210> SEQ ID NO 79
<211> LENGTH: 15
<212> TYPE: DNA
<213> ORGANISM: Artificial sequence
<220> FEATURE:
<223> OTHER INFORMATION: Synthetic T cell receptor

<400> SEQUENCE: 79
tctgggcatg acact                                                          15

<210> SEQ ID NO 80
```

```
<211> LENGTH: 18
<212> TYPE: DNA
<213> ORGANISM: Artificial sequence
<220> FEATURE:
<223> OTHER INFORMATION: Synthetic T cell receptor

<400> SEQUENCE: 80
tattatgagg aggaagag                                                    18

<210> SEQ ID NO 81
<211> LENGTH: 42
<212> TYPE: DNA
<213> ORGANISM: Artificial sequence
<220> FEATURE:
<223> OTHER INFORMATION: Synthetic T cell receptor

<400> SEQUENCE: 81
tgtgccagca gcgtcgggac aggtatcact gaagctttct tt                         42

<210> SEQ ID NO 82
<211> LENGTH: 617
<212> TYPE: PRT
<213> ORGANISM: Artificial sequence
<220> FEATURE:
<223> OTHER INFORMATION: Synthetic T cell receptor

<400> SEQUENCE: 82
```

Met Asp Lys Ile Leu Gly Ala Ser Phe Leu Val Leu Trp Leu Gln Leu
1               5                   10                  15

Cys Trp Val Ser Gly Gln Gln Lys Glu Lys Ser Asp Gln Gln Gln Val
            20                  25                  30

Lys Gln Ser Pro Gln Ser Leu Ile Val Gln Lys Gly Gly Ile Ser Ile
        35                  40                  45

Ile Asn Cys Ala Tyr Glu Asn Thr Ala Phe Asp Tyr Phe Pro Trp Tyr
    50                  55                  60

Gln Gln Phe Pro Gly Lys Gly Pro Ala Leu Leu Ile Ala Ile Arg Pro
65                  70                  75                  80

Asp Val Ser Glu Lys Lys Glu Gly Arg Phe Thr Ile Ser Phe Asn Lys
                85                  90                  95

Ser Ala Lys Gln Phe Ser Leu His Ile Met Asp Ser Gln Pro Gly Asp
            100                 105                 110

Ser Ala Thr Tyr Phe Cys Ala Ala Val Arg Tyr Asn Phe Asn Lys Phe
        115                 120                 125

Tyr Phe Gly Ser Gly Thr Lys Leu Asn Val Lys Pro Asn Ile Gln Asn
    130                 135                 140

Pro Asp Pro Ala Val Tyr Gln Leu Arg Asp Ser Lys Ser Ser Asp Lys
145                 150                 155                 160

Ser Val Cys Leu Phe Thr Asp Phe Asp Ser Gln Thr Asn Val Ser Gln
                165                 170                 175

Ser Lys Asp Ser Asp Val Tyr Ile Thr Asp Lys Thr Val Leu Asp Met
            180                 185                 190

Arg Ser Met Asp Phe Lys Ser Asn Ser Ala Val Ala Trp Ser Asn Lys
        195                 200                 205

Ser Asp Phe Ala Cys Ala Asn Ala Phe Asn Asn Ser Ile Ile Pro Glu
    210                 215                 220

Asp Thr Phe Phe Pro Ser Pro Glu Ser Ser Cys Asp Val Lys Leu Val
225                 230                 235                 240

Glu Lys Ser Phe Glu Thr Asp Thr Asn Leu Asn Phe Gln Asn Leu Ser
                245                 250                 255

Val Ile Gly Phe Arg Ile Leu Leu Lys Val Ala Gly Phe Asn Leu
            260                 265                 270

Leu Met Thr Leu Arg Leu Trp Ser Arg Ala Lys Arg Ser Gly Ser
        275                 280                 285

Gly Ala Thr Asn Phe Ser Leu Leu Lys Gln Ala Gly Asp Val Glu Glu
    290                 295                 300

Asn Pro Gly Pro Met Gly Pro Gly Leu Leu Cys Trp Ala Leu Leu Cys
305                 310                 315                 320

Leu Leu Gly Ala Gly Leu Val Asp Ala Gly Val Thr Gln Ser Pro Thr
                325                 330                 335

His Leu Ile Lys Thr Arg Gly Gln Gln Val Thr Leu Arg Cys Ser Pro
            340                 345                 350

Lys Ser Gly His Asp Thr Val Ser Trp Tyr Gln Gln Ala Leu Gly Gln
        355                 360                 365

Gly Pro Gln Phe Ile Phe Gln Tyr Tyr Glu Glu Glu Arg Gln Arg
    370                 375                 380

Gly Asn Phe Pro Asp Arg Phe Ser Gly His Gln Phe Pro Asn Tyr Ser
385                 390                 395                 400

Ser Glu Leu Asn Val Asn Ala Leu Leu Leu Gly Asp Ser Ala Leu Tyr
                405                 410                 415

Leu Cys Ala Ser Ser Val Gly Thr Gly Ile Thr Glu Ala Phe Phe Gly
            420                 425                 430

Gln Gly Thr Arg Leu Thr Val Val Glu Asp Leu Asn Lys Val Phe Pro
        435                 440                 445

Pro Glu Val Ala Val Phe Glu Pro Ser Glu Ala Glu Ile Ser His Thr
450                 455                 460

Gln Lys Ala Thr Leu Val Cys Leu Ala Thr Gly Phe Phe Pro Asp His
465                 470                 475                 480

Val Glu Leu Ser Trp Trp Val Asn Gly Lys Glu Val His Ser Gly Val
                485                 490                 495

Ser Thr Asp Pro Gln Pro Leu Lys Glu Gln Pro Ala Leu Asn Asp Ser
            500                 505                 510

Arg Tyr Cys Leu Ser Ser Arg Leu Arg Val Ser Ala Thr Phe Trp Gln
        515                 520                 525

Asn Pro Arg Asn His Phe Arg Cys Gln Val Gln Phe Tyr Gly Leu Ser
    530                 535                 540

Glu Asn Asp Glu Trp Thr Gln Asp Arg Ala Lys Pro Val Thr Gln Ile
545                 550                 555                 560

Val Ser Ala Glu Ala Trp Gly Arg Ala Asp Cys Gly Phe Thr Ser Val
                565                 570                 575

Ser Tyr Gln Gln Gly Val Leu Ser Ala Thr Ile Leu Tyr Glu Ile Leu
            580                 585                 590

Leu Gly Lys Ala Thr Leu Tyr Ala Val Leu Val Ser Ala Leu Val Leu
        595                 600                 605

Met Ala Met Val Lys Arg Lys Asp Phe
610                 615

<210> SEQ ID NO 83
<211> LENGTH: 21
<212> TYPE: PRT
<213> ORGANISM: Artificial sequence
<220> FEATURE:
<223> OTHER INFORMATION: Synthetic T cell receptor

<400> SEQUENCE: 83

```
Met Asp Lys Ile Leu Gly Ala Ser Phe Leu Val Leu Trp Leu Gln Leu
1               5                   10                  15

Cys Trp Val Ser Gly
            20
```

<210> SEQ ID NO 84
<211> LENGTH: 122
<212> TYPE: PRT
<213> ORGANISM: Artificial sequence
<220> FEATURE:
<223> OTHER INFORMATION: Synthetic T cell receptor

<400> SEQUENCE: 84

```
Gln Gln Lys Glu Lys Ser Asp Gln Gln Val Lys Gln Ser Pro Gln
1               5                   10                  15

Ser Leu Ile Val Gln Lys Gly Gly Ile Ser Ile Ile Asn Cys Ala Tyr
            20                  25                  30

Glu Asn Thr Ala Phe Asp Tyr Phe Pro Trp Tyr Gln Gln Phe Pro Gly
        35                  40                  45

Lys Gly Pro Ala Leu Leu Ile Ala Ile Arg Pro Asp Val Ser Glu Lys
    50                  55                  60

Lys Glu Gly Arg Phe Thr Ile Ser Phe Asn Lys Ser Ala Lys Gln Phe
65                  70                  75                  80

Ser Leu His Ile Met Asp Ser Gln Pro Gly Asp Ser Ala Thr Tyr Phe
                85                  90                  95

Cys Ala Ala Val Arg Tyr Asn Phe Asn Lys Phe Tyr Phe Gly Ser Gly
            100                 105                 110

Thr Lys Leu Asn Val Lys Pro Asn Ile Gln
        115                 120
```

<210> SEQ ID NO 85
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 85

```
Asn Thr Ala Phe Asp Tyr
1               5
```

<210> SEQ ID NO 86
<211> LENGTH: 7
<212> TYPE: PRT
<213> ORGANISM: Artificial sequence
<220> FEATURE:
<223> OTHER INFORMATION: Synthetic T cell receptor

<400> SEQUENCE: 86

```
Ile Arg Pro Asp Val Ser Glu
1               5
```

<210> SEQ ID NO 87
<211> LENGTH: 13
<212> TYPE: PRT
<213> ORGANISM: Artificial sequence
<220> FEATURE:
<223> OTHER INFORMATION: Synthetic T cell receptor

<400> SEQUENCE: 87

```
Cys Ala Ala Val Arg Tyr Asn Phe Asn Lys Phe Tyr Phe
1               5                   10
```

```
<210> SEQ ID NO 88
<211> LENGTH: 21
<212> TYPE: PRT
<213> ORGANISM: Artificial sequence
<220> FEATURE:
<223> OTHER INFORMATION: Synthetic T cell receptor

<400> SEQUENCE: 88

Met Gly Pro Gly Leu Leu Cys Trp Ala Leu Leu Cys Leu Leu Gly Ala
1               5                   10                  15

Gly Leu Val Asp Ala
            20

<210> SEQ ID NO 89
<211> LENGTH: 111
<212> TYPE: PRT
<213> ORGANISM: Artificial sequence
<220> FEATURE:
<223> OTHER INFORMATION: Synthetic T cell receptor

<400> SEQUENCE: 89

Gly Val Thr Gln Ser Pro Thr His Leu Ile Lys Thr Arg Gly Gln Gln
1               5                   10                  15

Val Thr Leu Arg Cys Ser Pro Lys Ser Gly His Asp Thr Val Ser Trp
                20                  25                  30

Tyr Gln Gln Ala Leu Gly Gln Gly Pro Gln Phe Ile Phe Gln Tyr Tyr
            35                  40                  45

Glu Glu Glu Glu Arg Gln Arg Gly Asn Phe Pro Asp Arg Phe Ser Gly
        50                  55                  60

His Gln Phe Pro Asn Tyr Ser Ser Glu Leu Asn Val Asn Ala Leu Leu
65                  70                  75                  80

Leu Gly Asp Ser Ala Leu Tyr Leu Cys Ala Ser Ser Val Gly Thr Gly
                85                  90                  95

Ile Thr Glu Ala Phe Phe Gly Gln Gly Thr Arg Leu Thr Val Val
            100                 105                 110

<210> SEQ ID NO 90
<211> LENGTH: 5
<212> TYPE: PRT
<213> ORGANISM: Artificial sequence
<220> FEATURE:
<223> OTHER INFORMATION: Synthetic T cell receptor

<400> SEQUENCE: 90

Ser Gly His Asp Thr
1               5

<210> SEQ ID NO 91
<211> LENGTH: 6
<212> TYPE: PRT
<213> ORGANISM: Artificial sequence
<220> FEATURE:
<223> OTHER INFORMATION: Synthetic T cell receptor

<400> SEQUENCE: 91

Tyr Tyr Glu Glu Glu Glu
1               5

<210> SEQ ID NO 92
<211> LENGTH: 14
<212> TYPE: PRT
<213> ORGANISM: Artificial sequence
```

```
<220> FEATURE:
<223> OTHER INFORMATION: Synthetic T cell receptor

<400> SEQUENCE: 92

Cys Ala Ser Ser Val Gly Thr Gly Ile Thr Glu Ala Phe Phe
1               5                   10

<210> SEQ ID NO 93
<211> LENGTH: 10
<212> TYPE: PRT
<213> ORGANISM: Artificial sequence
<220> FEATURE:
<223> OTHER INFORMATION: Synthetic T cell receptor

<400> SEQUENCE: 93

Leu Ser Glu Leu Glu Thr Pro Gly Lys Tyr
1               5                   10
```